US009665168B2

(12) United States Patent
Oshima et al.

(10) Patent No.: US 9,665,168 B2
(45) Date of Patent: May 30, 2017

(54) IMAGE PROCESSING APPARATUS, INFORMATION PROCESSING METHOD, AND PROGRAM

(71) Applicant: CANON KABUSHIKI KAISHA, Tokyo (JP)

(72) Inventors: Soshi Oshima, Toride (JP); Katsuyuki Takahashi, Toride (JP); Ryo Kosaka, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 198 days.

(21) Appl. No.: 14/700,414

(22) Filed: Apr. 30, 2015

(65) Prior Publication Data
US 2015/0317784 A1    Nov. 5, 2015

(30) Foreign Application Priority Data
May 2, 2014   (JP) ................. 2014-095541

(51) Int. Cl.
*H04N 7/18*   (2006.01)
*G06F 3/01*   (2006.01)
(Continued)

(52) U.S. Cl.
CPC .......... *G06F 3/01* (2013.01); *G02B 27/0075* (2013.01); *G06F 1/16* (2013.01); *G06F 1/1684* (2013.01);
(Continued)

(58) Field of Classification Search
CPC .......... G06F 3/01; G06F 3/017; G06F 1/1684; G06F 1/16; G02B 27/0075;
(Continued)

(56) References Cited

U.S. PATENT DOCUMENTS 7,001,024 B2    2/2006   Kitaguchi et al.
2010/0315601 A1*  12/2010  Furui .................. H04N 9/3194
                                                 353/70
(Continued)

FOREIGN PATENT DOCUMENTS

JP           3834766 B2    10/2006
JP           3954436 B2     8/2007
(Continued)

*Primary Examiner* — Allen Wong
(74) *Attorney, Agent, or Firm* — Rossi, Kimms & McDowell LLP

(57) ABSTRACT

A user's operability in an image processing apparatus such as a camera scanner is improved. The image processing apparatus has: a pickup image obtaining unit for obtaining a pickup image on a stage through an imaging unit; a distance image obtaining unit for obtaining a distance image on the stage through a solid measuring unit; a solid information obtaining unit for obtaining solid information of a solid object put on the stage based on the obtained pickup image of the solid object and the obtained distance image of the solid object; a projecting unit for projecting a projection image showing a contents area onto the solid object through a projector based on the obtained solid information; and a processing unit for executing the contents in accordance with a user's gesture to the projected projection image.

18 Claims, 48 Drawing Sheets

(51) Int. Cl.

| | | |
|---|---|---|
| *G06F 1/16* | (2006.01) | |
| *G02B 27/00* | (2006.01) | |
| *H04N 13/04* | (2006.01) | |
| *H04N 5/33* | (2006.01) | |
| *G06T 1/00* | (2006.01) | |
| *G06K 9/00* | (2006.01) | |
| *G06T 7/70* | (2017.01) | |
| *G06T 7/521* | (2017.01) | |
| *G06T 7/571* | (2017.01) | |
| *H04N 101/00* | (2006.01) | |

(52) U.S. Cl.
CPC ......... *G06F 3/017* (2013.01); *G06K 9/00355* (2013.01); *G06T 1/0007* (2013.01); *G06T 7/521* (2017.01); *G06T 7/571* (2017.01); *G06T 7/70* (2017.01); *H04N 5/33* (2013.01); *H04N 13/0422* (2013.01); *H04N 13/0459* (2013.01); *H04N 13/0497* (2013.01); *G06T 2200/21* (2013.01); *H04N 2101/00* (2013.01)

(58) Field of Classification Search
CPC ..... G06T 2200/21; G06T 1/0007; G06T 7/70; G06T 7/521; G06T 7/571; G06K 9/00355; H04N 13/0459; H04N 13/0422; H04N 13/0497; H04N 5/33; H04N 2101/00
USPC .......................................................... 348/77
See application file for complete search history.

(56) References Cited

U.S. PATENT DOCUMENTS

| | | | |
|---|---|---|---|
| 2011/0025823 A1* | 2/2011 | Sasaki | G01B 11/24 |
| | | | 348/46 |
| 2013/0033484 A1* | 2/2013 | Liao | G06T 7/0042 |
| | | | 345/419 |

FOREIGN PATENT DOCUMENTS

| | | |
|---|---|---|
| JP | 4012710 B2 | 11/2007 |
| JP | 2012208705 A | 10/2012 |
| JP | 2013034168 A | 2/2013 |

* cited by examiner

FIG. 2-a
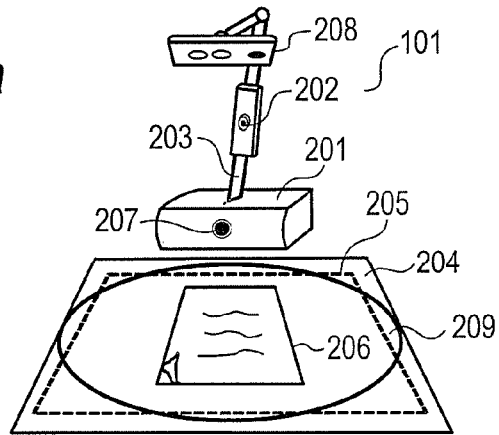
FIG. 2-b
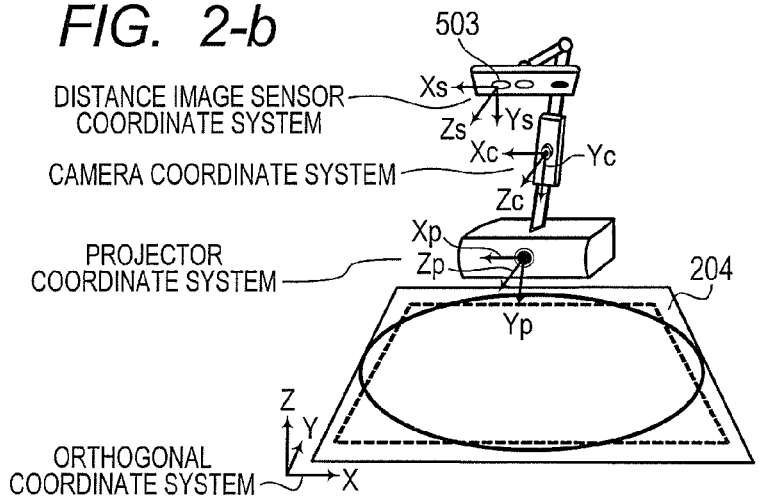
FIG. 2-c
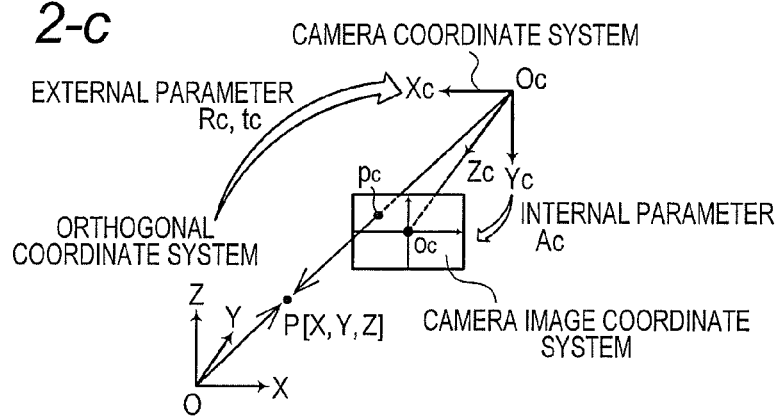

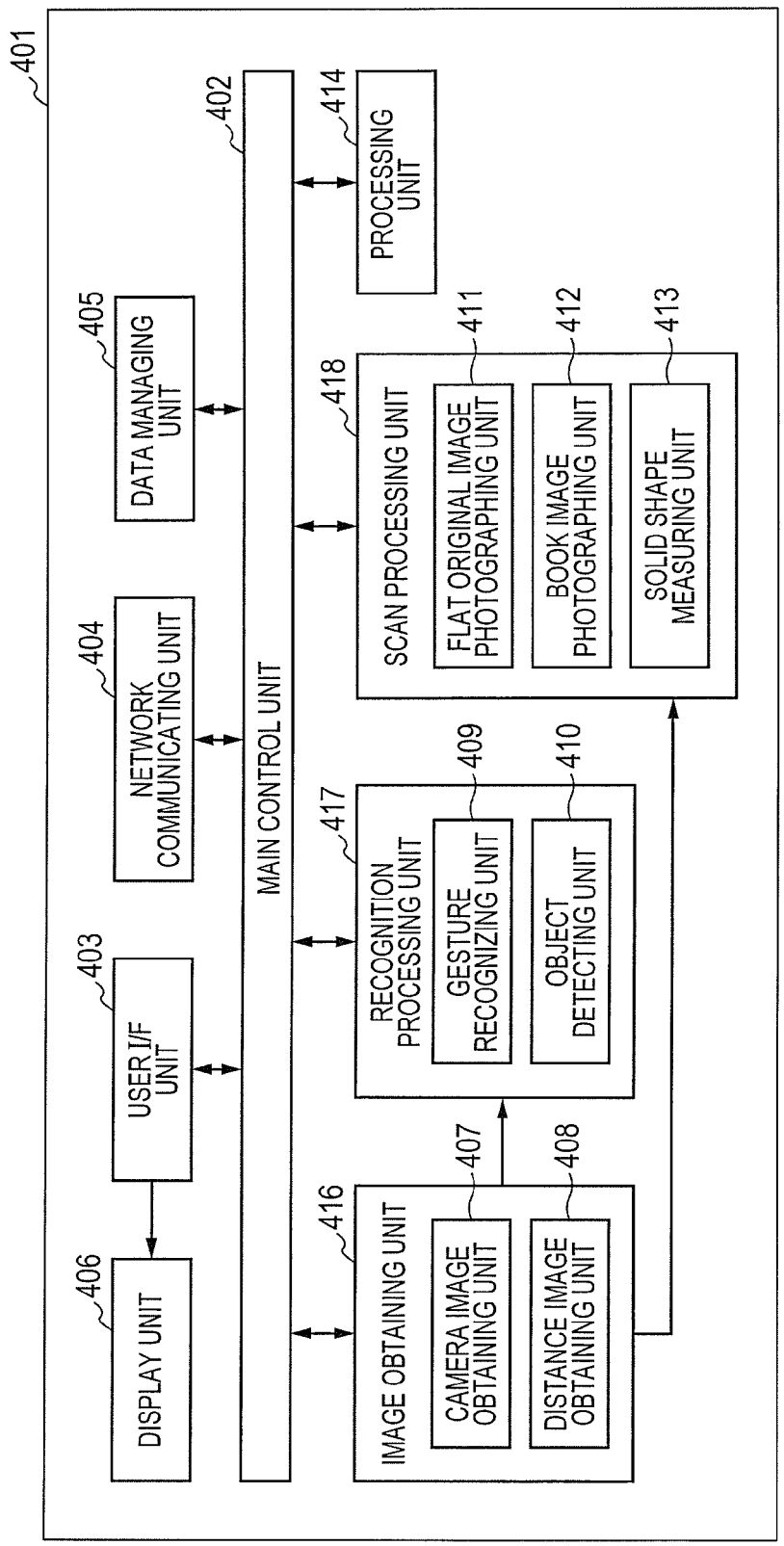
FIG. 4-a

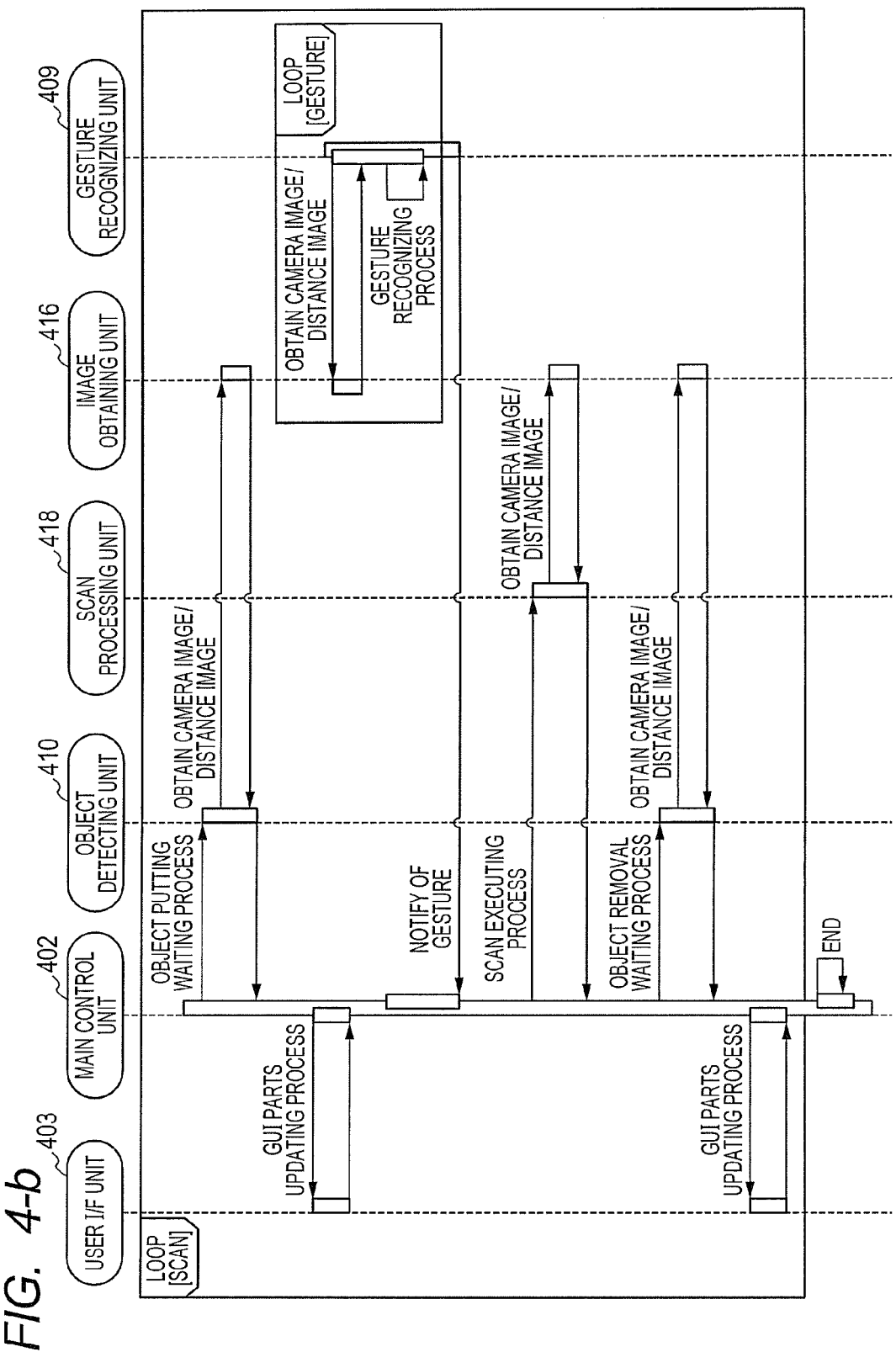
FIG. 4-b

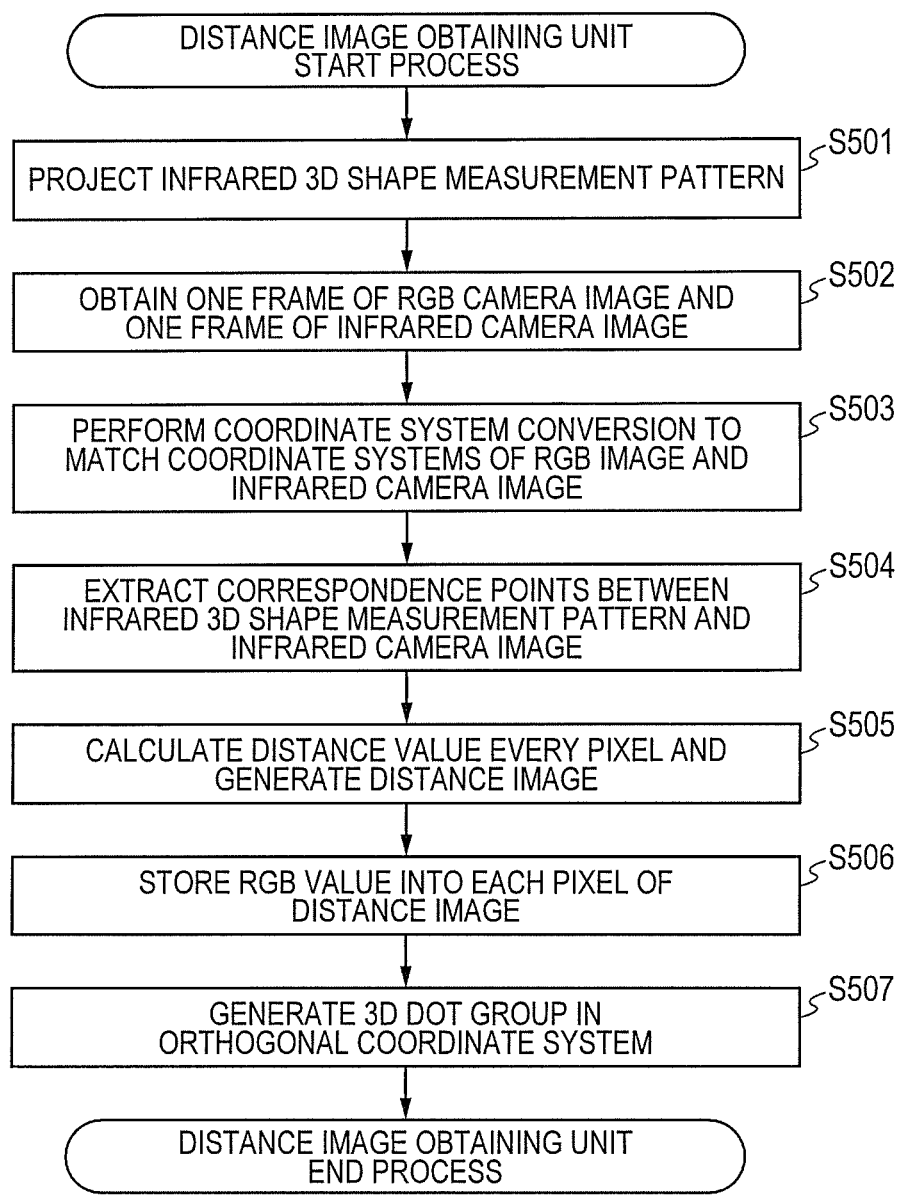
FIG. 5-a

FIG. 5-b
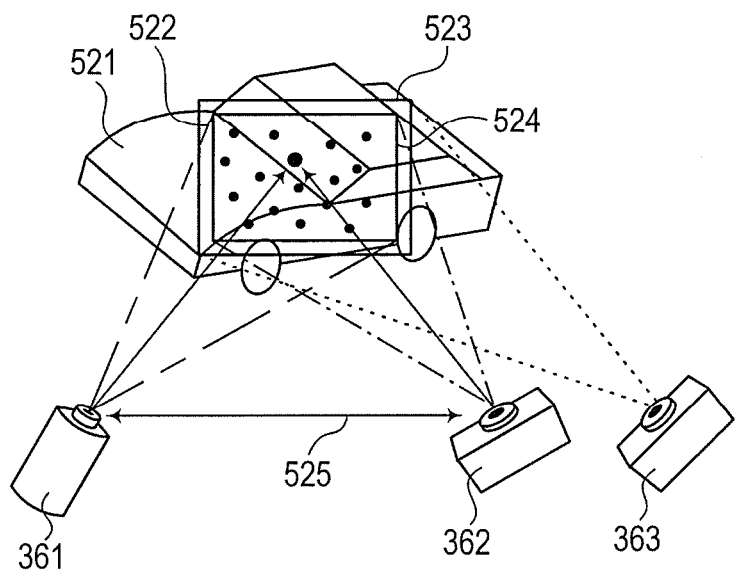
FIG. 5-c
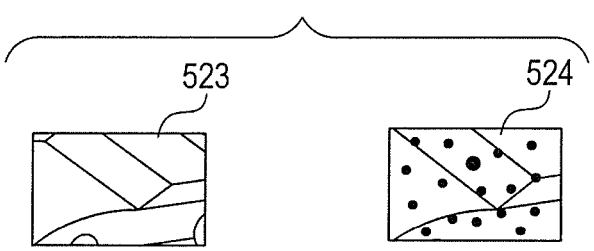
FIG. 5-d
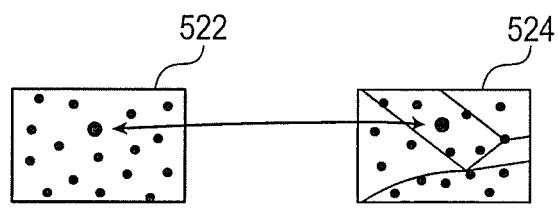

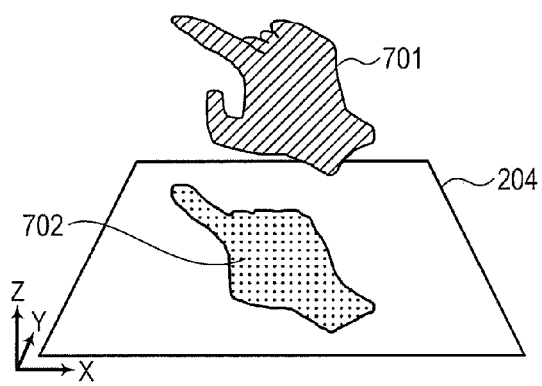
FIG. 7-a
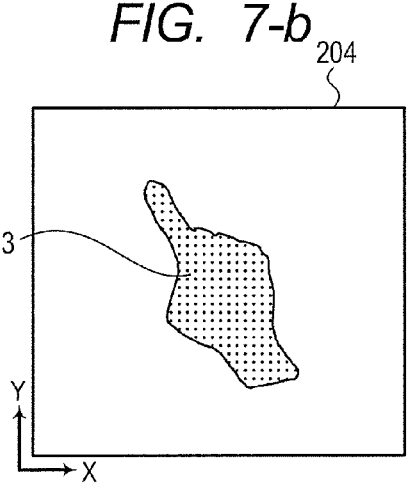
FIG. 7-b
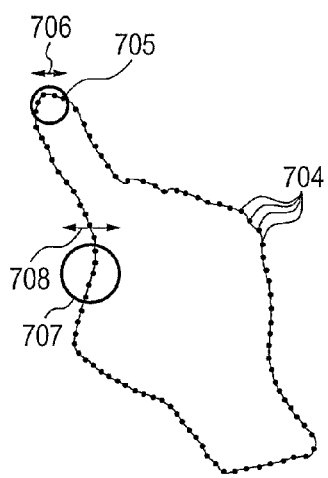
FIG. 7-c
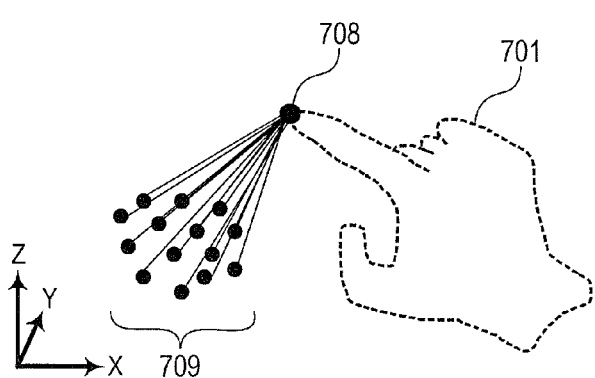
FIG. 7-d

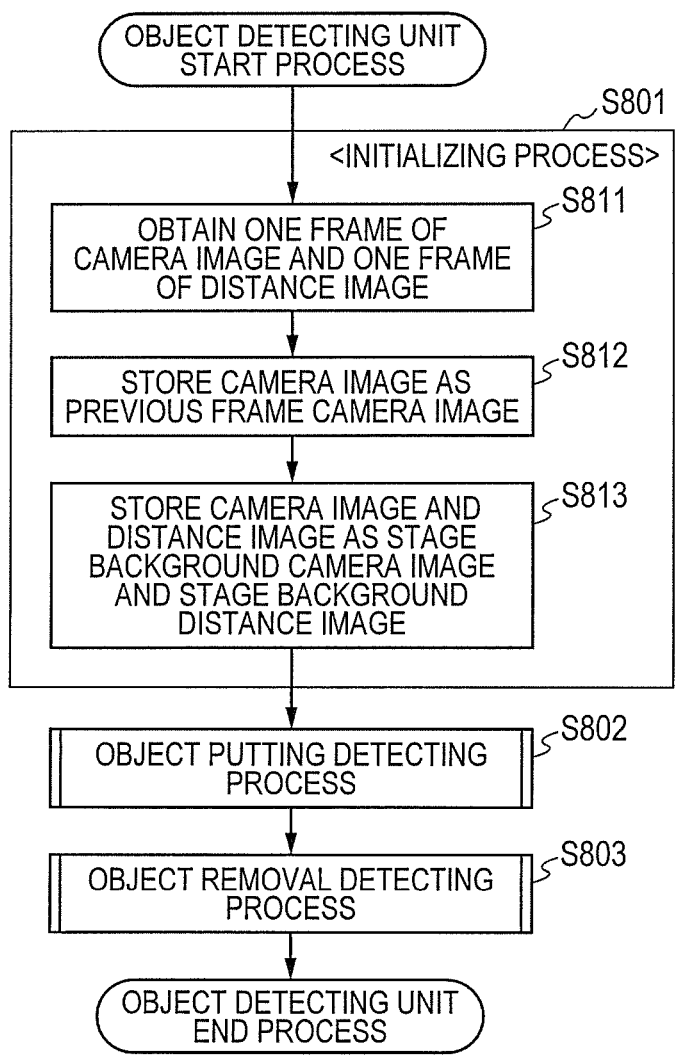
FIG. 8-a

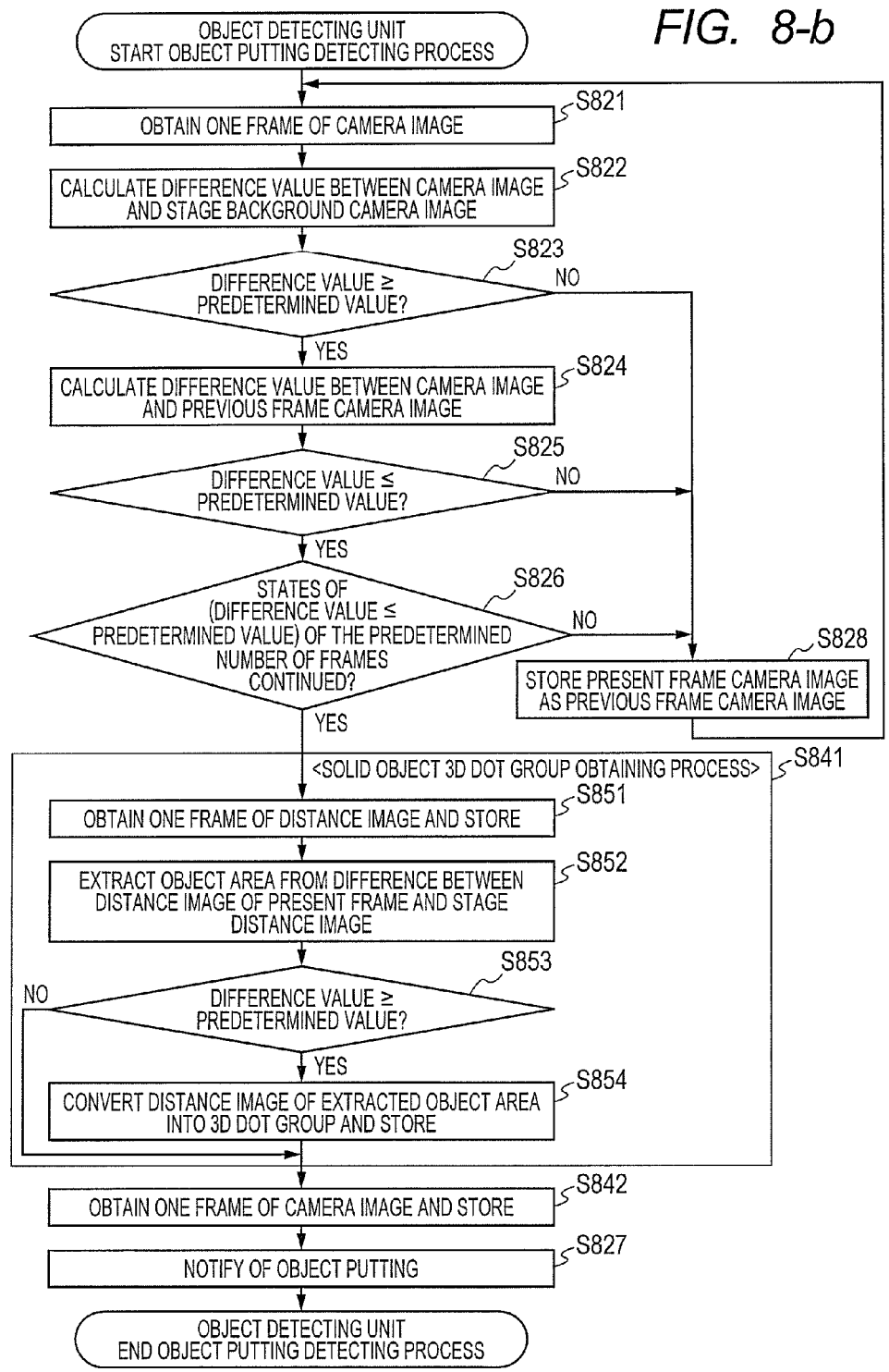
FIG. 8-b

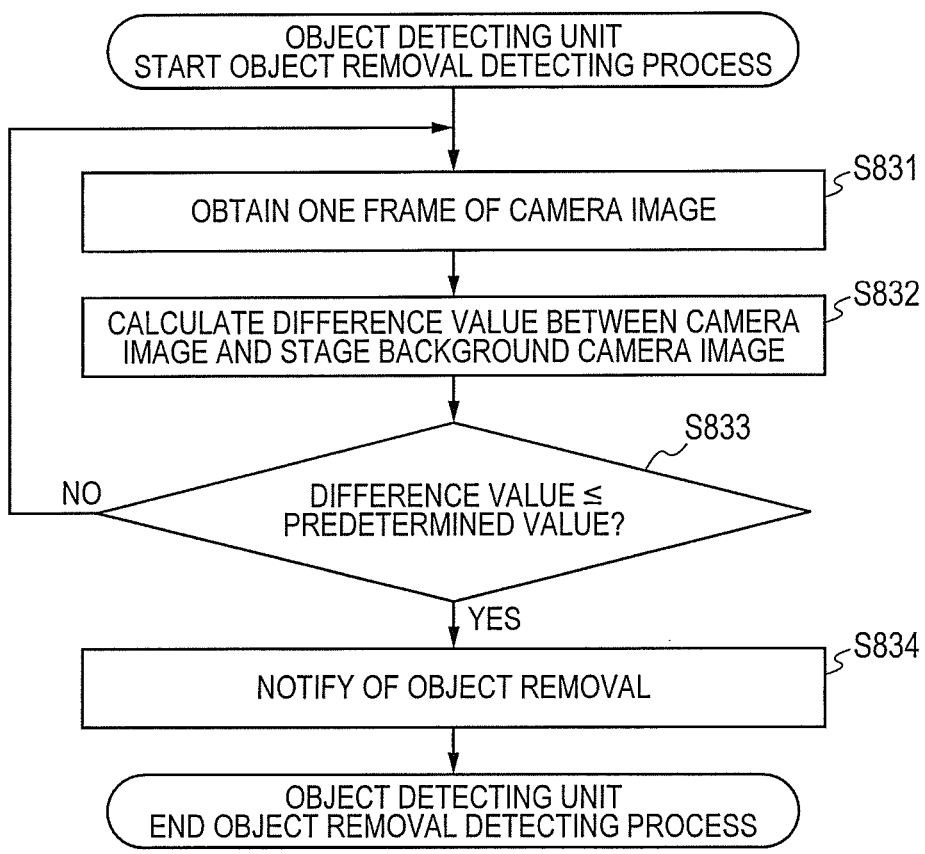
FIG. 8-c

FIG. 10-a
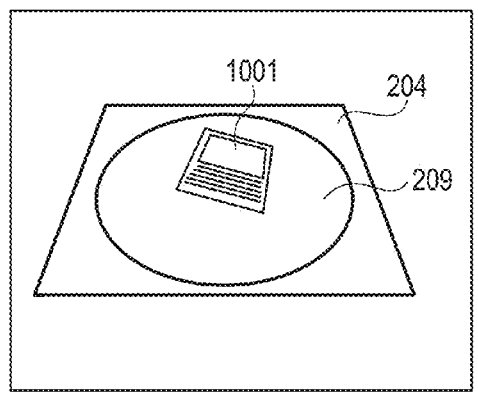
FIG. 10-b
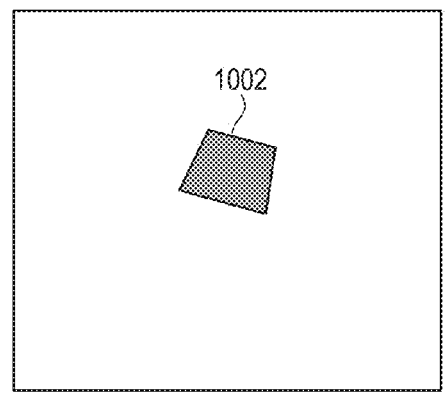
FIG. 10-c
FIG. 10-d
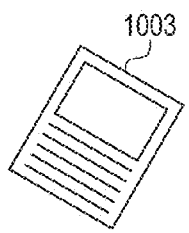
FIG. 10-e
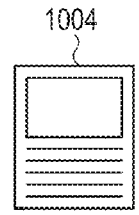
FIG. 10-f
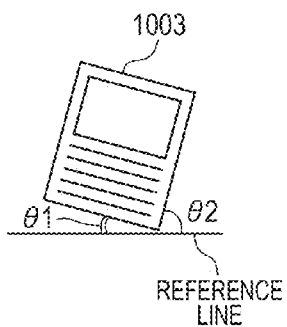
FIG. 10-g
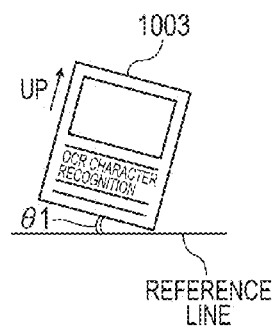
FIG. 10-h
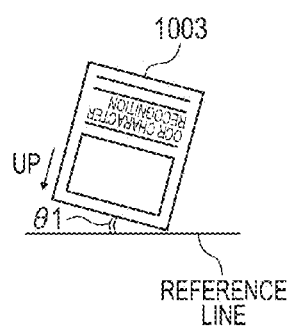

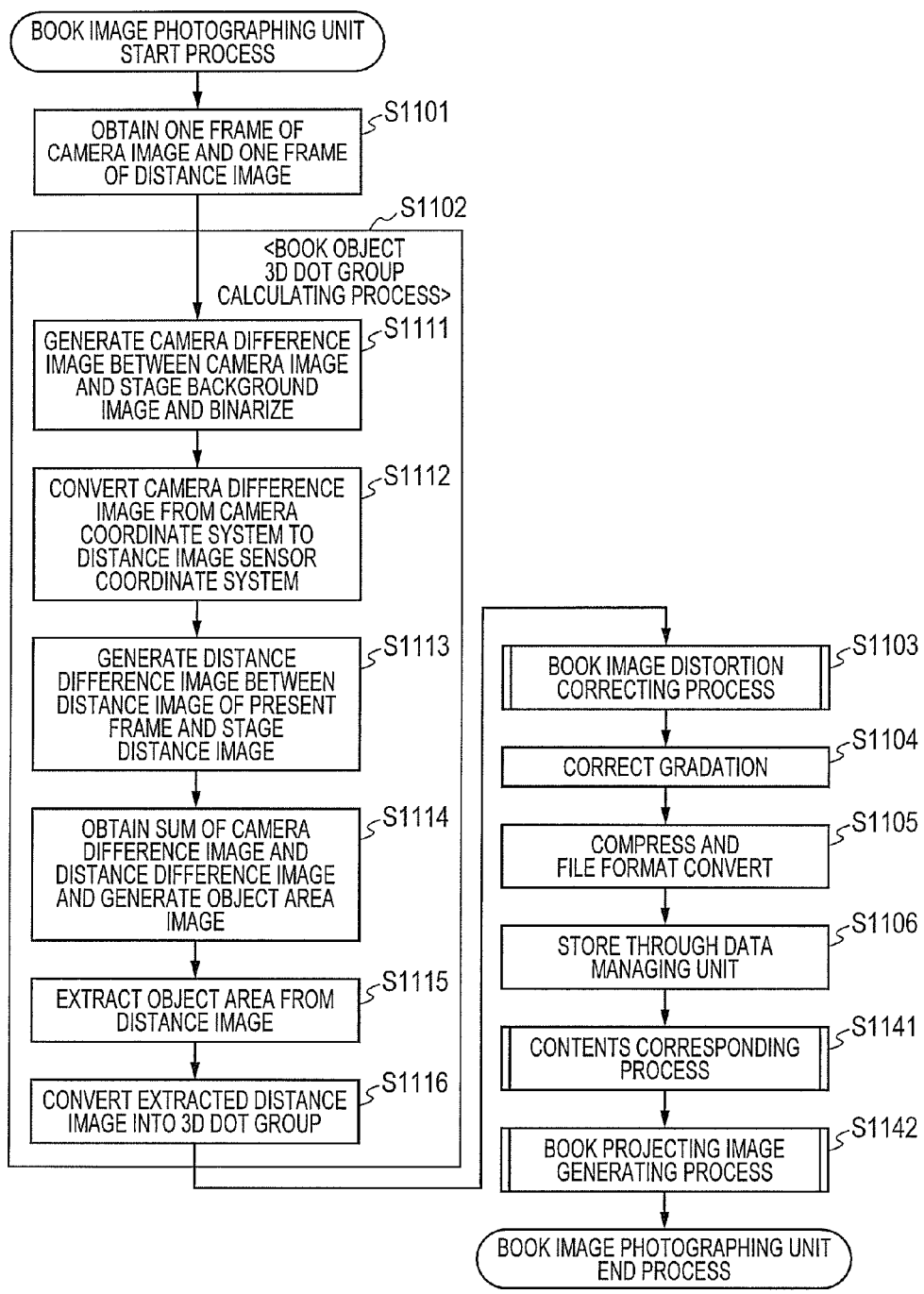
FIG. 11A-a

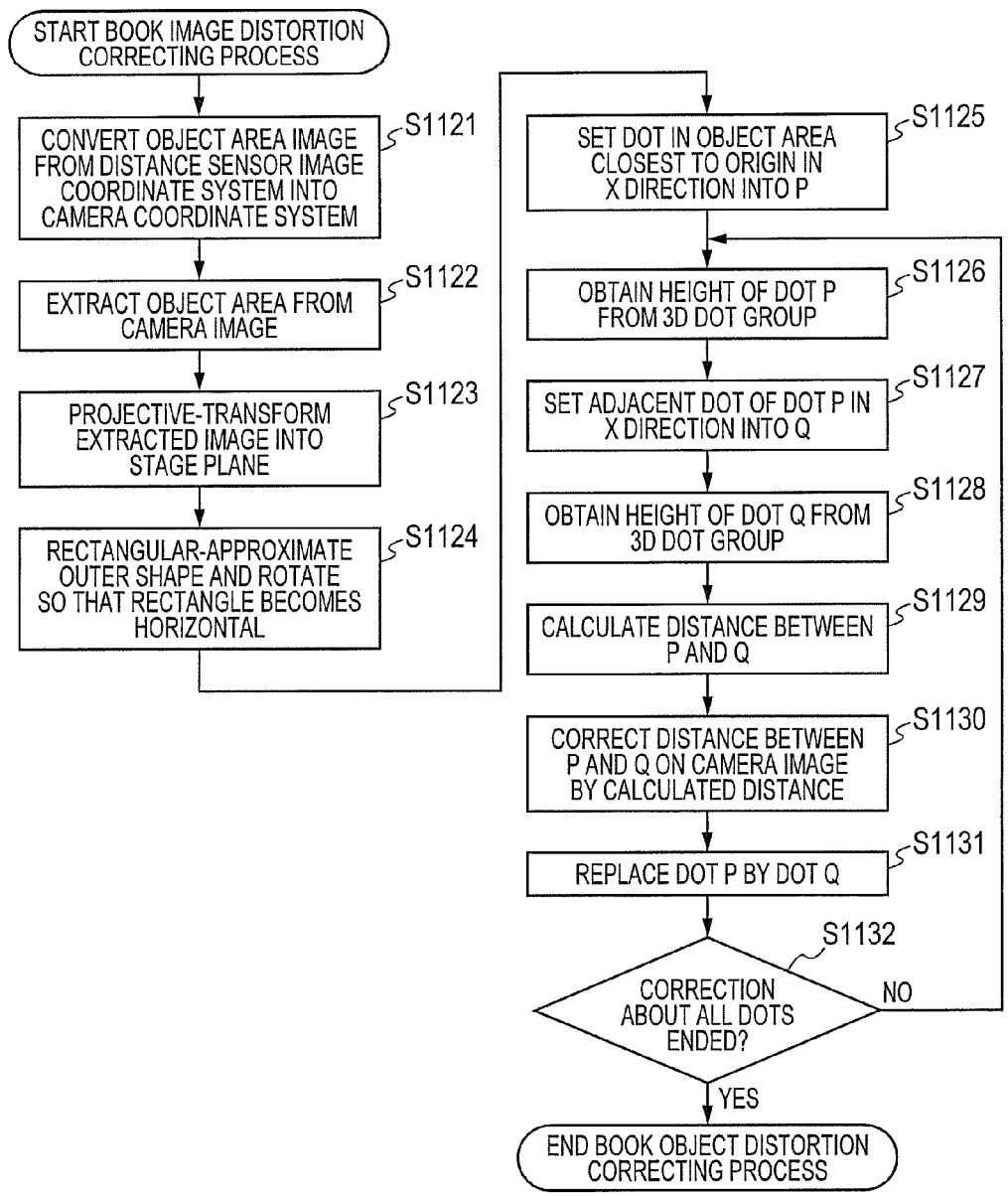
FIG. 11A-b

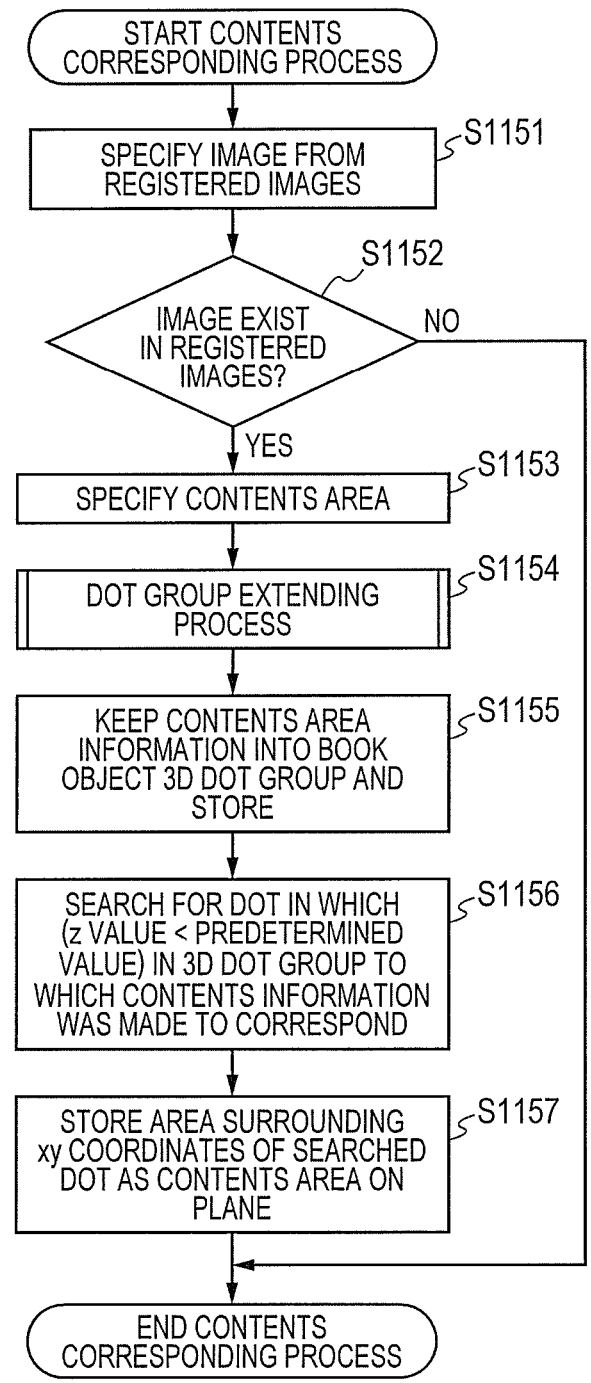
FIG. 11B-c

FIG. 11B-d
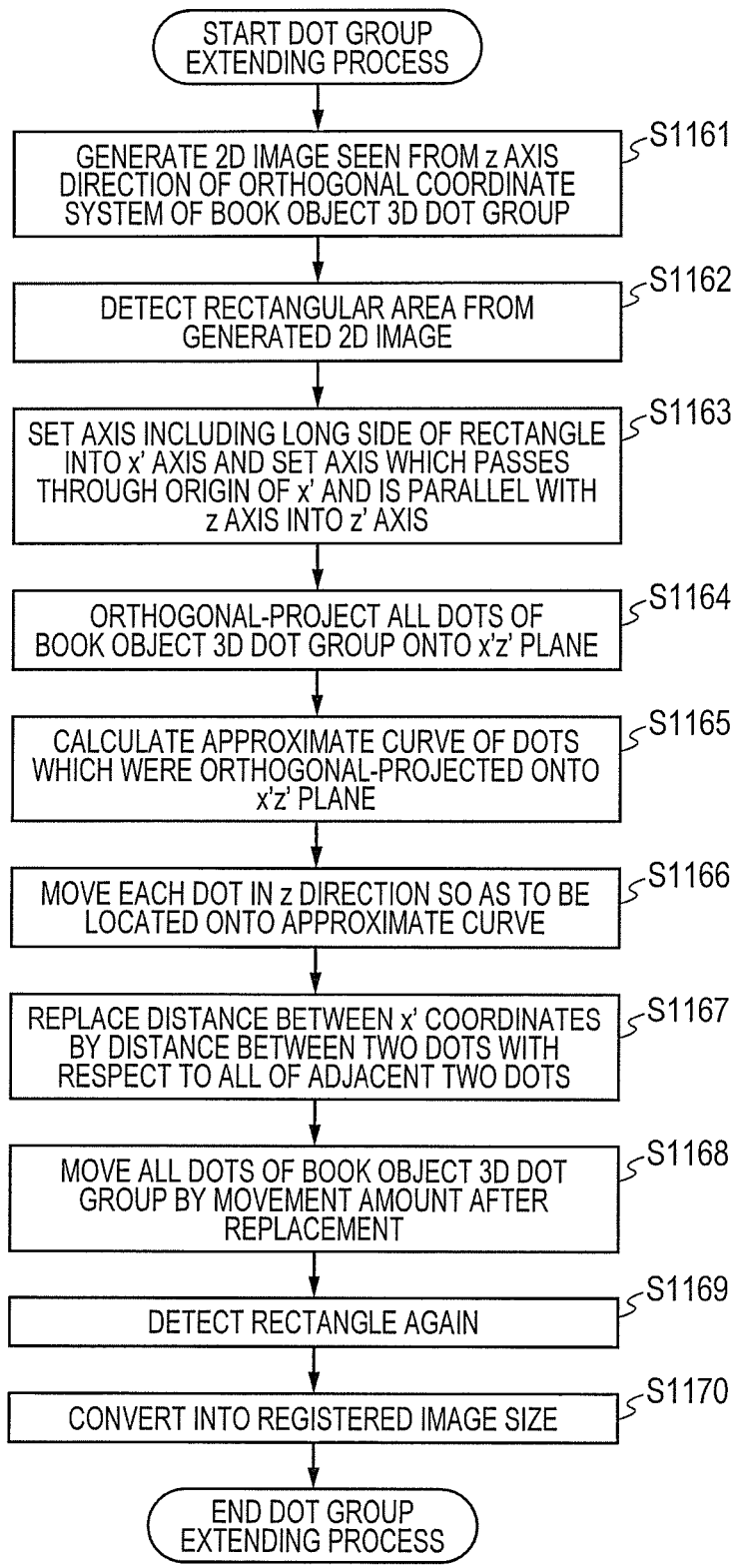

FIG. 11B-e
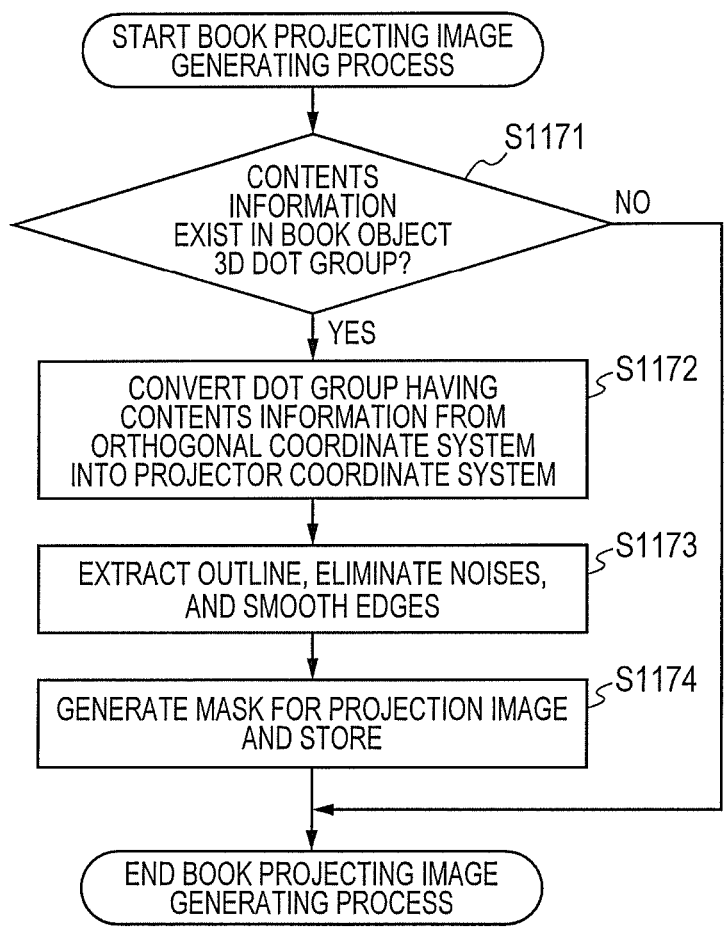

FIG. 12A-a 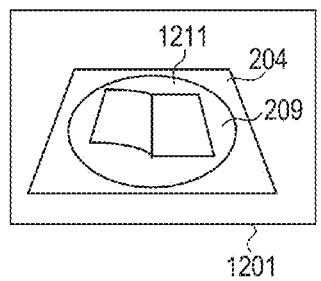
FIG. 12A-b 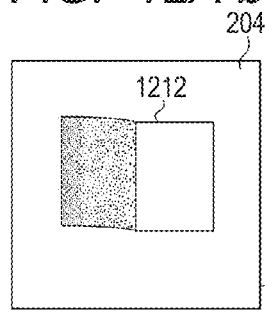
FIG. 12A-c 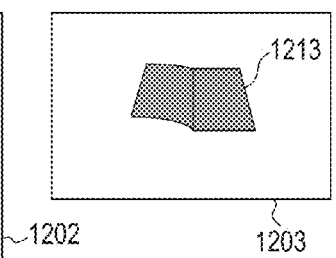
FIG. 12A-d 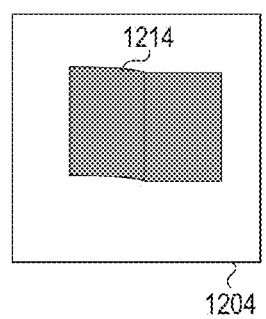
FIG. 12A-e 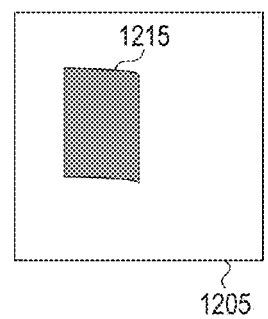
FIG. 12A-f 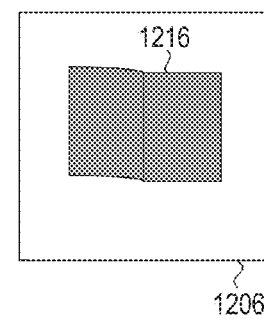
FIG. 12A-g 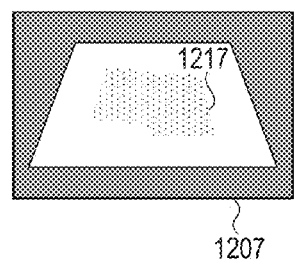
FIG. 12A-h 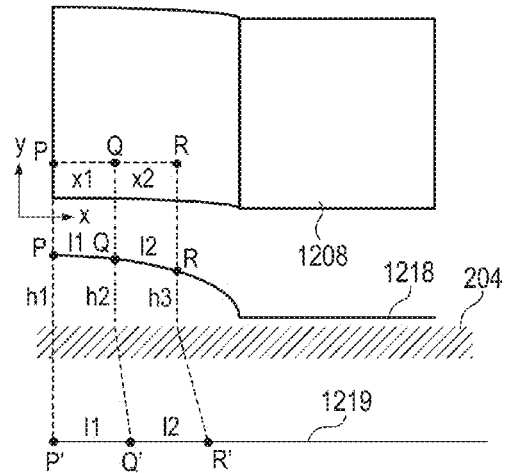

*FIG. 12B-i*
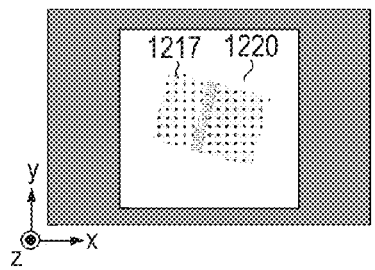
*FIG. 12B-j*
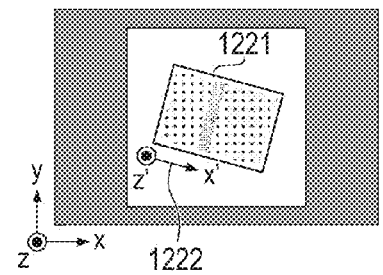
*FIG. 12B-k*
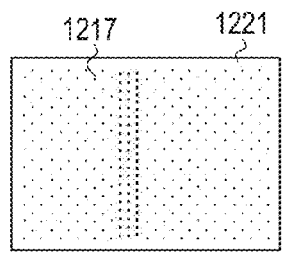
*FIG. 12B-l*
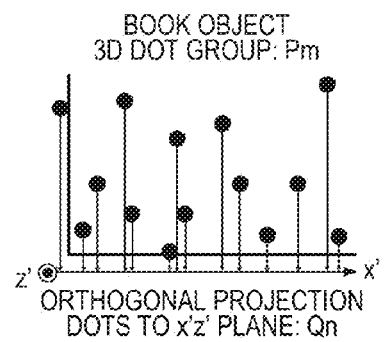
*FIG. 12B-m*
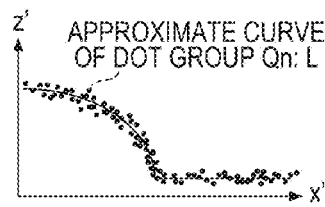
*FIG. 12B-n*
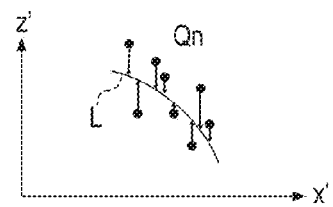
*FIG. 12B-o*
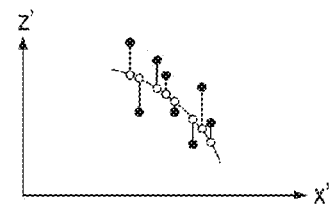
*FIG. 12B-p*
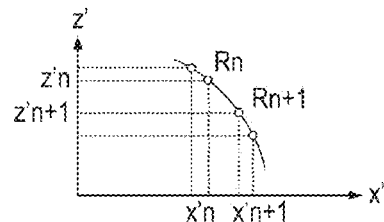

FIG. 12C-q
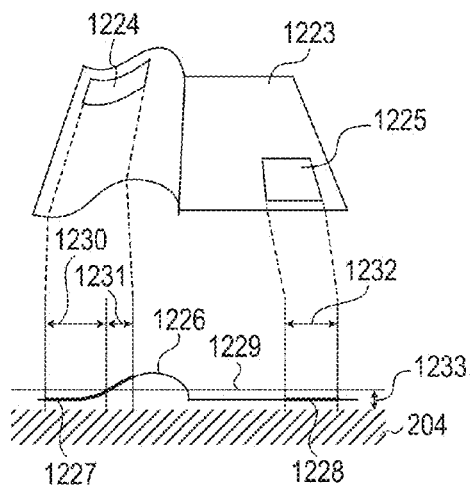
FIG. 12C-r
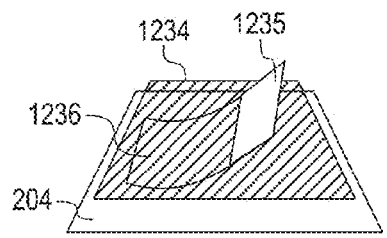
FIG. 12C-s   FIG. 12C-t   FIG. 12C-u
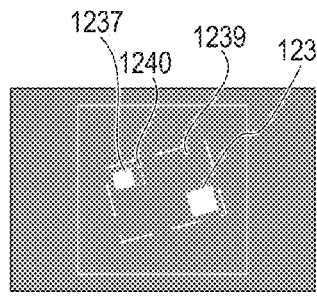 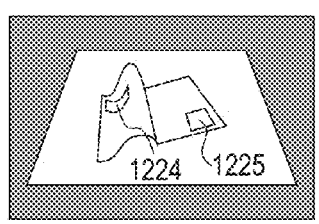 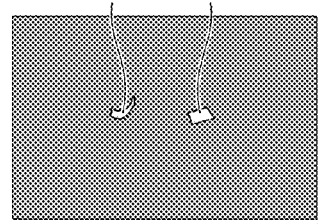

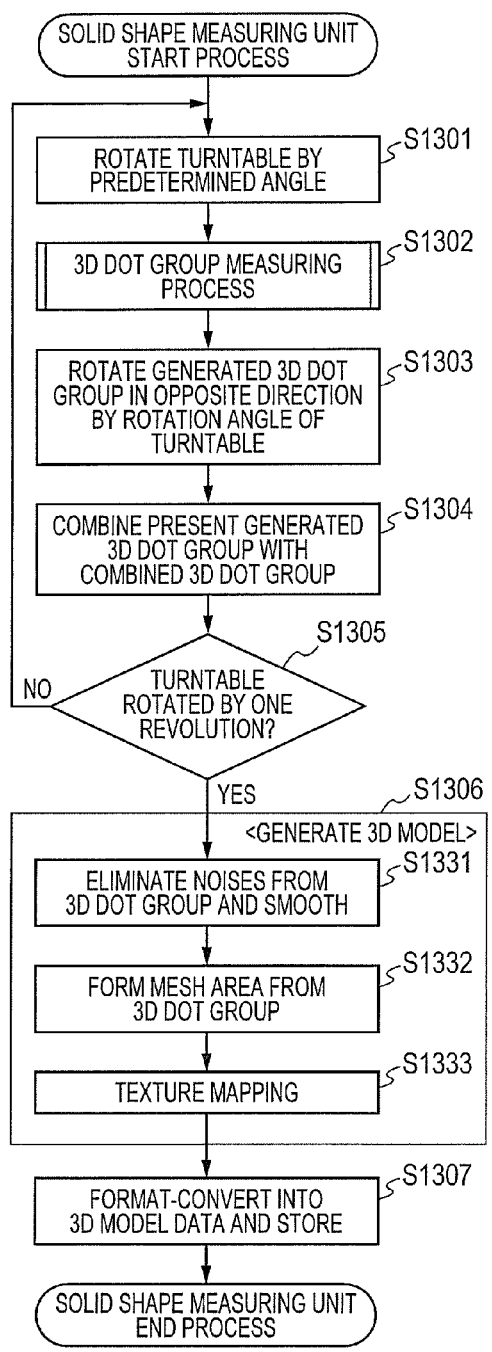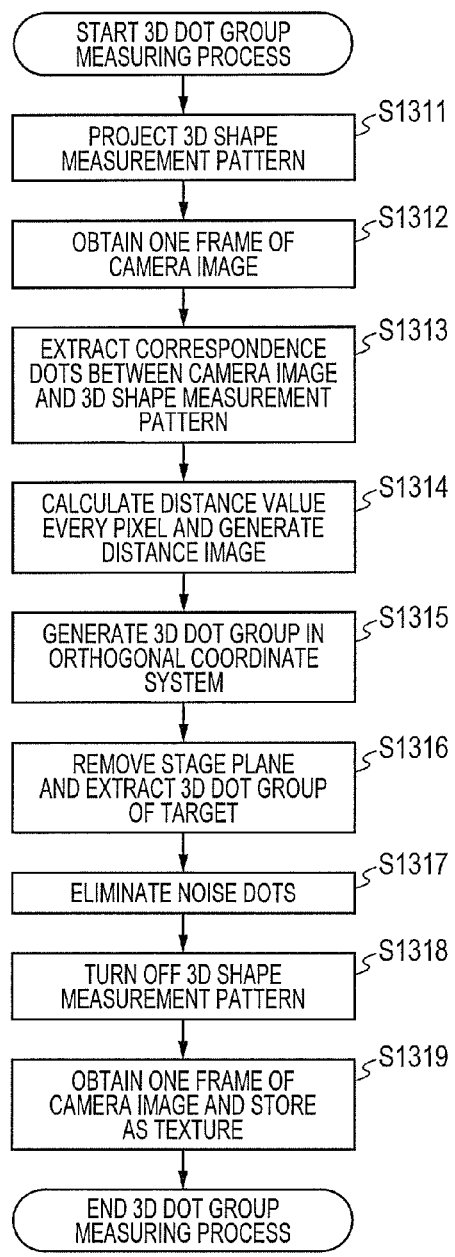

FIG. 14-a
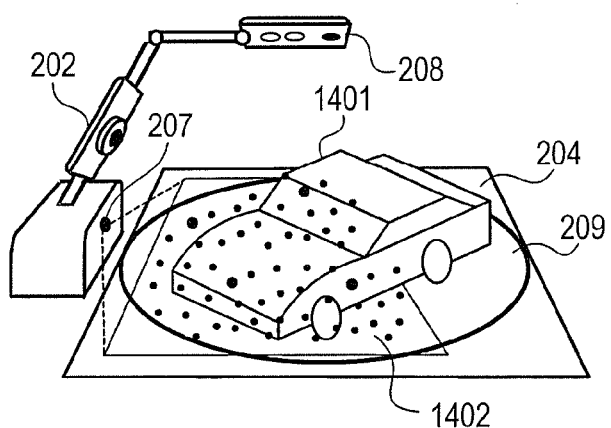
FIG. 14-b
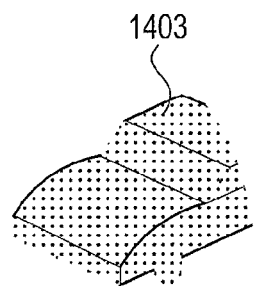
FIG. 14-c
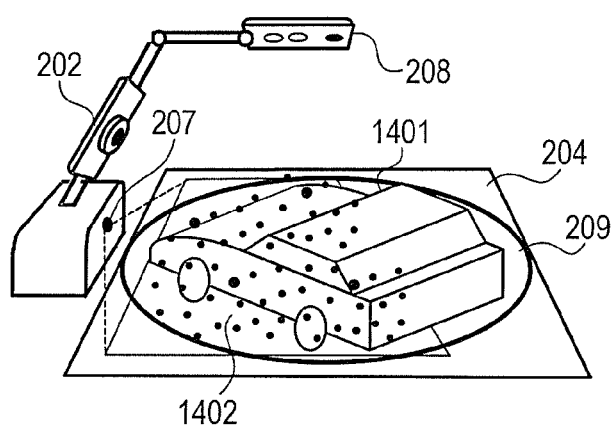
FIG. 14-d
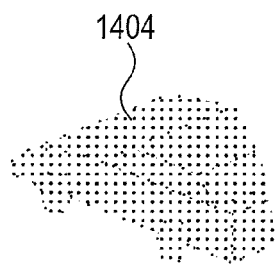
FIG. 14-e
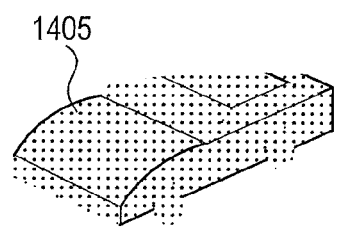
FIG. 14-f
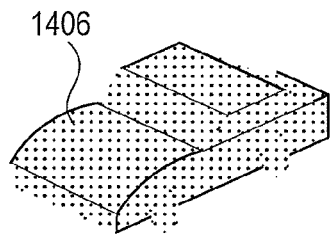

FIG. 16-a
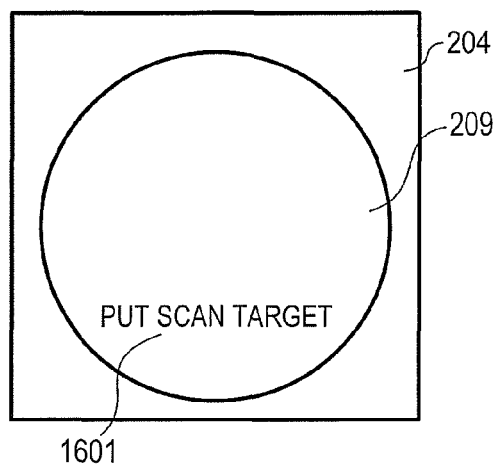
FIG. 16-b
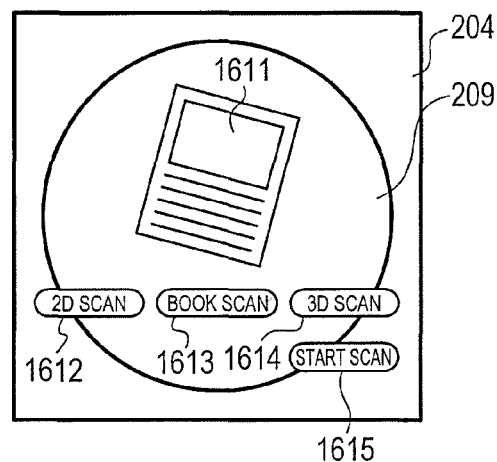
FIG. 16-c
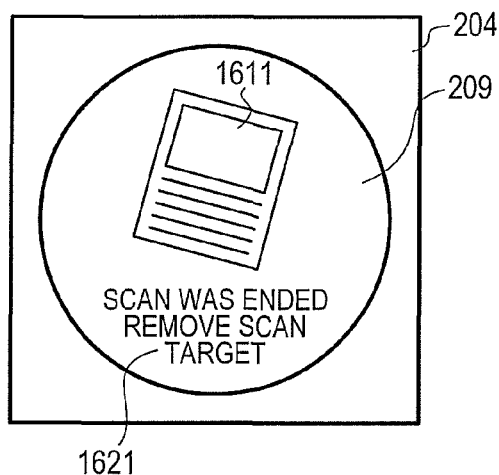

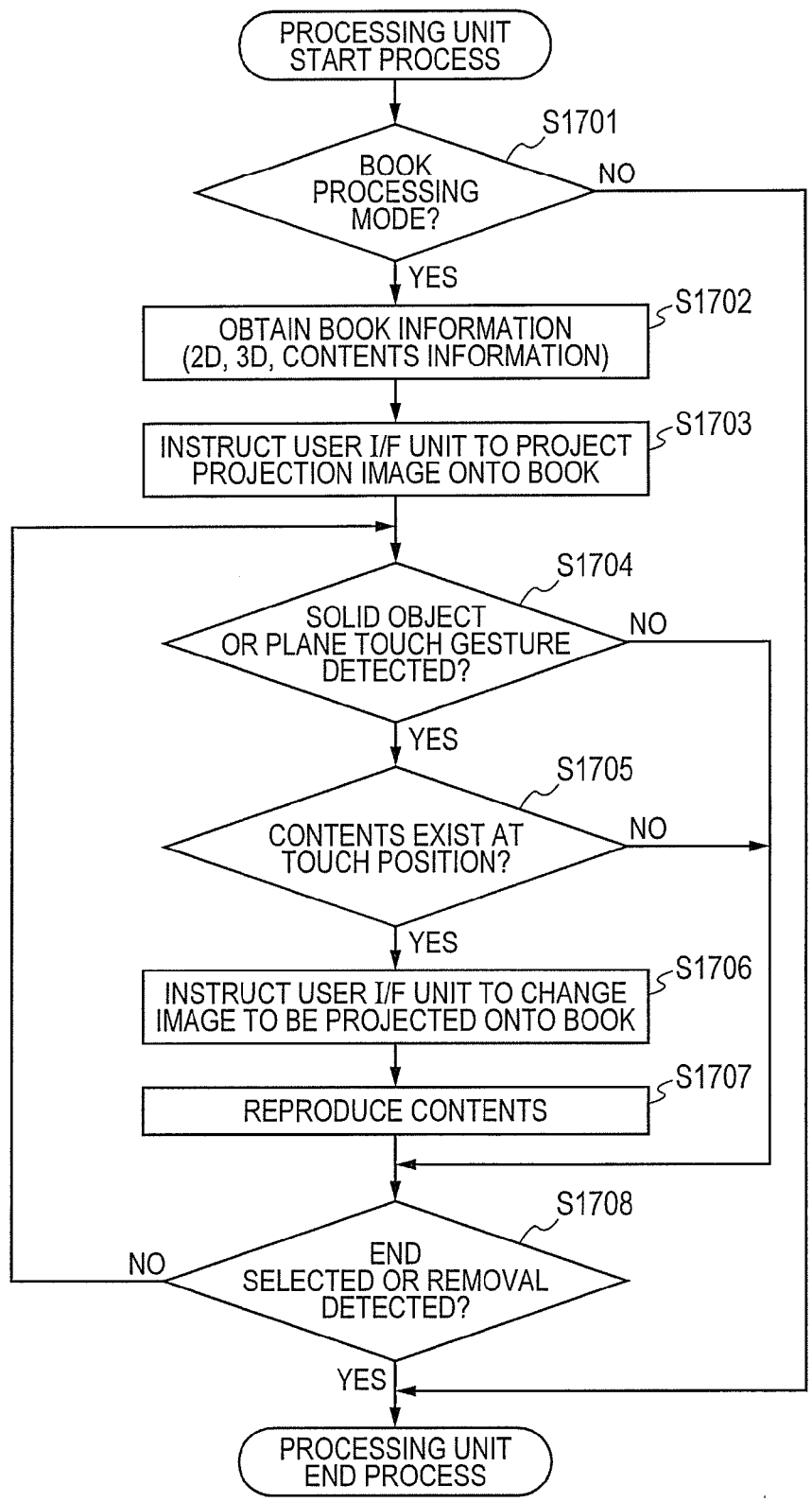
FIG. 17-a

FIG. 17-b
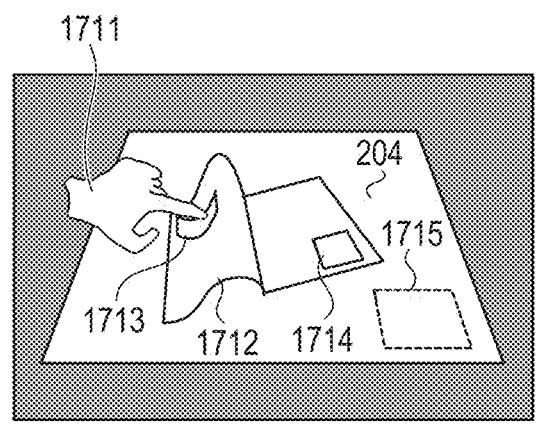
FIG. 17-c
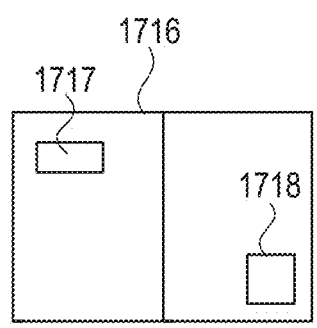

FIG. 18-a

| BOOK NO. | PAGE | COORDINATES OF CONTENTS AREA ON REGISTERED IMAGE | CONTENTS |
|---|---|---|---|
| 1 | 0 | (xa1, ya1), (xa2, ya2) | /contents/A.jpg |
| 1 | 1 | (xb1, yb1), (xb2, yb2) | /contents/B.jpg ~1801 |
| 1 | 1 | (xc1, yc1), (xc2, yc2) | /contents/C.mp4 ~1802 |
| 1 | 2 | (xd1, yd1), (xd2, yd2) | /contents/D.jpg |
| 1 | 2 | (xe1, ye1), (xe2, ye2) | /contents/E.mp3 |
| 1 | 2 | (xf1, yf1), (xf2, yf2) | /contents/F.mp4 |
| 1 | 3 | (xg1, yg1), (xg2, yg2) | /contents/G.txt |

FIG. 18-b

| ORTHOGONAL COORDINATES HAVING CONTENTS | CONTENTS |
|---|---|
| (x1, y1, z1) | /contents/B.jpg |
| (x2, y2, z2) | /contents/B.jpg |
| (x3, y3, z3) | /contents/B.jpg |
| (x4, y4, z4) | /contents/C.mp4 |
| (x5, y5, z5) | /contents/C.mp4 |
| (x6, y6, z6) | /contents/C.mp4 |
| (x7, y7, z7) | /contents/C.mp4 |
| (x8, y8, z8) | /contents/C.mp4 |

FIG. 18-c

| PLANE AREA HAVING CONTENTS | CONTENTS |
|---|---|
| (x11, y11), (x12, y12) | /contents/B.jpg |
| (x21, y21), (x22, y22) | /contents/C.mp4 |

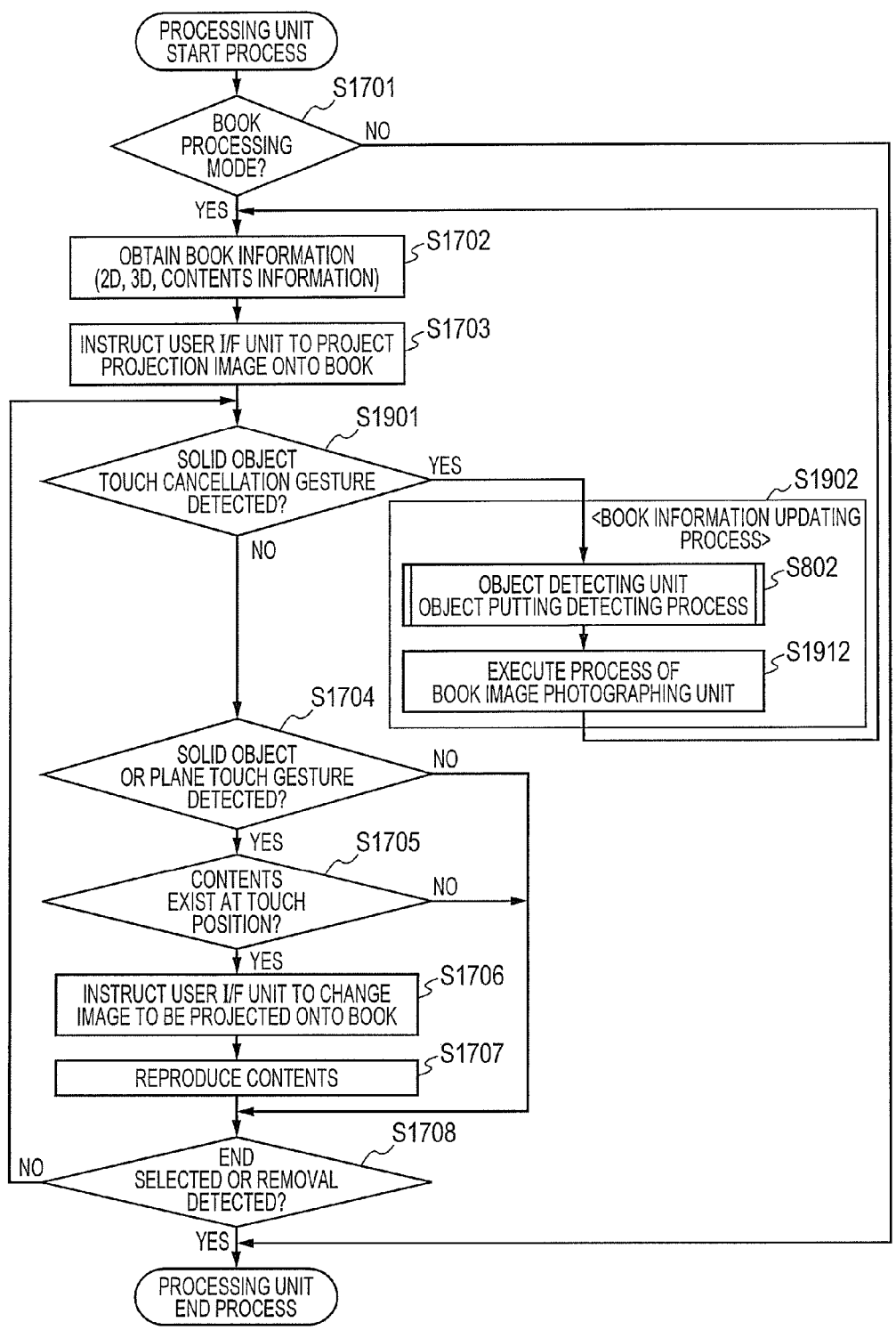
FIG. 19-a

FIG. 19-b
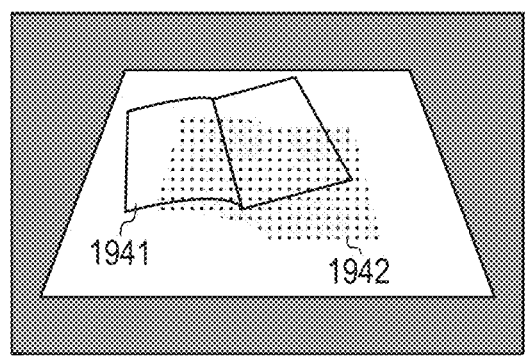

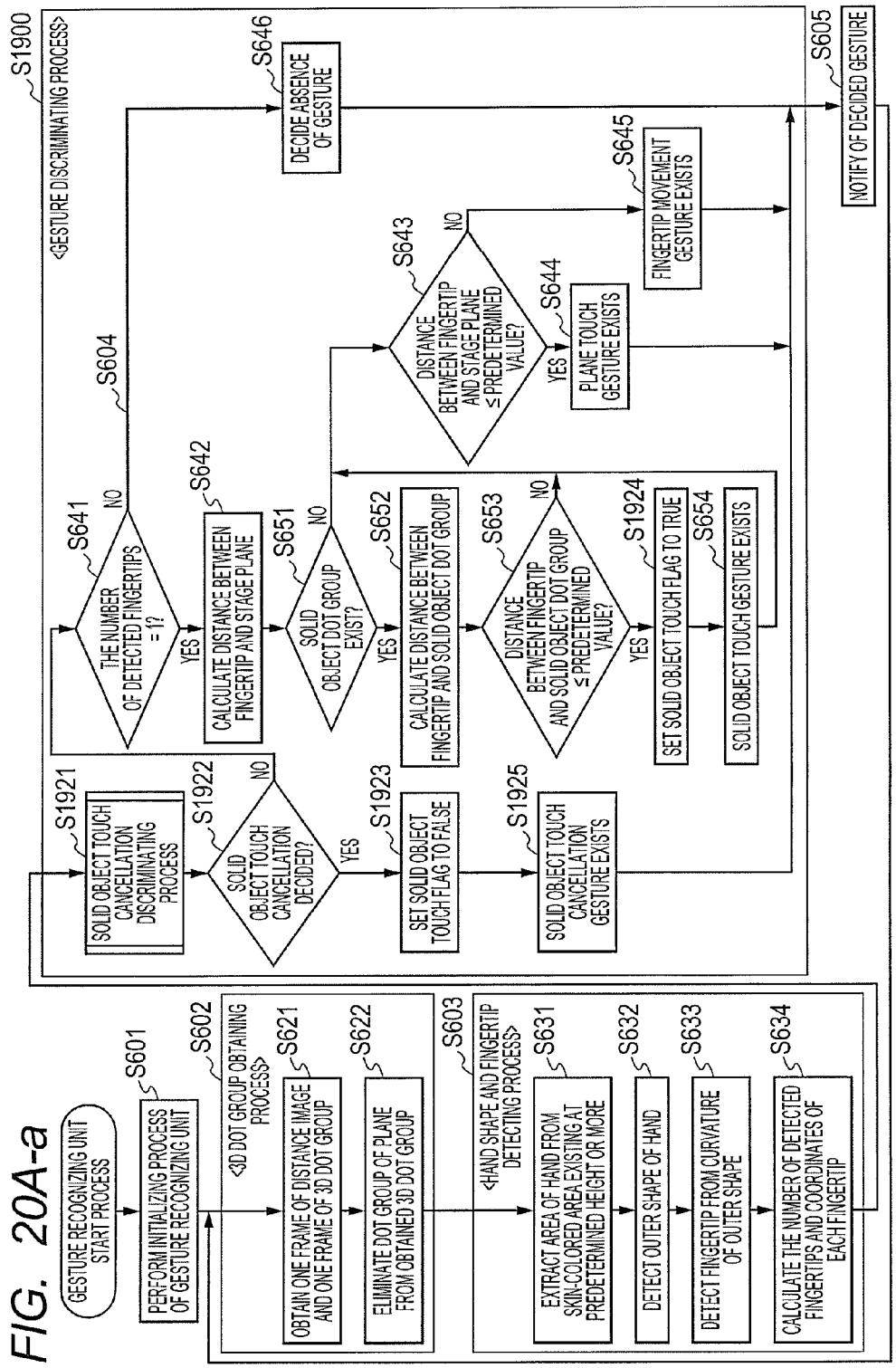
FIG. 20A-a

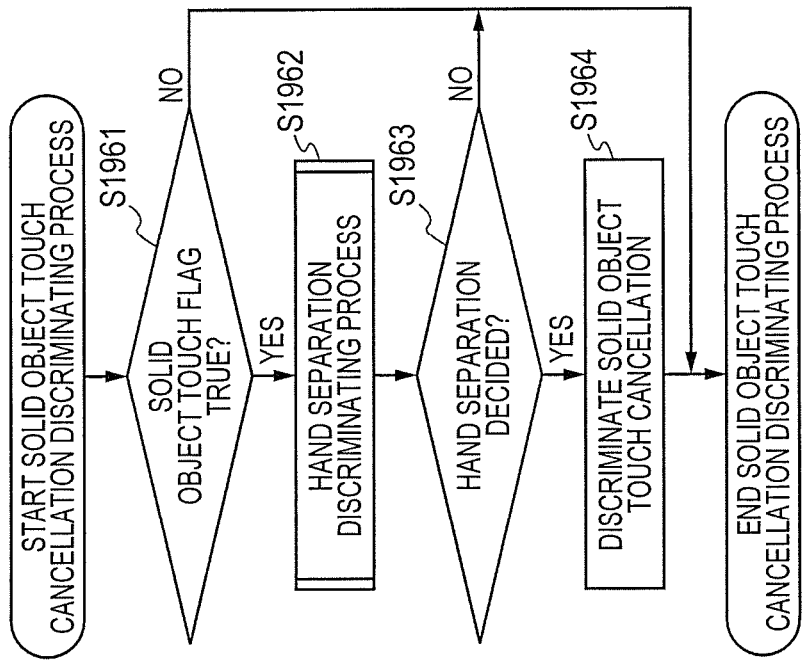
FIG. 20A-c
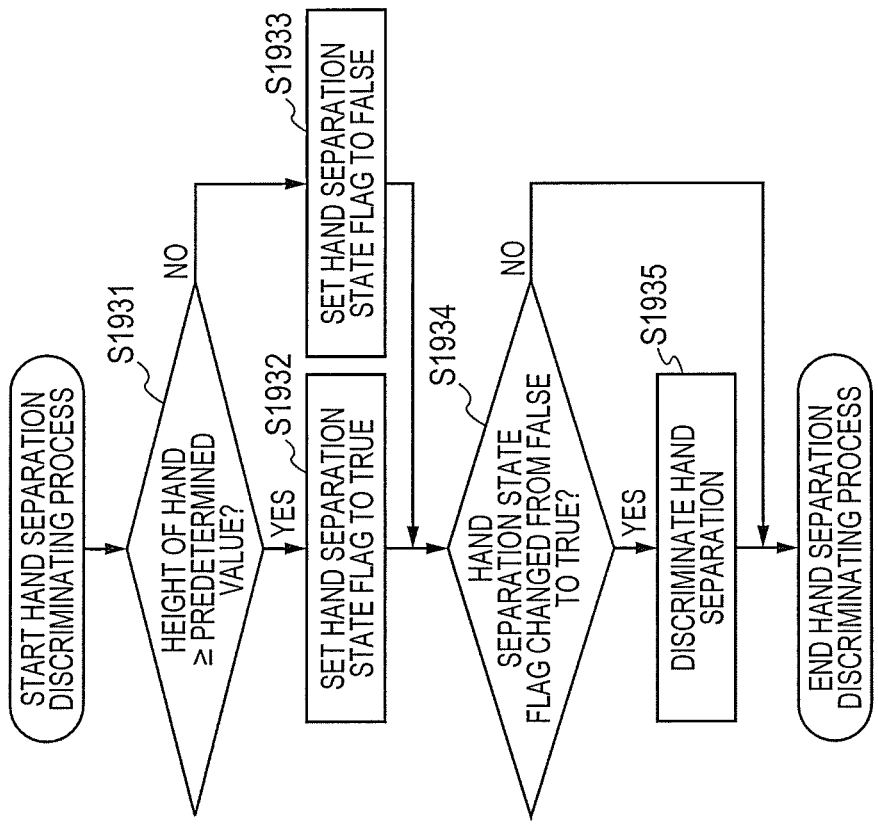
FIG. 20A-b

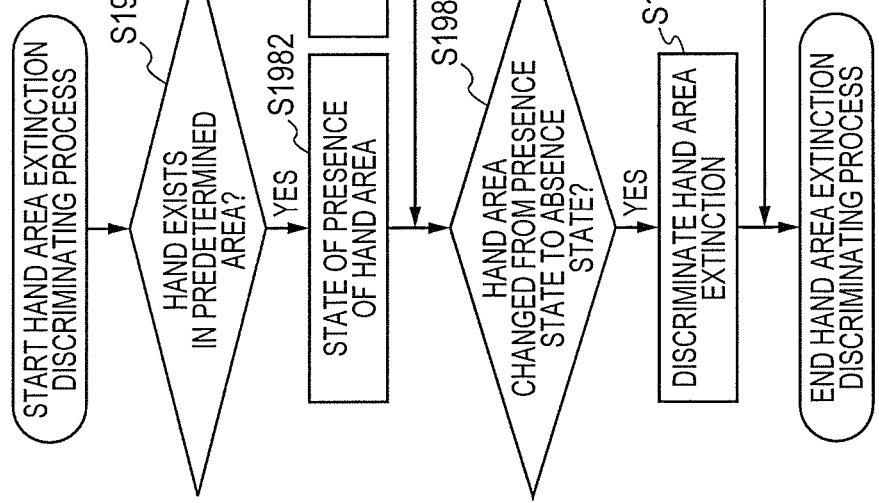
FIG. 20A-e
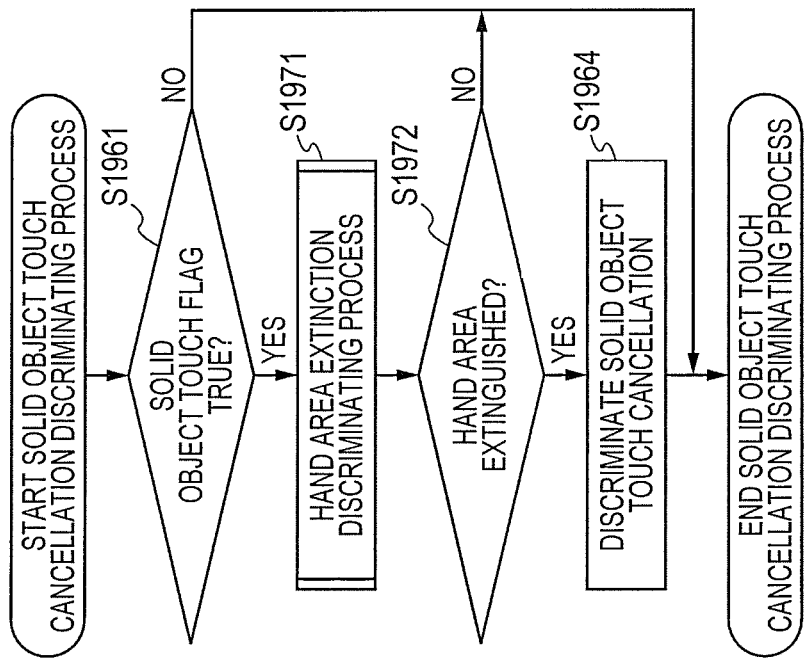
FIG. 20A-d

FIG. 20B-f
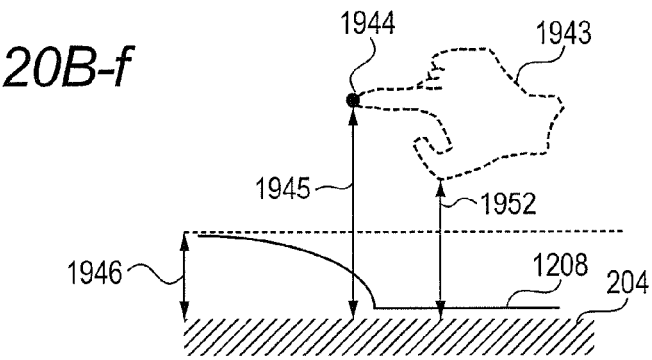
FIG. 20B-h
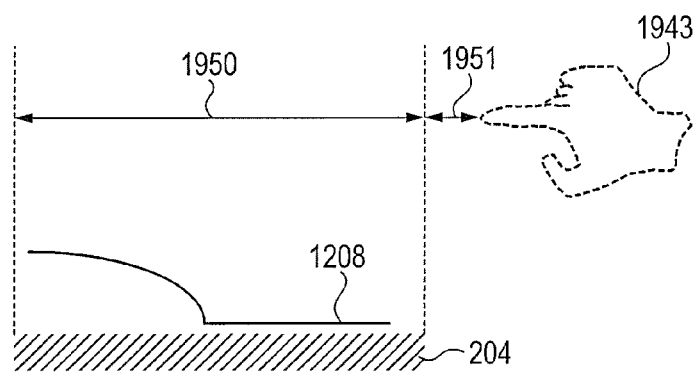
FIG. 20B-g
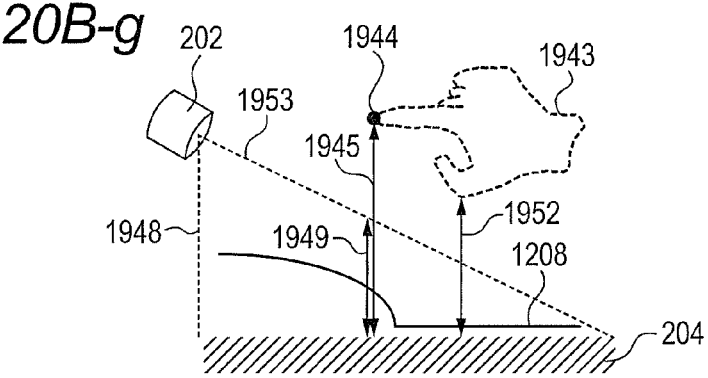

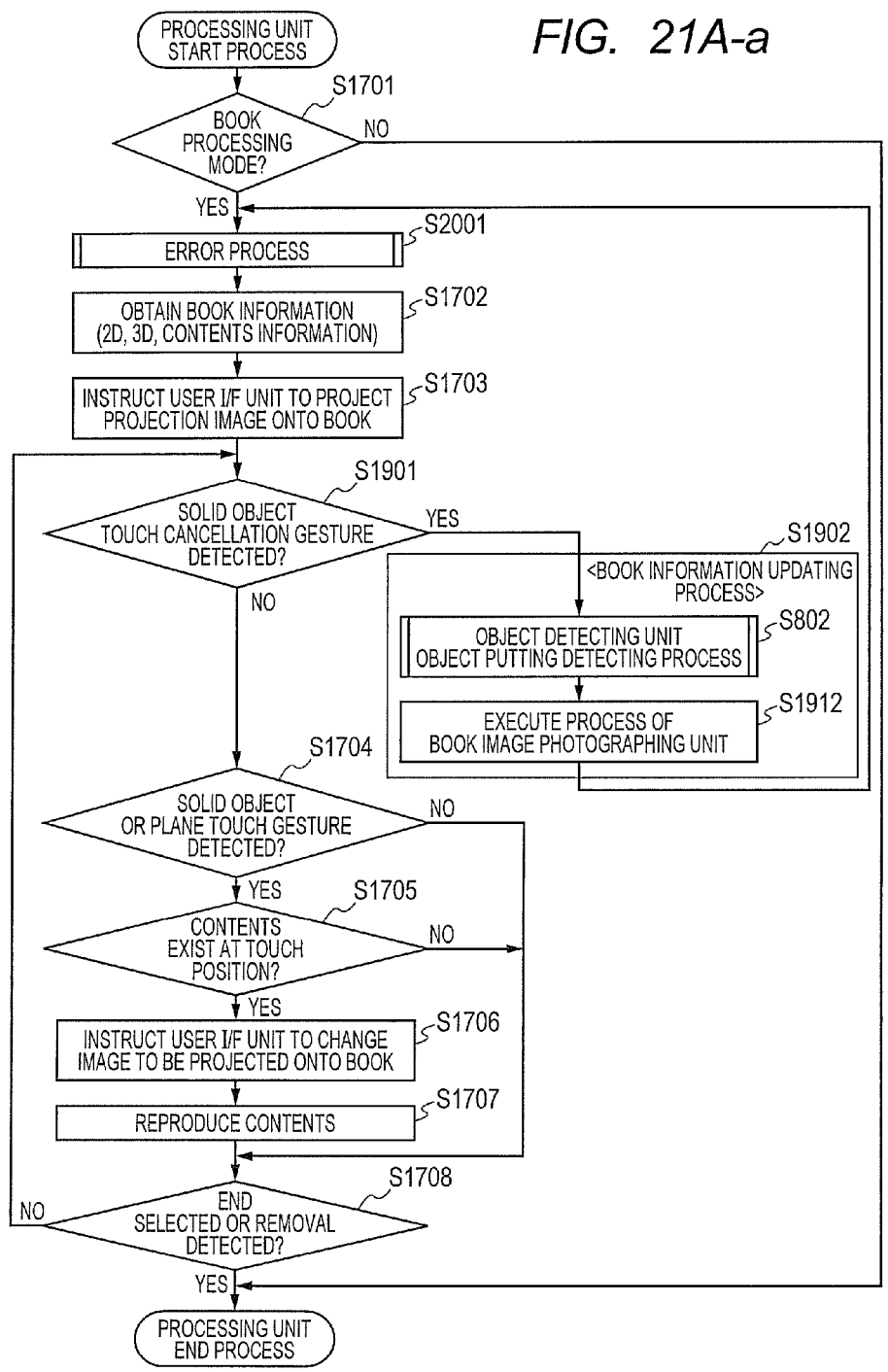
FIG. 21A-a

FIG. 21A-b
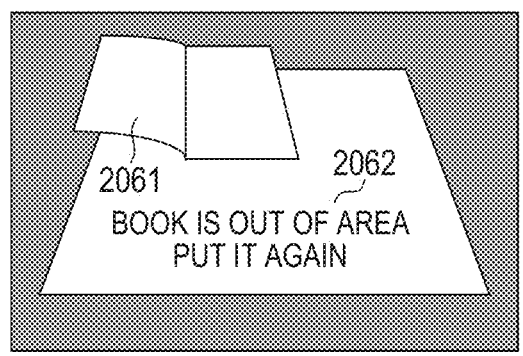
FIG. 21A-c
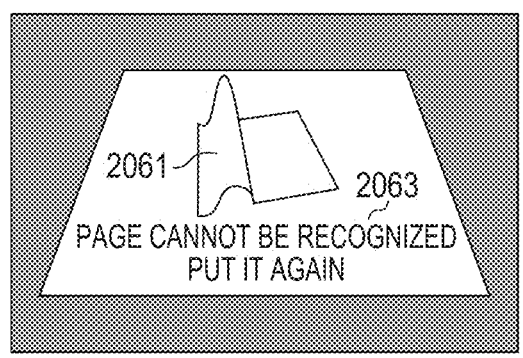
FIG. 21A-d
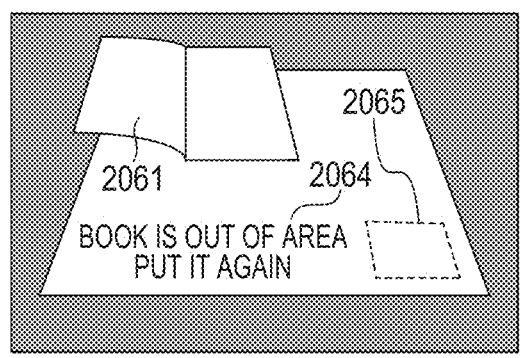

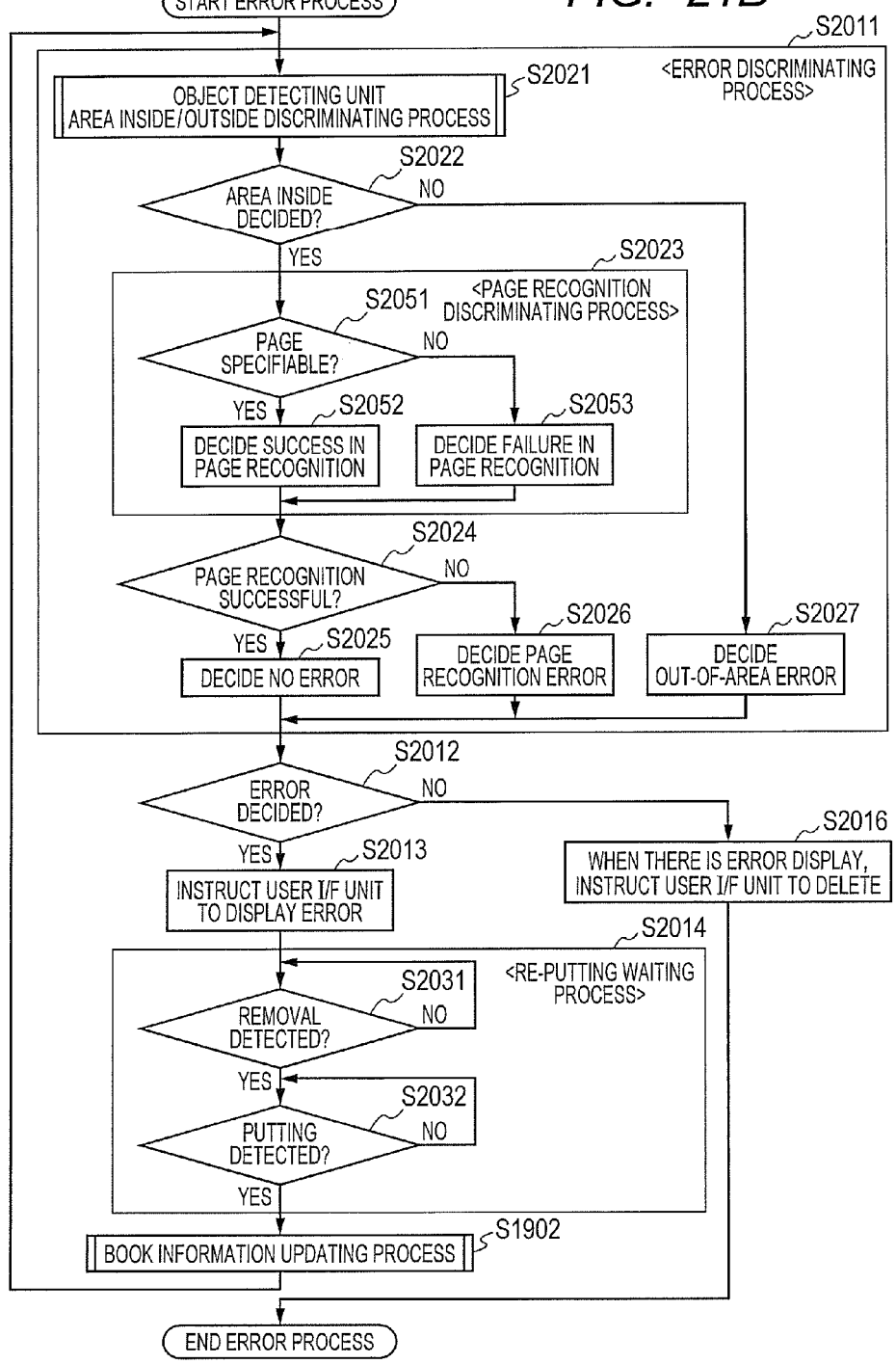

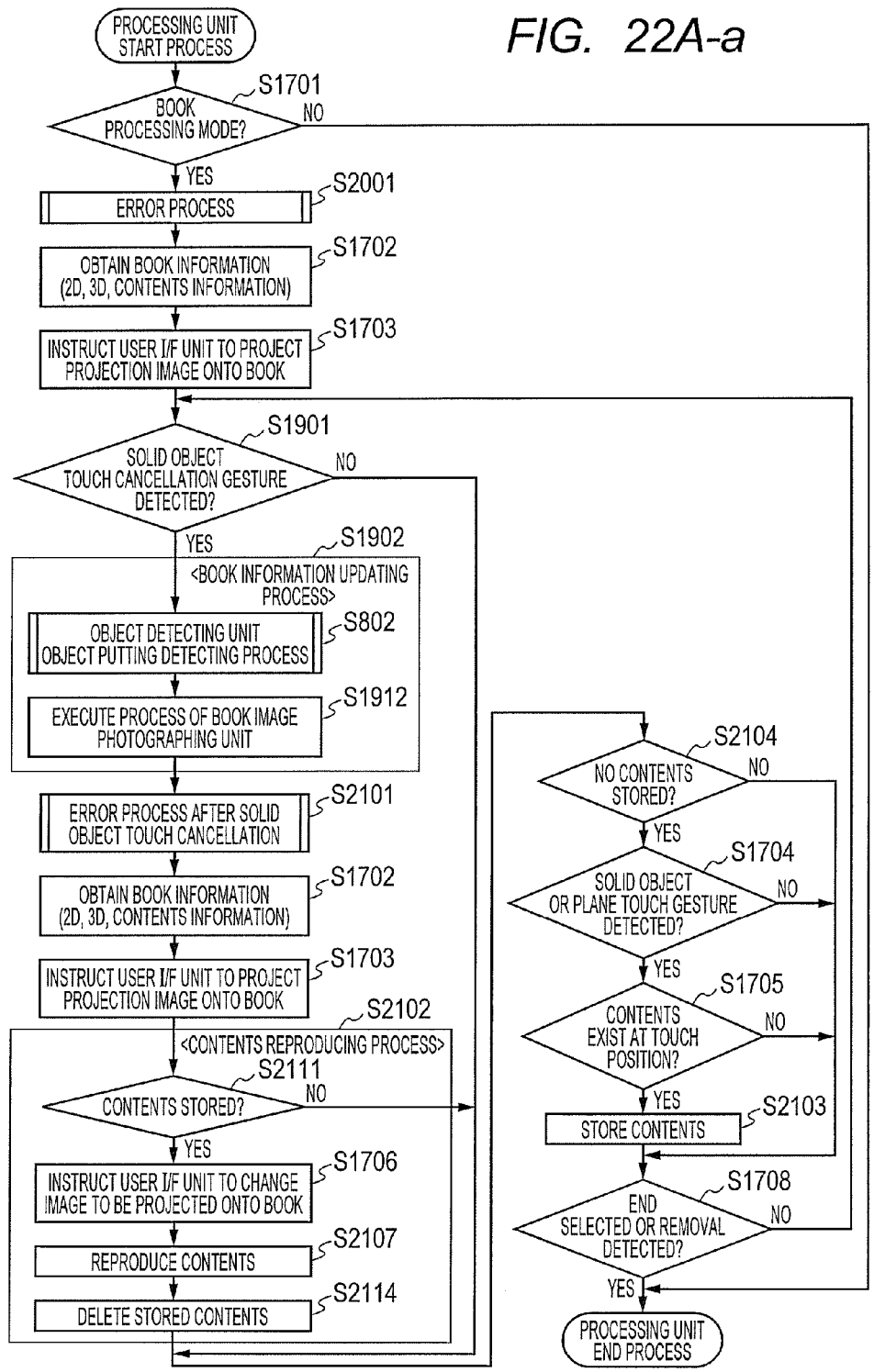
FIG. 22A-a

FIG. 22A-b
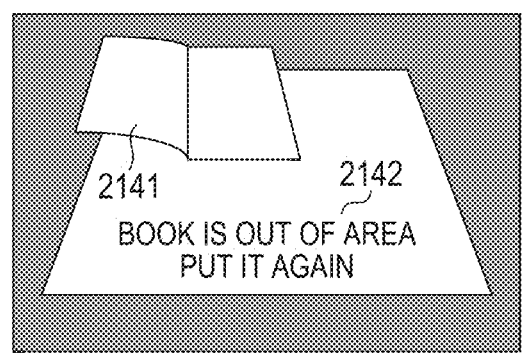
FIG. 22A-c
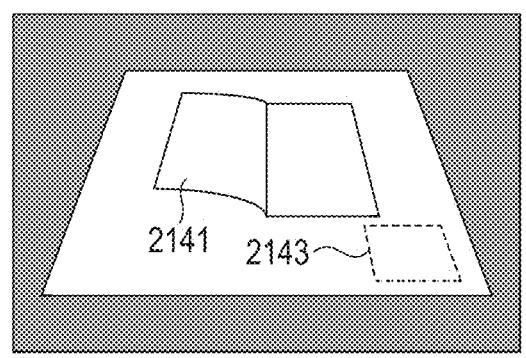

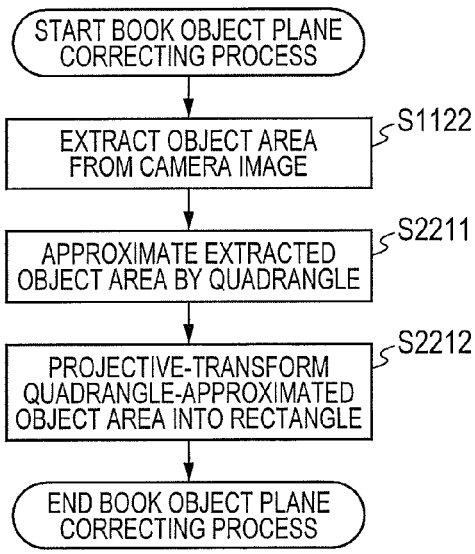
FIG. 23C-a
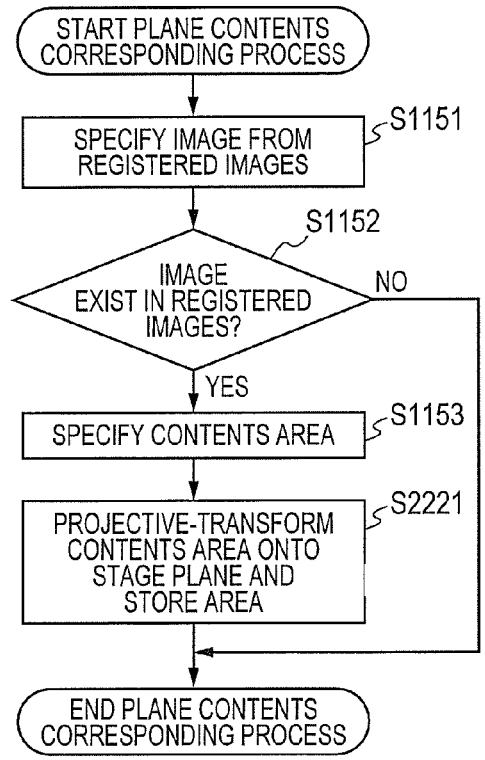
FIG. 23C-b
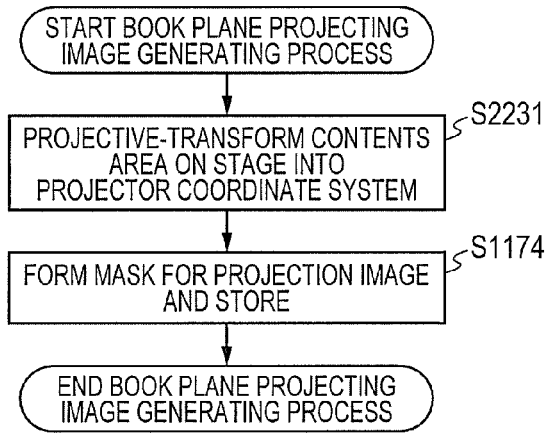
FIG. 23C-c

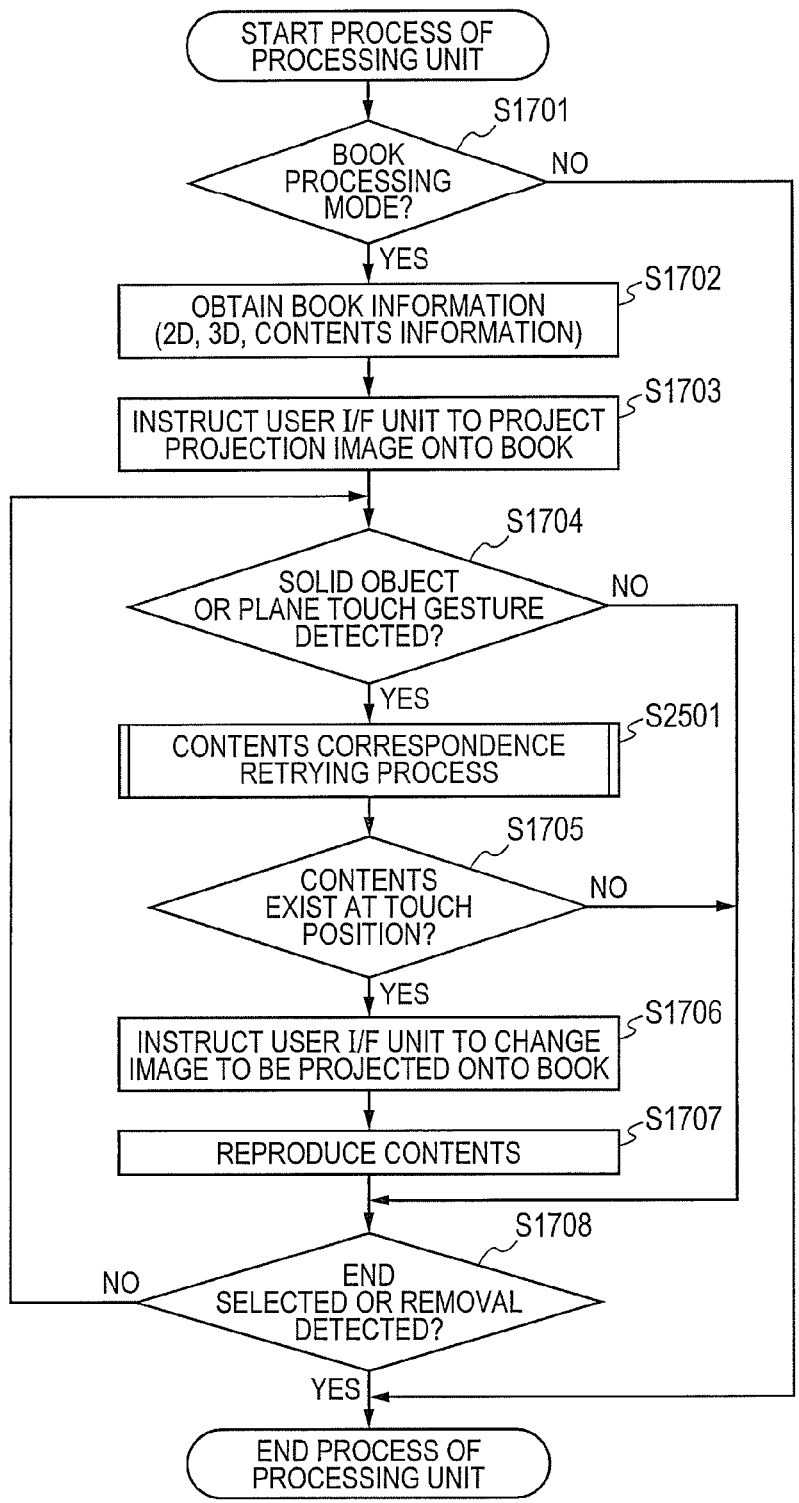
FIG. 25-a

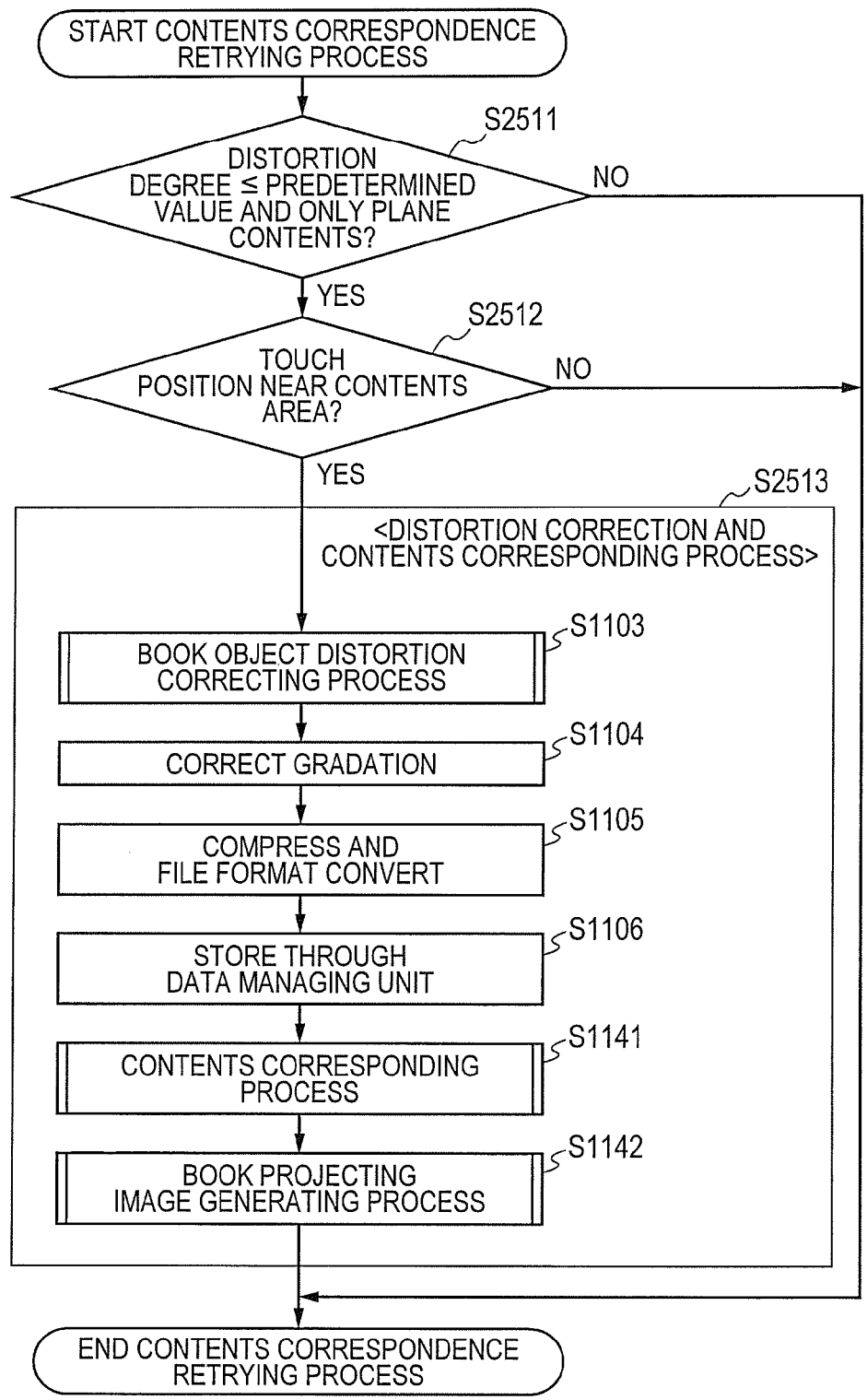
FIG. 25-b

IMAGE PROCESSING APPARATUS, INFORMATION PROCESSING METHOD, AND PROGRAM

BACKGROUND OF THE INVENTION

Field of the Invention

The present invention relates to an image processing apparatus, an information processing method, and a program.

Description of the Related Art

In the related arts, in the case of scanning a document and storing as electronic data, there are a line scanner using a line sensor for image pickup and a camera scanner using a two-dimensional imaging sensor. Particularly, in the case of the camera scanner in which a camera is disposed over an original putting stage (hereinbelow, simply referred to as "stage") and an original is put onto the stage in a face-up state and is photographed, when one sheet of original is photographed, it can be rapidly scanned merely by putting the original, and even the thick original like a book can be easily put onto the stage and scanned. Further, such a camera scanner that not only a document such as paper or book but also a solid object is put onto a stage and a solid shape is scanned has been disclosed in the Official Gazette of Japanese Patent No. 4012710.

In the camera scanner disclosed in the Official Gazette of Japanese Patent No. 4012710, a light projecting unit is provided together with a camera for imaging, a measurement pattern which is projected from the light projecting unit is photographed, and the solid shape is measured based on a principle of triangular surveying. According to the camera scanner, the solid shape of the object put on the stage is calculated, whether the object is a flat original, a book, or a solid object is discriminated, and the photographing is performed in a proper photographing mode in accordance with the object type.

According to a camera scanner disclosed in the Official Gazette of Japanese Patent No. 3954436, it has a construction similar to that mentioned above, a measurement pattern is always projected by a light projecting unit from timing when no object is put on a stage, and a solid shape is continuously measured, thereby detecting that an object has been put on the stage.

A technique regarding a user interface using a projector, a camera, and a distance sensor has been disclosed. According to such a technique, by projecting the user interface from the projector, a display can be superimposed onto an actual object such as paper or the like. Therefore, the user can handle the actual object as an interface with electronic data.

The Official Gazette of Japanese Patent No. 3834766 discloses a technique regarding such a user interface that a computer display screen is projected onto a desk from a projector and the computer display screen is operated by a fingertip. An infrared camera is used to detect the fingertip. According to such a technique, by reading a bar code printed on a paper document, a book, or the like on the desk, a link with electronic information can be formed.

The Official Gazette of Japanese Patent Application Laid-Open No. 2013-34168 discloses a technique regarding a user interface having a construction using a camera which can obtain a color image and a distance image and a projector. According to such a technique, a shape of a projecting plane of the projector is measured based on the distance image and an image to be projected is deformed, thereby performing a projection according to a change in relative position between a projection target and the projector. According to such a technique, by using the color image and the distance image, a gesture operation such as a touch operation which is executed by a fingertip onto a plane of the object surface or the like is enabled. According to such a technique, the user points a desired position on a paper document serving as a plane by the fingertip, contents of the position pointed by the user is specified, and an electronic process according to the gesture is executed. For example, according to such a technique, when the user traces a character train on the paper document by a finger, the traced character train is selected, and the selected character train is projected by the projector.

The Official Gazette of Japanese Patent Application Laid-Open No. 2012-208705 discloses such a technique that to a virtual object which can be stereoscopically viewed on a space, whether or not a fingertip of the user has been come into contact with such an object on the space is discriminated, and if the fingertip has been come into contact with the object, a display of the virtual object is changed.

However, in the camera scanners disclosed in the Official Gazettes of Japanese Patent Nos. 4012710 and 3954436, since a user interface unit is limited, it is difficult to improve the operability to the user.

In a user interface system disclosed in the Official Gazette of Japanese Patent No. 3834766, although an intuitive operation by the fingertip can be performed, a target of an object which is put onto the desk is limited only to a document such as paper document or book. Therefore, according to such a technique, it is difficult to execute an operation to an object such as a solid object other than a document put on the desk, and it is also difficult to make such dynamic control that the operability is changed in accordance with a feature of a target such as paper document or book.

In a user interface system disclosed in the Official Gazette of Japanese Patent Application Laid-Open No. 2013-34168, although a projection or a touch operation to paper or the like in which a relative positional relation with the projector changes is enabled, the touch detection is performed to the plane and it is difficult to detect a touch to a curved shape of a book or a touch to an object having a complicated shape. According to such a technique, the user points the contents of the paper document serving as a plane by the finger and a process according to the gesture can be executed to the contents. However, in this case, since the target is a plane, it is also difficult that an object having a solid shape such as a book object is handled as an interface with electronic data.

In a system disclosed in the Official Gazette of Japanese Patent Application Laid-Open No. 2012-208705, a touch operation by the finger of the user to a virtual solid object is enabled. However, according to a touch operation to an actual object, unlike a touch operation to a virtual object, a target to be touched is moved or distorted by the touch. In the system in the related arts, it is impossible to detect a touch to an object also in consideration of physical changes which occur actually.

It is, therefore, an aspect of the invention to improve the operability of the user in an image processing apparatus such as a camera scanner or the like.

SUMMARY OF THE INVENTION

According to an aspect of the invention, there is provided an image processing apparatus comprising: a pickup image obtaining unit configured to obtain a pickup image on a stage through an imaging unit; a distance image obtaining unit configured to obtain a distance image on the stage through a solid measuring unit; a solid information obtaining unit configured to obtain solid information of a solid object put on the stage on the basis of the pickup image of the solid object obtained by the pickup image obtaining unit and the distance image of the solid object obtained by the distance image obtaining unit; a projecting unit configured to project a projection image showing a contents area onto the solid object through a projector on the basis of the solid information obtained by the solid information obtaining unit; and a processing unit configured to execute the contents in accordance with a gesture of a user to the projection image projected by the projecting unit.

According to the invention, an operability of the user in the image processing apparatus such as a camera scanner or the like can be improved.

Further features of the present invention will become apparent from the following description of exemplary embodiments with reference to the attached drawings.

BRIEF DESCRIPTION OF THE DRAWINGS

FIGS. 2-*a*, 2-*b*, and 2-*c* are diagrams illustrating an example of an external view of a camera scanner.

FIGS. 4-*a* and 4-*b* are diagrams illustrating an example of a functional construction and the like of the camera scanner.

FIGS. 5-*a*, 5-*b*, 5-*c*, and 5-*d* are a flowchart and the like illustrating an example of a process of a distance image obtaining unit of an embodiment 1.

FIGS. 7-*a*, 7-*b*, 7-*c*, and 7-*d* are schematic diagrams for describing a fingertip detecting process.

FIGS. 8-*a*, 8-*b*, and 8-*c* are flowcharts illustrating an example of a process of an object detecting unit of the embodiment 1.

FIGS. 10-*a*, 10-*b*, 10-*c*, 10-*d*, 10-*e*, 10-*f*, 10-*g*, and 10-*h* are schematic diagrams for describing the process of the flat original image photographing unit.

FIGS. 11A-a and 11A-b are flowcharts (part 1) illustrating an example of a process of a book image photographing unit of the embodiment 1.

FIGS. 11B-c, 11B-d, and 1B-e are flowcharts (part 2) illustrating an example of the process of the book image photographing unit of the embodiment 1.

FIGS. 12A-a, 12A-b, 12A-c, 12A-d, 12A-e, 12A-f, 12A-g, and 12A-h are schematic diagrams (part 1) for describing the process of the book image photographing unit.

FIGS. 12B-i, 12B-j, 12B-k, 12B-l, 12B-m, 12B-n, 12B-o, and 12B-p are schematic diagrams (part 2) for describing the process of the book image photographing unit.

FIGS. 12C-q, 12C-r, 12C-s, 12C-t, and 12C-u are schematic diagrams (part 3) for describing the process of the book image photographing unit.

FIGS. 13-*a* and 13-*b* are flowcharts illustrating an example of a process of a solid shape measuring unit of the embodiment 1.

FIGS. 14-*a*, 14-*b*, 14-*c*, 14-*d*, 14-*e*, and 14-*f* are schematic diagrams for describing the process of the solid shape measuring unit.

FIGS. 16-*a*, 16-*b*, and 16-*c* are diagrams illustrating an example of a projecting screen on a stage of the embodiment 1.

FIGS. 17-*a*, 17-*b*, and 17-*c* are a flowchart and the like illustrating an example of a process of a processing unit of the embodiment 1.

FIGS. 18-*a*, 18-*b*, and 18-*c* are diagrams illustrating an example of management of contents information.

FIGS. 19-*a* and 19-*b* are a flowchart and the like illustrating an example of a process of a processing unit of an embodiment 2.

FIGS. 20A-a, 20A-b, 20A-c, 20A-d, and 20A-e are flowcharts illustrating an example of a process of a gesture recognizing unit of the embodiment 2.

FIGS. 20B-f, 20B-g, and 20B-h are schematic diagrams for describing a hand separation discriminating process and the like.

FIGS. 21A-a, 21A-b, 21A-c, and 21A-d are a flowchart (part 1) and the like illustrating an example of a process of a processing unit of an embodiment 3.

FIG. 21B is a flowchart (part 2) illustrating an example of the process of the processing unit of the embodiment 3.

FIG. 21C is a flowchart illustrating an example of a process of an object detecting unit of the embodiment 3.

FIGS. 22A-a, 22A-b, and 22A-c are a flowchart (part 1) and the like illustrating an example of a process of a processing unit of an embodiment 4.

FIG. 22B is a flowchart (part 2) illustrating an example of the process of the processing unit of the embodiment 4.

FIGS. 23C-a, 23C-b, and 23C-c are flowcharts (part 2) illustrating an example of the process of the book image photographing unit of the embodiment 5.

FIGS. 25-*a* and 25-*b* are flowcharts illustrating an example of a process of a processing unit of the embodiment 6.

DESCRIPTION OF THE EMBODIMENTS

Preferred embodiments of the present invention will now be described in detail hereinbelow in accordance with the accompanying drawings.

Embodiment 1

Figure 1:
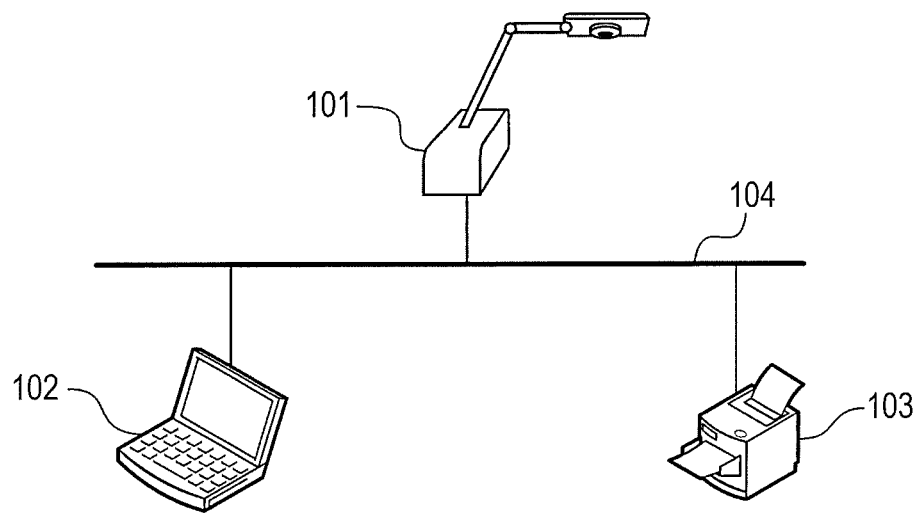
FIG. 1 is a diagram illustrating an example of a system construction.

FIG. 1 is a diagram illustrating an example of a system construction including a camera scanner 101 according to an embodiment.

As illustrated in FIG. 1, the camera scanner 101 is connected to a host computer 102 and a printer 103 by a network 104 such as Ethernet (registered trademark) or the like. The camera scanner 101 is an example of an image processing apparatus. In the system construction of FIG. 1, a scanning function for reading an image from the camera scanner 101 and a printing function for outputting scan data by the printer 103 can be executed by instructions from the host computer 102. The scanning function and the printing function can be also executed by directly instructing the camera scanner 101 without using the host computer 102.

(Construction of Camera Scanner)

FIGS. 2-a to 2-c are diagrams illustrating an example of an external view of the camera scanner 101 according to the embodiment.

As illustrated in FIG. 2-a, the camera scanner 101 includes a controller unit 201, a camera unit 202, an arm portion 203, a short focus projector 207 (hereinbelow, referred to as a projector 207), and a distance image sensor unit 208. The controller unit 201 serving as a main body of the camera scanner 101, the camera unit 202 to perform an image pickup, the projector 207, and the distance image sensor unit 208 are coupled by the arm portion 203. The arm portion 203 can be bent and extended by using a joint. The camera unit 202 is an example of an imaging unit for obtaining a pickup image. The projector 207 is an example of a projecting unit for projecting an operation display screen (operation display) which is used by the user to operate and will be described hereinafter. The distance image sensor unit 208 is an example of a solid measuring unit for obtaining a distance image.

A stage 204 over which the camera scanner 101 has been disposed is also illustrated in FIG. 2-a. Lenses of the camera unit 202 and the distance image sensor unit 208 are arranged so as to be directed in four directions of the stage 204 and can read an image in a reading area 205 surrounded by a broken line. In the example of FIGS. 2-a to 2-c, since an original 206 is put in the reading area 205, it can be read by the camera scanner 101. A turntable 209 is provided in the stage 204. The turntable 209 can be rotated by an instruction from the controller unit 201 and can change an angle between a substance (object to be photographed) put on the turntable 209 and the camera unit 202.

Although the camera unit 202 may photograph an image at a single resolution, it is desirable that a high resolution image and a low resolution image can be photographed.

Although not shown in FIGS. 2-a to 2-c, the camera scanner 101 can also further include an LCD touch panel 330 and a speaker 340.

FIG. 2-b shows a coordinate system in the camera scanner 101. In the camera scanner 101, coordinate systems such as camera coordinate system, distance image coordinate system, and projector coordinate system are defined to each hardware device. Those coordinate systems have been defined on the assumption that an image plane which is photographed by an RGB camera of the camera unit 202 and the distance image sensor unit 208 or an image plane which is projected by the projector 207 is an XY plane and a direction which perpendicularly crosses the image plane is a Z direction. Further, in order to enable 3-dimensional data of those independent coordinate systems to be unitedly handled, a plane including the stage 204 is assumed to be an XY plane and an orthogonal coordinate system in which a direction which vertically upwardly directed from the XY plane is the Z axis is defined.

As an example of a case of converting the coordinate system, relations among the orthogonal coordinate system, a space expressed by using the camera coordinate system in which the camera unit 202 is set to a center, and an image plane which is photographed by the camera unit 202 are illustrated in FIG. 2-c. A 3-dimensional dot P[X, Y, Z] in the orthogonal coordinate system can be converted into a 3-dimensional dot $P_c[X_c, Y_c, Z_c]$ in the camera coordinate system by the following equation (1).

$$[X_c, Y_c, Z_c]^T = [R_c | t_c][X, Y, Z, 1]^T \qquad (1)$$

Where, $R_c$ and $t_c$ are constructed by an external parameter which is decided by an attitude (rotation) and a position (translation) of the camera to the orthogonal coordinate system, $R_c$ is called a matrix of revolution of 3×3, and $t_c$ is called a translation vector. On the contrary, the 3-dimensional dot defined by the camera coordinate system can be converted into the orthogonal coordinate system by the following equation (2).

$$[X, Y, Z]^T = [R_c^{-1} | -R_c^{-1} t_c][X_c, Y_c, Z_c, 1]^T \qquad (2)$$

Further, a 2-dimensional camera image plane which is photographed by the camera unit 202 is a plane in which 3-dimensional information in a 3-dimensional space has been converted into 2-dimensional information by the camera unit 202. That is, the 3-dimensional information can be converted into the 2-dimensional information by perspective projection converting the 3-dimensional dot $P_c[X_c, Y_c, Z_c]$ on the camera coordinate system into 2-dimensional coordinates $p_c[x_p, y_p]$ in the camera image plane by the following equation (3).

$$\lambda [x_p, y_p, 1]^T = A[X_c, Y_c, Z_c]^T \qquad (3)$$

Where, A is called an internal parameter of the camera and is a matrix of 3×3 which is expressed by a focal distance, an image center, and the like.

As mentioned above, by using the equations (1) and (3), the 3-dimensional dot group expressed by the orthogonal coordinate system can be converted into the 3-dimensional dot group coordinates in the camera coordinate system or into the camera image plane. It is assumed that the internal parameter of each hardware device and the position attitude (external parameter) to the orthogonal coordinate system have previously been calibrated by a well-known calibrating method. It is assumed hereinbelow that the 3-dimensional dot group denotes 3-dimensional data (solid data) in the orthogonal coordinate system unless otherwise specified.

(Hardware Construction of Controller of Camera Scanner)

Figure 3:
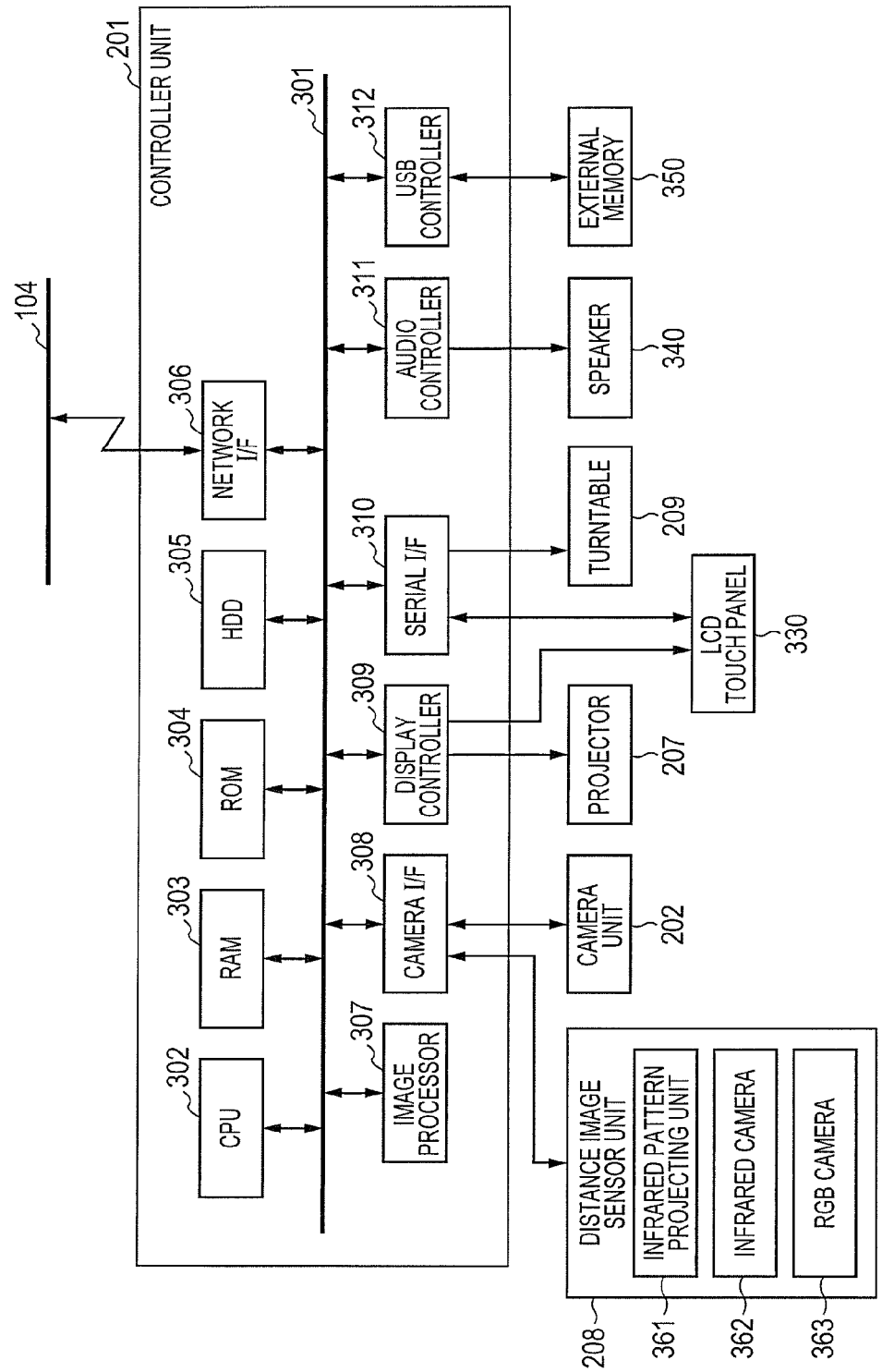
FIG. 3 is a diagram illustrating an example of a hardware construction of the camera scanner.

FIG. 3 is a diagram illustrating an example of a hardware construction such as a controller unit 201 serving as a main body of the camera scanner 101 and the like.

As illustrated in FIG. 3, the controller unit 201 includes a CPU 302, a RAM 303, a ROM 304, an HDD 305, a network I/F 306, an image processor 307, a camera I/F 308, a display controller 309, a serial I/F 310, an audio controller 311, and a USB controller 312 connected to a system bus 301. The CPU 302 is a central processing unit for controlling the whole operation of the controller unit 201. The RAM 303 is a volatile memory. The ROM 304 is a non-volatile memory. A program for activating the CPU 302 has been stored in the ROM 304. The HDD 305 is a hard disk drive (HDD) having a capacity larger than that of the RAM 303. A program which is used to control the camera scanner 101 and is executed by the controller unit 201 has been stored in the HDD 305. The CPU 302 executes the program stored in the ROM 304 or the HDD 305, so that a functional construction of the camera scanner 101 and processes (information process) of flowcharts, which will be described hereinafter, are realized.

At the time of activation such as power-on or the like, the CPU 302 executes the activating program stored in the ROM 304. The activating program is provided for the CPU 302 to read out the controlling program stored in the HDD 305 and develop into the RAM 303. When the activating program is executed, the CPU 302 subsequently executes the controlling program developed in the RAM 303 and makes control. The CPU 302 also stores data which is used for the operation by the controlling program into the RAM 303 and performs the reading/writing operation. Various kinds of settings necessary for the operation by the controlling program and image data generated by a camera input can be further stored in the HDD 305 and are read/written by the CPU 302. The CPU 302 communicates with other equipment connected to the network 104 through the network I/F 306.

The image processor 307 reads out the image data stored in the RAM 303, processes, and writes back the processed data into the RAM 303. The image processes which are executed by the image processor 307 are a rotation, a zoom, a color conversion, and the like.

The camera I/F 308 is connected to the camera unit 202 and the distance image sensor unit 208, obtains the image data from the camera unit 202 and the distance image data from the distance image sensor unit 208 and writes the obtained data into the RAM 303 in response to instructions from the CPU 302. The camera I/F 308 transmits control commands from the CPU 302 to the camera unit 202 and the distance image sensor unit 208 and makes settings of the camera unit 202 and the distance image sensor unit 208.

The controller unit 201 can further include at least one of the display controller 309, serial I/F 310, audio controller 311, and USB controller 312.

The display controller 309 controls a display of the image data to a display in response to an instruction from the CPU 302. The display controller 309 is now connected to the projector 207 and the LCD touch panel 330. The serial I/F 310 is connected to the turntable 209 and transmits instructions of a start/stop of the rotation and a rotation angle from the CPU 302 to the turntable 209. The serial I/F 310 is also connected to the LCD touch panel 330. When the LCD touch panel 330 is depressed, the CPU 302 obtains coordinates of the depressed position through the serial I/F 310.

The audio controller 311 is connected to the speaker 340, converts audio data into an analog audio signal in response to an instruction from the CPU 302, and generates an audio sound from the speaker 340.

The USB controller 312 controls an externally-attached USB device in response to an instruction from the CPU 302. In this instance, the USB controller 312 is connected to an external memory 350 such as USB memory, SD card, or the like and reads out or writes data from/into the external memory 350.

(Functional Construction of Camera Scanner)

FIG. 4-*a* is a diagram illustrating an example of a functional construction 401 of the camera scanner 101 which is realized by executing the controlling program by the CPU 302. FIG. 4-*b* is a sequence diagram illustrating relations among respective modules in the functional construction 401.

The controlling program of the camera scanner 101 is stored in the HDD 305 as mentioned above. Upon activation, the CPU 302 develops the controlling program into the RAM 303 and executes.

A main control unit 402 functions as a center of the control and controls each of the other modules in the functional construction 401 as illustrated in FIG. 4-*b*.

An image obtaining unit 416 is a module for executing an image inputting process and is constructed by a camera image obtaining unit 407 and a distance image obtaining unit 408. The camera image obtaining unit 407 obtains the image data which is output from the camera unit 202 through the camera I/F 308 and stores into the RAM 303 (pickup image obtaining process). The distance image obtaining unit 408 obtains the distance image data which is output from the distance image sensor unit 208 through the camera I/F 308 and stores into the RAM 303 (distance image obtaining process). A process of the distance image obtaining unit 408 will be described in detail with reference to FIGS. 5-*a* to 5-*d*.

A recognition processing unit 417 is a module for detecting a motion of an object on the stage 204 from the image data obtained by the camera image obtaining unit 407 and the distance image obtaining unit 408 and recognizing. The recognition processing unit 417 is constructed by a gesture recognizing unit 409 and an object detecting unit 410. The gesture recognizing unit 409 continuously obtains an image on the stage 204 from the image obtaining unit 416. When a gesture such as a touch or the like is detected, the gesture recognizing unit 409 notifies the main control unit 402 of it. When a notification of an object putting waiting process or an object removal waiting process is received from the main control unit 402, the object detecting unit 410 obtains an image obtained by photographing the stage 204 from the image obtaining unit 416. The object detecting unit 410 executes a process for detecting timing when an object is put onto the stage 204 and rests thereon or timing when the object is removed. The processes of the gesture recognizing unit 409 and the object detecting unit 410 will be described in detail with reference to FIGS. 6 to 8-*c*.

A scan processing unit 418 is a module for actually scanning a target and is constructed by a flat original image photographing unit 411, a book image photographing unit 412, and a solid shape measuring unit 413. The flat original image photographing unit 411 executes a process (reading process) suitable for a flat original and outputs data (read image) in a format corresponding to the process. Similarly, the book image photographing unit 412 executes a process suitable for a book and outputs data in a format corresponding to the process. Likewise, the solid shape measuring unit 413 executes a process suitable for a solid object and outputs data in a format corresponding to the process. The processes of those modules will be described in detail with reference to FIGS. 9 to 14-*f*.

A user interface (I/F) unit 403 receives a request from the main control unit 402 and generates GUI parts such as message, button, and the like. The GUI parts mentioned here denote an example of objects constructing an operation display. The user I/F unit 403 requests a display unit 406 to display the generated GUI parts. The display unit 406 displays the requested GUI parts to the projector 207 or the LCD touch panel 330 through the display controller 309. Since the projector 207 is disposed so as to face the stage 204, it can project the GUI parts onto the stage. The user I/F unit 403 receives a gesture operation such as a touch or the like recognized by the gesture recognizing unit 409 or an inputting operation from the LCD touch panel 330 through the serial I/F 310, and further, their coordinates. The user I/F unit 403 discriminates operation contents (depressed button or the like) by making the contents of an operation display screen which is being drawn correspond to operation coordinates. The user I/F unit 403 notifies the main control unit 402 of the operation contents, thereby receiving the operation of the operator.

A network communicating unit 404 communicates with another equipment on the network 104 by TCP/IP through the network I/F 306.

A data managing unit 405 stores various kinds of data such as work data and the like generated by executing the controlling program by the CPU 302 into a predetermined area in the HDD 305 and manages them. For example, the above data is scan data generated by the flat original image photographing unit 411, the book image photographing unit 412, and the solid shape measuring unit 413 and the like.

A processing unit 414 executes various kinds of processes in application processes, which will be described hereinafter, such as a reproduction of contents in the camera scanner 101 and the like. At this time, the processing unit 414 obtains output data of the foregoing respective modules such as image data obtained by the camera image obtaining unit 407 and the distance image obtaining unit 408, gesture information obtained by the gesture recognizing unit 409, and the like through the main control unit 402. The application processes will be described in detail hereinafter.

(Description of Distance Image Sensor Unit and Distance Image Obtaining Unit)

FIG. 3 is a diagram illustrating a construction of the distance image sensor unit 208. The distance image sensor unit 208 is a distance image sensor of a pattern projection system by infrared rays. An infrared pattern projecting unit 361 projects a 3-dimensional measurement pattern onto a target by the infrared rays which are invisible to the human eyes. An infrared camera 362 is a camera for reading the 3-dimensional measurement pattern projected to the target. An RGB camera 363 is a camera for photographing visible light which is visible to the human eyes by RGB signals.

The process of the distance image obtaining unit 408 will be described with reference to a flowchart of FIG. 5-a. FIGS. 5-b to 5-d are diagrams for describing a measurement principle of a distance image by the pattern projection system.

When the process is started, in S501, the distance image obtaining unit 408 projects a 3-dimensional shape measurement pattern (solid shape measurement pattern) 522 by the infrared rays onto a target 521 by using the infrared pattern projecting unit 361 as illustrated in FIG. 5-b.

In S502, the distance image obtaining unit 408 obtains an RGB camera image 523 obtained by photographing the target by using the RGB camera 363 and an infrared camera image 524 obtained by photographing the 3-dimensional shape measurement pattern 522 projected in S501 by using the infrared camera 362. Since putting positions of the infrared camera 362 and the RGB camera 363 differ, photographing areas of the two images of the RGB camera image 523 and infrared camera image 524 which are respectively photographed differ as illustrated in FIG. 5-c.

In S503, the distance image obtaining unit 408 matches the infrared camera image 524 with the coordinate system of the RGB camera image 523 by using the coordinate system conversion from the coordinate system of the infrared camera 362 into the coordinate system of the RGB camera 363. It is assumed that relative positions of the infrared camera 362 and the RGB camera 363 and their internal parameters have already been known by the previous calibrating process.

In S504, as illustrated in FIG. 5-d, the distance image obtaining unit 408 extracts correspondence points between the 3-dimensional shape measurement pattern 522 and the infrared camera image 524 which was coordinate-converted in S503. For example, the distance image obtaining unit 408 searches for one dot on the infrared camera image 524 from the 3-dimensional shape measurement pattern 522 and makes the searched dot correspond to the case where the same dot has been detected. The distance image obtaining unit 408 may search for a peripheral pattern of a pixel of the infrared camera image 524 from the 3-dimensional shape measurement pattern 522 and make the searched dot correspond to a portion having the highest similarity.

In S505, the distance image obtaining unit 408 performs a calculation by using the principle of the triangular surveying by setting a straight line connecting the infrared pattern projecting unit 361 and the infrared camera 362 to a base line 525, thereby calculating a distance from the infrared camera 362. With respect to the pixel which could be made to correspond in S504, the distance image obtaining unit 408 calculates a distance between the target 521 and the infrared camera 362 at a position corresponding to such a pixel and stores as a pixel value. With respect to the pixel which could not be made to correspond, the distance image obtaining unit 408 stores an invalid value as a portion in which a distance measurement could not be performed. By performing such a process to all pixels of the infrared camera image 524 which was coordinate-converted in S503, the distance image obtaining unit 408 generates a distance image in which a distance value (distance information) is included in each pixel.

In S506, the distance image obtaining unit 408 stores RGB values of the RGB camera image 523 into each pixel of the distance image, thereby generating a distance image having four values of R, G, B, and a distance per pixel. In the distance image obtained here, the distance image sensor coordinate system defined by the RGB camera 363 of the distance image sensor unit 208 is used as a reference.

Therefore, in S507, the distance image obtaining unit 408 converts the distance information obtained as a distance image sensor coordinate system into a 3-dimensional dot group in the orthogonal coordinate system as mentioned with reference to FIG. 2-b. It is assumed hereinbelow that the 3-dimensional dot group denotes a 3-dimensional dot group in the orthogonal coordinate system unless otherwise specified.

In the embodiment, although the infrared pattern projection system is used as a distance image sensor unit 208 as mentioned above in the embodiment, a distance image sensor of another system can be also used. For example, a stereo system in which a stereoscopic viewing is performed by using two RGB cameras or a TOF (Time of Flight) system in which a distance is measured by detecting a flying time of a laser beam may be used.

(Description of Outline of Application Processes in the Embodiment)

An outline of the application processes in the embodiment will now be described with reference to FIGS. 17-b and 17-c.

First, the user puts a book object 1712 onto the stage 204. The object detecting unit 410 recognizes that the book object 1712 was put. When the user depresses a scan execute button projected by the projector 207, the book image photographing unit 412 obtains a book image and its shape information. At this time, the book image photographing unit 412 extends the book image by using the shape information of the book and stores. When the book image is stored, the user I/F unit 403 highlights (emphasis display) predetermined areas of the book object 1712 through the projector 207. The highlighted areas are areas 1713 and 1714 in FIG. 17-b. When the user touches such an area, contents associated with the area is reproduced. In FIG. 17-b, the area 1713 is touched with a user's hand 1711. In FIG. 17-b, the contents has been projected to an area 1715 by the projector 207. The contents may be anything such as moving image, still image, audio sound, text, another application, or the like.

Although the display of the contents has been projected by the projector 207 in FIG. 17-b, such a construction that there is another display and the contents is reproduced on the display may be used. Such a construction that another computer is connected to the present system and contents in such a computer is reproduced may be used. When the contents is reproduced, the processing unit 414 changes the projection image of the area on the book object 1712 associated with the reproduced contents through the user I/F unit 403 in such a manner that the user can know that the contents associated with which area of the book object 1712 has been reproduced. As a changing method, any one of the methods whereby a color is changed, a brightness is changed, it is fully painted, and the like may be used so long as the user is informed of the change.

Upon corresponding to the contents, first, the book image photographing unit 412 specifies a page. Separately from the scanned data, images of respective pages of the book have previously been registered in a database of the HDD 305. The image may be registered in a database in a storage area on the network. In the following description, those databases are called registration database. The contents has been associated with the predetermined area of the image of each page. For example, FIG. 17-*c* illustrates an image of the page of the book which has previously been registered in the registration database. The book object 1712 and an image 1716 are the same book image. The area 1713 corresponds to an area 1717. The area 1714 corresponds to an area 1718. Contents is associated with area information (information of diagonal vertex coordinates of the area and the like) of the area 1717. If coordinates of a space touched by the user and the contents area of the image registered in the registration database are made to correspond to each other, the processing unit 414 can reproduce the contents on the basis of the touch to the book. Finally, when the user removes the book from the stage, the object detecting unit 410 detects it and ends the application processes. Although the embodiment has been described on the assumption that after the processing unit 414 stored the image of the book object, the predetermined portions are highlighted, the invention is not necessarily limited to such an example. It is also possible to construct in such a manner that after the processing unit 414 stored the image of the book object, by receiving a fact that the user touched a predetermined portion where nothing is projected, such a portion is highlighted for the first time.

A method of realizing the foregoing application processes will be described hereinbelow.

(Description of Gesture Recognizing Unit)

Figure 6:
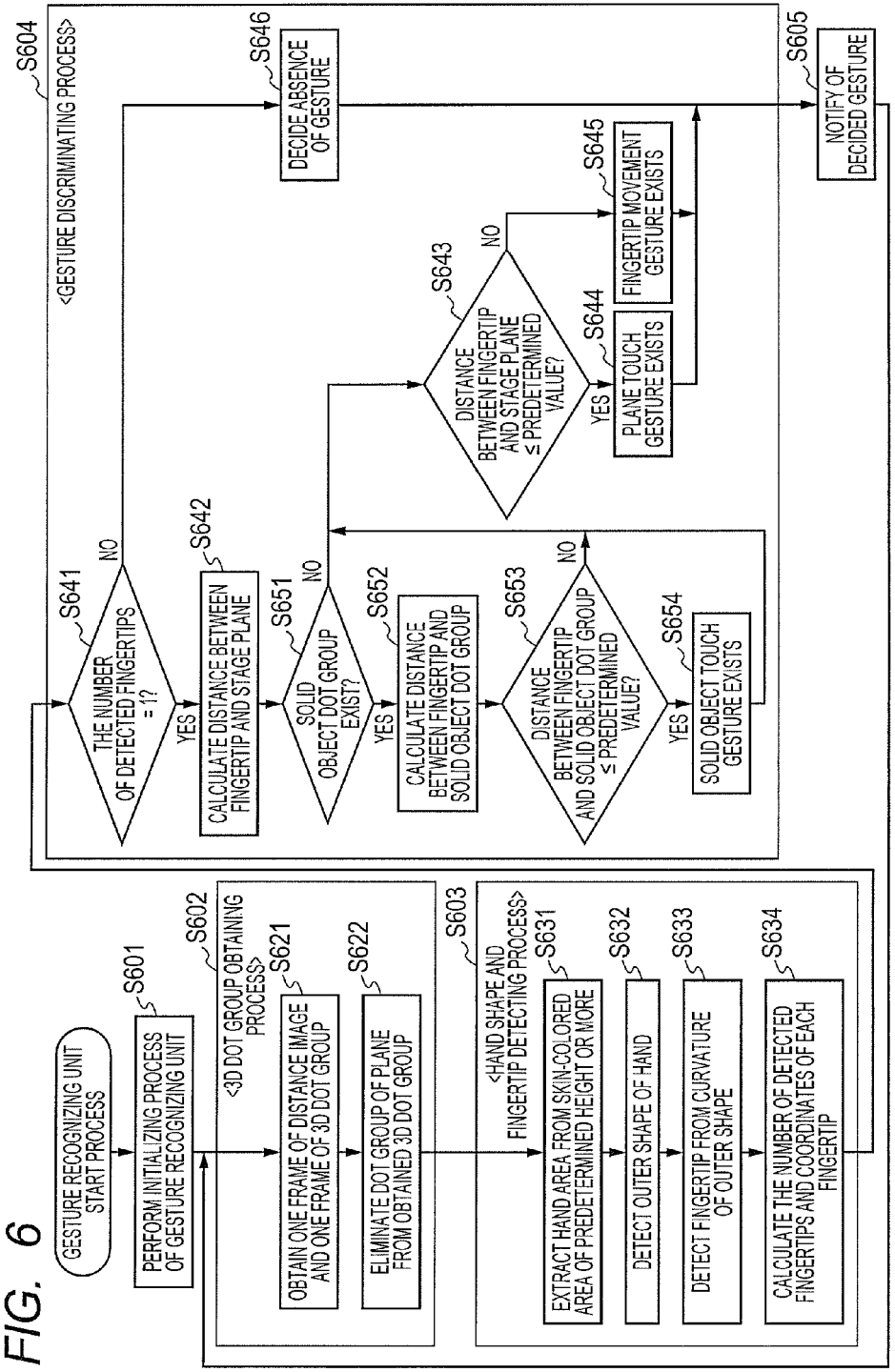
FIG. 6 is a flowchart illustrating an example of a process of a gesture recognizing unit of the embodiment 1.

The process of the gesture recognizing unit 409 will be described in detail with reference to a flowchart of FIG. 6. When the process is started, the gesture recognizing unit 409 executes an initializing process in S601. In the initializing process, the gesture recognizing unit 409 obtains one frame of the distance image from the distance image obtaining unit 408. Since no target is put on the stage 204 at the start of the process of the gesture recognizing unit 409, a recognition of the plane of the stage 204 is performed as an initial state. That is, the gesture recognizing unit 409 extracts the widest plane from the obtained distance image, calculates a position of the extracted plane and a normal vector (hereinbelow, called a plane parameter of the stage 204), and stores into the RAM 303.

In S602, the gesture recognizing unit 409 obtains a 3-dimensional dot group of the object existing on the stage 204 shown in S621 to S622.

In S621, the gesture recognizing unit 409 obtains one frame of the distance image and one frame of the 3-dimensional dot group from the distance image obtaining unit 408.

In S622, the gesture recognizing unit 409 eliminates the dot group existing on the plane including the stage 204 from the obtained 3-dimensional dot group by using the plane parameter of the stage 204.

In S603, the gesture recognizing unit 409 executes processes for detecting a shape and a fingertip of the user's hand from the obtained 3-dimensional dot group shown in S631 to S634. The process of S603 will be described with reference to diagrams schematically illustrating a method of a fingertip detecting process shown in FIGS. 7-*a* to 7-*d*.

In S631, the gesture recognizing unit 409 extracts a skin-colored 3-dimensional dot group existing at a predetermined height or more from the plane including the stage 204 from the 3-dimensional dot group obtained in S602, thereby obtaining a 3-dimensional dot group of the hand. An extracted 3-dimensional dot group 701 of the hand is illustrated in FIG. 7-*a*.

In S632, the gesture recognizing unit 409 generates a 2-dimensional image in which the extracted 3-dimensional dot group of the hand is projected to the plane of the stage 204 and detects an outer shape of the hand. A 3-dimensional dot group 702 projected to the plane of the stage 204 is illustrated in FIG. 7-*a*. As for the projection, it is sufficient that the respective coordinates of the dot group are projected by using the plane parameter of the stage 204. If only values of xy coordinates are extracted from the projected 3-dimensional dot group as illustrated in FIG. 7-*b*, they can be handled as a 2-dimensional image 703 seen from a z axis direction. At this time, it is assumed that the gesture recognizing unit 409 stores information showing to which one of the respective coordinates of the 2-dimensional image projected to the plane of the stage 204 each dot of the 3-dimensional dot group of the hand corresponds.

In S633, with respect to each dot on the detected outer shape of the hand, the gesture recognizing unit 409 calculates a curvature of the outer shape at such a dot and detects a dot, as a fingertip, in which the calculated curvature is smaller than a predetermined value. FIG. 7-*c* schematically illustrates a method of detecting the fingertip from the curvature of the outer shape. Reference numeral 704 denotes a part of the dots showing the outer shape of the 2-dimensional image 703 projected to the plane of the stage 204. A case of drawing a circle so as to include five adjacent dots among the dots showing the outer shape as illustrated at 704 is now considered. Circles 705 and 707 show such an example. Such a circle is sequentially drawn to all dots of the outer shape and, when their diameters (for example, 706 and 708) are smaller than a predetermined value (the curvature is small), such a circle is set to the fingertip. Although the number of adjacent dots is set to 5 in this example, it is not limited to 5. Although the curvature is used here, the fingertip may be detected by performing an elliptic filtering to the outer shape.

In S634, the gesture recognizing unit 409 calculates the number of detected fingertips and coordinates of each fingertip. At this time, since the correspondence relation between each dot of the 2-dimensional image projected to the stage 204 and each dot of the 3-dimensional dot group of the hand has been stored as mentioned above, the gesture recognizing unit 409 can obtain the 3-dimensional coordinates of each fingertip. Although the method of detecting the fingertip from the image projected to the 2-dimensional image from the 3-dimensional dot group has been described here, the image serving as a target of the fingertip detection is not limited to such an example. For example, an area of the hand is extracted from a background difference of the distance image or a skin-colored area of the RGB image and the fingertip in the hand area may be detected by a method (calculation of the curvature of the outer shape, or the like) similar to that mentioned above. In this case, since the coordinates of the detected fingertip are the coordinates on the 2-dimensional image such as RGB image or distance image, it is necessary that the gesture recognizing unit 409 converts them into the 3-dimensional coordinates of the orthogonal coordinate system by using the distance information of the distance image at such coordinates. At this time, a center of a curvature circle used when detecting the fingertip may be set to the fingertip point instead of a dot on the outer shape serving as a fingertip point.

In S604, the gesture recognizing unit 409 executes a gesture discriminating process from the detected shape and fingertip of the hand shown in S641 to S646.

In S641, the gesture recognizing unit 409 discriminates whether or not the number of fingertips detected in S603 is equal to 1. If it is not equal to 1, the gesture recognizing unit 409 advances to S646 and decides the absence of the gesture. If the number of detected fingertips is equal to 1 in S641, the gesture recognizing unit 409 advances to S642 and calculates a distance between the detected fingertip and the plane including the stage 204.

In S651, the gesture recognizing unit 409 discriminates whether or not a solid object dot group exist on the stage 204. The solid object dot group is dot group data having coordinate information of the orthogonal coordinate system like the 3-dimensional dot group of the hand area. The solid object dot group denotes the 3-dimensional dot group data of the object put on the plane of the stage. In FIG. 7-d, dots 709 express the solid object dot group. An obtaining process of the solid object dot group will be described based on the process of the object detecting unit 410 in FIGS. 8-a to 8-c. If the solid object dot group exist in S651, the gesture recognizing unit 409 advances to S652. If the solid object dot group do not exist, S643 follows.

In S652, the gesture recognizing unit 409 calculates a distance between the detected fingertip and the solid object dot group. This calculating method will be described with reference to a schematic diagram of FIG. 7-d. The gesture recognizing unit 409 calculates distances from a fingertip point 708 to the coordinates of all dots of a solid object dot group 709 and sets a value of the shortest distance to the distance between the fingertip and the solid object dot group.

In S653, the gesture recognizing unit 409 discriminates whether or not the distance calculated in S652 is equal to or less than a predetermined value. If it is equal to or less than the predetermined value, S654 follows and the gesture recognizing unit 409 decides the presence of the solid object touch gesture. If the distance calculated in S652 is larger than the predetermined value, the gesture recognizing unit 409 advances to S643.

In S643, the gesture recognizing unit 409 discriminates whether or not the distance calculated in S642 is equal to or less than a predetermined value. If it is equal to or less than the predetermined value, S644 follows and the gesture recognizing unit 409 decides the presence of the touch gesture in which the fingertip touched the stage 204. If the distance calculated in S642 is larger than the predetermined value in S643, the gesture recognizing unit 409 advances to S645 and decides the presence of the gesture in which the fingertip moved (gesture in which although the fingertip does not touch, the fingertip exists on the stage 204).

In S605, the gesture recognizing unit 409 notifies the main control unit 402 of the decided gesture. The processing routine is returned to S602 and the gesture recognizing process is repeated.

By the above processes, the gesture recognizing unit 409 can recognize the gesture of the user on the basis of the distance image.

(Process of Object Detecting Unit)

The process of the object detecting unit 410 will be described with reference to flowcharts of FIGS. 8-a to 8-c.

When the process is started, in S801 in FIG. 8-a, the object detecting unit 410 executes an initializing process shown in S811 to S813. In S811, the object detecting unit 410 obtains one frame of the camera image from the camera image obtaining unit 407 and one frame of the distance image from the distance image obtaining unit 408. In S812, the object detecting unit 410 stores the obtained camera image as a previous frame camera image. In S813, the object detecting unit 410 stores the obtained camera image as a stage background camera image and stores the obtained distance image as a stage background distance image, respectively. Hereinbelow, "stage background camera image" and "stage background distance image" denote the camera image and the distance image obtained here, respectively.

In S802, the object detecting unit 410 detects that the object was put onto the stage 204 (object putting detecting process). Such a process will be described in detail hereinafter with reference to FIG. 8-b.

In S803, the object detecting unit 410 detects that the object on the stage 204 in which the putting was detected in S802 has been removed (object removal detecting process). Such a process will be described in detail hereinafter with reference to FIG. 8-c.

FIG. 8-b illustrates details of the object putting detecting process of S802.

When the object putting detecting process is started, the object detecting unit 410 obtains one frame of the camera image from the camera image obtaining unit 407 in S821.

In S822, the object detecting unit 410 calculates a difference between the obtained camera image and the previous frame camera image and calculates a difference value obtained by adding absolute values of the calculated differences.

In S823, the object detecting unit 410 discriminates whether or not the calculated difference value is equal to or larger than a predetermined value (threshold value). If the calculated difference value is less than the predetermined value (threshold value), the object detecting unit 410 determines the absence of the object on the stage 204. The processing routine advances to S828 and the camera image of the present frame is stored as a previous frame camera image. The processing routine is returned to S821 and the process is continued. If the difference value is equal to or larger than the predetermined value in S823, the object detecting unit 410 advances to S824 and calculates a difference value between the camera image obtained in S821 and the previous frame camera image in a manner similar to S822.

In S825, the object detecting unit 410 discriminates whether or not the calculated difference value is equal to or less than a predetermined value. If the calculated difference value is larger than the predetermined value in S825, the object detecting unit 410 determines that the object on the stage 204 has moved. S828 follows and the camera image of the present frame is stored as a previous frame camera image. Then, the processing routine is returned to S821 and the process is continued. If the calculated difference value is equal to or less than the predetermined value in S825, the object detecting unit 410 advances to S826.

In S826, on the basis of the number of times in which a discrimination result of S825 is continuously YES, the object detecting unit 410 discriminates whether or not the difference value is equal to or less than a predetermined value, that is, a state where the object on the stage 204 is at rest has continued the number of times as many as a predetermined number of frames. If the object detecting unit 410 determines in S826 that the state where the object on the stage 204 is at rest does not continue the number of times as many as the predetermined number of frames, S828 follows and the camera image of the present frame is stored as a previous frame camera image. Then, the processing routine is returned to S821 and the process is continued. If the object detecting unit 410 determines in S826 that the state where the object on the stage 204 is at rest has continued the number of times as many as the predetermined number of frames, the processing routine advances to a solid object 3-dimensional dot group obtaining process of S841.

When the solid object exists on the stage 204, in S841, the object detecting unit 410 calculates a solid object dot group and stores into the RAM 303. In S841, the object detecting unit 410 executes processes shown in S851 to S854.

In S851, the object detecting unit 410 obtains one frame of the present distance image from the distance image obtaining unit 408 and stores into the RAM 303.

In S852, the object detecting unit 410 generates a difference binary image between the present distance image obtained in S851 and the stage background distance image obtained in S813 and extracts as an area of the solid object put on the stage 204.

In S853, the object detecting unit 410 discriminates whether or not a size (difference value) of the difference area which denotes the area of the solid object extracted in S852 is equal to or larger than a predetermined value. If the difference value is equal to or larger than the predetermined value, the object detecting unit 410 decides the presence of the solid object, and advances to S854. If it is smaller than the predetermined value, the object detecting unit 410 decides the absence of the solid object, and ends the solid object 3-dimensional dot group obtaining process.

In S854, the object detecting unit 410 converts the distance image of the solid object area extracted in S852 in the present distance image obtained in S851 into a 3-dimensional dot group and stores into the RAM 303.

When the solid object 3-dimensional dot group obtaining process of S841 is ended, the object detecting unit 410 advances to S827, notifies the main control unit 402 that the object was put, and ends the object putting detecting process.

FIG. 8-c illustrates details of the object removal detecting process of S803.

When the object removal detecting process is started, the object detecting unit 410 obtains one frame of the camera image from the camera image obtaining unit 407 in S831.

In S832, the object detecting unit 410 calculates a difference value between the obtained camera image and the stage background camera image.

In S833, the object detecting unit 410 discriminates whether or not the calculated difference value is equal to or less than a predetermined value. If the calculated difference value is larger than the predetermined value in S833, the object still exists on the stage 204. Therefore, the object detecting unit 410 is returned to S831 and continues the process. If the calculated difference value is equal to or less than the predetermined value in S833, the object does not exist on the stage 204. Therefore, the object detecting unit 410 notifies the main control unit 402 that the object was removed, and ends the object removal detecting process.

By the above processes, the object detecting unit 410 can detect the putting and removal of the object on the stage 204 on the basis of the camera image. Additionally describing, if the object is a flat object such as paper or the like, although the object detecting unit 410 cannot detect the putting and removal of the object on the stage 204 merely from the distance image, by using the camera image as mentioned above, they can be detected.

(Description of Flat Original Image Photographing Unit)

Figure 9:
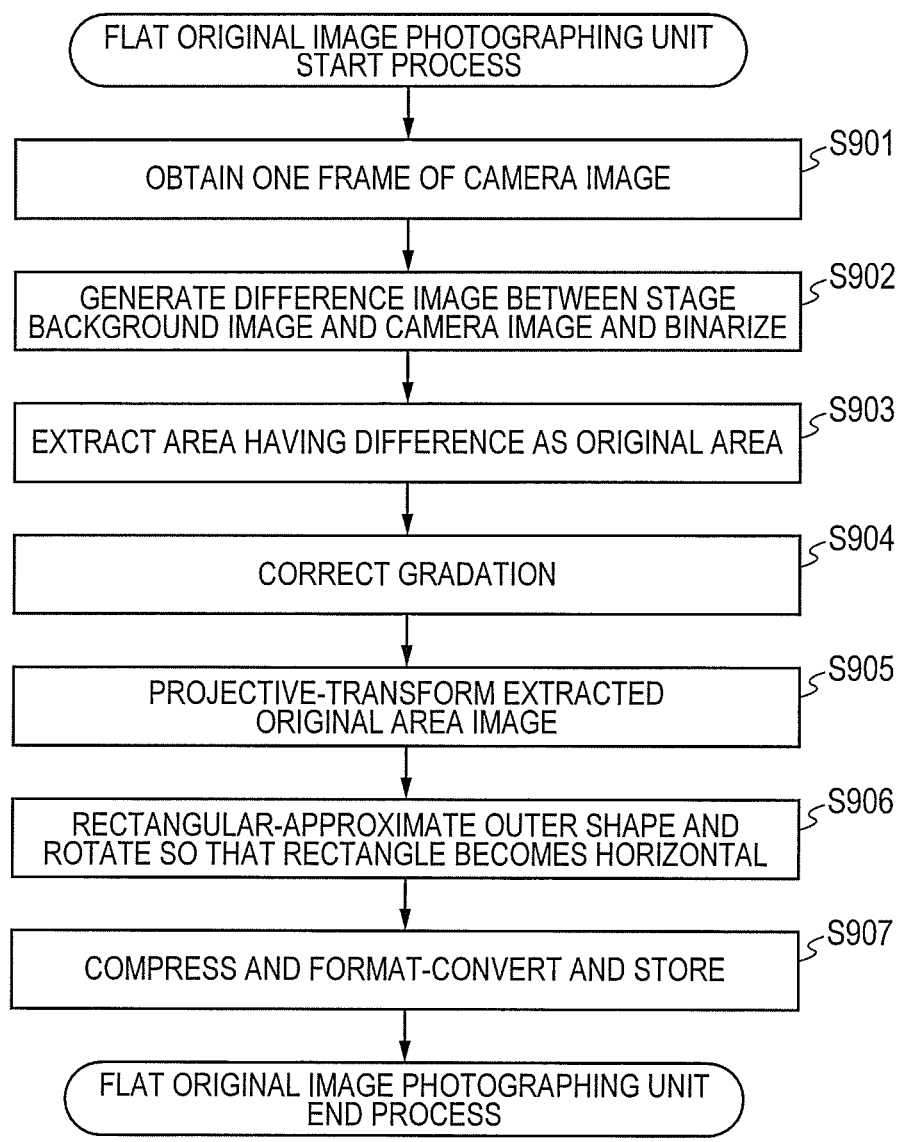
FIG. 9 is a flowchart illustrating an example of a process of a flat original image photographing unit.

The process which is executed by the flat original image photographing unit 411 will be described with reference to a flowchart of FIG. 9. FIGS. 10-a to 10-h are schematic diagrams for describing the process of the flat original image photographing unit 411.

When the process is started, the flat original image photographing unit 411 obtains one frame of the image from the camera unit 202 through the camera image obtaining unit 407 in S901. Since the coordinate system of the camera unit 202 does not face the stage 204 as illustrated in FIG. 2-b, the photographed image at this time is distorted together with a target 1001 and the stage 204 as illustrated in FIG. 10-a.

In S902, the flat original image photographing unit 411 calculates a difference between the stage background camera image and the camera image obtained in S901 every pixel, generates a difference image, and binarizes in such a manner that a pixel having the difference becomes black and a pixel having no difference becomes white. Therefore, the difference image generated by the flat original image photographing unit 411 becomes an image (having the difference) in which an area of the target 1001 is black like an area 1002 in FIG. 10-b.

In S903, the flat original image photographing unit 411 extracts an image of only the target 1001 as illustrated in FIG. 10-c by using the area 1002.

In S904, the flat original image photographing unit 411 performs a gradation correction to the extracted original area image.

In S905, to the extracted original area image, the flat original image photographing unit 411 performs a projective transformation from the camera coordinate system to the stage 204. As illustrated in FIG. 10-d, the unit 411 converts into an image 1003 seen directly overhead of the stage 204. A projective transform parameter used here can be obtained from a plane parameter calculated in S601 in FIG. 6 mentioned above and the camera coordinate system in the process of the gesture recognizing unit 409. As illustrated in FIG. 10-d, there is a case where the image 1003 which is obtained here is inclined in dependence on a way of putting the original onto the stage 204.

Therefore, in S906, the flat original image photographing unit 411 rectangle-approximates the image 1003 and, subsequently, rotates it so that the rectangle becomes horizontal, and obtains a non-inclined image like an image 1004 illustrated in FIG. 10-e. The flat original image photographing unit 411 calculates inclinations θ1 and θ2 of the rectangle to a reference line as illustrated in FIG. 10-f and decides the angle of the smaller inclination (in this instance, θ1) as a rotation angle of the image 1003. As illustrated in FIGS. 10-g and 10-h, the flat original image photographing unit 411 executes an OCR process to a character train included in the image 1003 and may calculate the rotation angle of the image 1003 from an inclination of the character train and may execute a top and bottom discriminating process.

In S907, the flat original image photographing unit 411 executes a compression and a file format conversion to the extracted image 1004 in accordance with a predetermined image format (for example, JPEG, TIFF, PDF, or the like). The flat original image photographing unit 411 stores the image data as a file into a predetermined area in the HDD 305 through the data managing unit 405 and ends the process.

(Process of Book Image Photographing Unit)

The process which is executed by the book image photographing unit 412 will be described with reference to flowcharts of FIGS. 11A-a to 11A-b and FIGS. 11B-c to 11B-e. FIGS. 12A-a to 12A-h, FIGS. 12B-i to 12B-p, and FIGS. 12C-q to 12C-u are schematic diagrams for describing the process of the book image photographing unit 412.

In FIG. 11A-a, when the process is started, in S1101, the book image photographing unit 412 obtains one frame of the camera image from the camera unit 202 and one frame of the distance image from the distance image sensor unit 208 by using the camera image obtaining unit 407 and the distance image obtaining unit 408, respectively. An example of the camera image obtained here is illustrated in FIG. 12A-a. In FIG. 12A-a, a camera image 1201 including the stage 204 and a photographing target book serving as a target object 1211 is obtained. FIG. 12A-b is an example of the distance image obtained here. In FIG. 12A-b, a portion which is closer to the distance image sensor unit 208 is illustrated in a deep color and a distance image 1202 including the distance information from the distance image sensor unit 208 is obtained at each pixel on a target object 1212. In FIG. 12A-b, a pixel in which the distance from the distance image sensor unit 208 is farther than that from the stage 204 is shown in white. A portion of the target object 1212 (page on the right side in the target object 1212) which is in contact with the stage 204 is also similarly shown in white.

In S1102, the book image photographing unit 412 executes a process (solid information obtaining process) for calculating a 3-dimensional dot group (solid information) of a book object put on the stage 204 from the obtained camera image and distance image shown in S1111 to S1116.

In S1111, the book image photographing unit 412 calculates a difference between the camera image and the stage background camera image every pixel, performs a binarization, and generates a camera difference image 1203 in which an object area 1213 is shown in black as illustrated in FIG. 12A-c.

In S1112, the book image photographing unit 412 converts the camera difference image 1203 from the camera coordinate system to the distance image sensor coordinate system and generates a camera difference image 1204 including an object area 1214 seen from the distance image sensor unit 208 as illustrated in FIG. 12A-d.

In S1113, the book image photographing unit 412 calculates a difference between the distance image and the stage background distance image every pixel, performs a binarization, and generates a distance difference image 1205 in which an object area 1215 is shown in black as illustrated in FIG. 12A-e. With respect to a portion of the same color as that of the stage 204 of the target object 1211, since a difference of the pixel value is small, there is a case where it is not included in the object area 1213 in the camera difference image 1203. With respect to a portion having a height similar to that of the stage 204 of the target object 1212, since a difference of the distance value from the distance image sensor unit 208 is smaller than that of the distance value to the stage 204, there is a case where it is not included in the object area 1215 in the distance difference image 1205.

Therefore, in S1114, the book image photographing unit 412 calculates a sum of the camera difference image 1203 and the distance difference image 1205, generates an object area image 1206 illustrated in FIG. 12A-f, and obtains an object area 1216. The object area 1216 is an area in which a color or a height differs from that of the stage 204 and shows an object area more accurately than the case where only one of the object area 1213 in the camera difference image 1203 and the object area 1215 in the distance difference image 1205 is used. Since the object area image 1206 is the distance image sensor coordinate system, in S1115, the book image photographing unit 412 can extract only the object area 1216 in the object area image 1206 from the distance image 1202.

In S1116, the book image photographing unit 412 directly converts the distance image extracted in S1115 into the orthogonal coordinate system, thereby generating a 3-dimensional dot group 1217 illustrated in FIG. 12A-g. The 3-dimensional dot group 1217 is a 3-dimensional dot group of a book object.

In S1103, the book image photographing unit 412 executes a distortion correcting process of the book image from the obtained camera image and the calculated 3-dimensional dot group and generates a 2-dimensional book image. The process of S1103 will be described in detail in FIG. 11A-b.

The book image distortion correcting process of S1103 will be described with reference to a flowchart of FIG. 11A-b.

When the book image distortion correcting process is started, in S1121, the book image photographing unit 412 converts the object area image 1206 from the distance sensor image coordinate system to the camera coordinate system.

In S1122, the book image photographing unit 412 extracts an object area from the camera image 1201 by using the area obtained by converting the object area 1216 in the object area image 1206 into the camera coordinate system.

In S1123, the book image photographing unit 412 projective-transforms the extracted object area image into the stage plane.

In S1124, the book image photographing unit 412 rectangle-approximates the projective-transformed object area image and rotates the image so that the rectangle becomes horizontal, thereby generating a book image 1208 in FIG. 12A-h. In the book image 1208, since one side of the approximated rectangle is parallel with an X axis, subsequently, the book image photographing unit 412 executes the distortion correcting process in the X axis direction to the book image 1208.

In S1125, the book image photographing unit 412 sets the leftmost dot of the book image 1208 to P (dot P in FIG. 12A-h).

In S1126, the book image photographing unit 412 obtains a height (h1 in FIG. 12A-h) of the dot P from the 3-dimensional dot group 1217 of the book object.

In S1127, the book image photographing unit 412 sets a dot which is away from the dot P of the book image 1208 in the X axis direction by a predetermined distance (x1 in FIG. 12A-h) to Q (dot Q in FIG. 12A-h).

In S1128, the book image photographing unit 412 obtains a height (h2 in FIG. 12A-h) of the dot Q from the 3-dimensional dot group 1217.

In S1129, the book image photographing unit 412 calculates a distance (l1 in FIG. 12A-h) between the dots P and Q on the book object by a linear approximation by the following equation (4).

$$l1 = \sqrt{x1^2 + (h1-h2)^2} \qquad (4)$$

In S1130, the book image photographing unit 412 corrects the distance between the dots P and Q by the calculated distance l1 and copies the pixel to positions of dots P' and Q' on an image 1219 in FIG. 12A-h.

In S1131, the book image photographing unit 412 sets the dot Q subjected to the process to the dot P, is returned to S1128, and executes the same process, so that the correction between the dot Q and a dot R in FIG. 12A-h can be performed, thereby setting to a pixel at the dot Q' and a dot R' on the image 1219. The book image photographing unit 412 repeats the above process with respect to all pixels, so that the image 1219 becomes an image after the distortion correction.

In S1132, the book image photographing unit 412 discriminates whether or not the distortion correcting process has been ended with respect to all dots. If it has been ended, the distortion correcting process of the book object is ended. As mentioned above, the book image photographing unit 412 executes the processes of S1102 and S1103 and can generate the book image subjected to the distortion correction.

After the book image subjected to the distortion correction was generated, the book image photographing unit 412 performs a gradation correction to the generated book image in S1104.

In S1105, the book image photographing unit 412 performs a compression and a file format conversion to the generated book image in accordance with a predetermined format (for example, JPEG, TIFF, PDF, or the like).

In S1106, the book image photographing unit 412 stores the generated image data as a file into a predetermined area in the HDD 305 through the data managing unit 405.

In S1141, the book image photographing unit 412 executes a corresponding process for making the book object 3-dimensional dot group calculated in S1102 correspond to the contents information registered in the registration database in the HDD 305 by using the generated image data. The contents information will be described hereinafter. Such a process will be described in detail hereinafter with reference to FIG. 11B-c.

In S1142, the book image photographing unit 412 generates an image (projection image) to be projected to the book object by using the projector 207 and ends the process of FIG. 11A-a. Such a process will be described in detail hereinafter with reference to FIG. 11B-e. The image which is generated here is highlighted since it is projected to the book object.

Subsequently, the contents corresponding process which is executed in S1141 will be described with reference to a flowchart of FIG. 11B-c. First, it is assumed as a prerequisite that image data of an arbitrary book has been registered in the registration database in the HDD 305. In the registered image data of the book, the contents information (information which can be arbitrarily displayed, reproduced, and executed, such as photograph data, audio data, moving image data, text data, other applications, and the like) has been associated with each page. The number of contents information associated with each page of the image data may be set to 1 or a plural number. A page with which no contents information is associated may exist.

FIG. 18-a schematically illustrates an example in which the image data of the book and the contents information have been associated with each other and stored. For example, at the first line in FIG. 18-a, image contents "/contents/A.jpg" is associated with a rectangular area having diagonal vertices shown by coordinates (xa1, ya1) and (xa2, ya2) of the image of the 0th page of the book of book number 1. Such a process for making the contents information correspond to the coordinates in the orthogonal coordinate system of the book object 3-dimensional dot group obtained in S1102 is the contents corresponding process in S1141.

In S1151 in FIG. 11B-c, the book image photographing unit 412 searches to discriminate whether or not the page of the book object spread on the stage 204, that is, the image stored in S1106 exists in the registration database of the book image as mentioned above. As a searching method of the image, it is sufficient to use a well-known method. For example, a 2-dimensional code is embedded into both of an image to be read and the image in the registration database and the image in which the coincident code has been embedded may be searched for. Image feature amounts are extracted and the image in which the feature amount is most similar may be selected.

If the image stored in S1106 exists in the registration database as a result of the search in S1151, in S1152, the book image photographing unit 412 specifies that it is an image of which page of which book, and advances to S1153. On the other hand, if the image stored in S1106 does not exist in the registration database, the book image photographing unit 412 ends the contents corresponding process.

In S1153, the book image photographing unit 412 specifies the number of contents areas of the specified pages and their coordinates and temporarily stores into the RAM 303. When describing in FIG. 18-a, for example, if it is decided that page 1 of book number 1 has been opened, the number of contents areas is equal to 2. With respect to each contents area, the book image photographing unit 412 stores a combination (1801 and 1802) of the coordinates of the contents area and the contents.

In S1154, the book image photographing unit 412 executes an extending process of the book object 3-dimensional dot group in order to determine that a link with the contents information is held at which position of the 3-dimensional coordinates of respective dots constructing the book object 3-dimensional dot group. The above process is such a process that the book object 3-dimensional dot group having a curved shape is deformed into a flat shape while maintaining the relative relations of the respective dots serving as an object surface in a 3-dimensional space. Describing in the schematic diagram, as illustrated in FIG. 12A-h, it is such a process that a shape 1218 of the book object seen from the side is deformed into an image of a shape 1219. At this time, correspondence relations of the respective dots before and after the deformation are held. Such a process will be described in detail hereinafter with reference to FIG. 11B-d. In S1155, the book image photographing unit 412 compares the coordinates of the book object 3-dimensional dot group having the extended flat shape (coordinates on the 2-dimensional plane) with the contents area coordinates of the registration image in the registration database. The book image photographing unit 412 decides which dot in the dot group corresponds to the contents area, and stores the coordinate data of the dot group which was made to correspond to the contents into the RAM 303. At this time, as will be described later, a size of the whole extended dot group has been adjusted to a size of the registered image in the registration database. With respect to each of the dots constructing the extended dot group, if whether or not each dot exists in the contents area on the registration image is discriminated, it will be understood that a link to the contents should be held to which dot in the extended dot group. Since the correspondence relations of the book object 3-dimensional dot group before and after the extension are set to be different, at this point of time, the correspondence between the book object 3-dimensional dot group before the extension and the contents area is obtained. Such a state is schematically illustrated in FIG. 18-b. In the dot group constructing the book object 3-dimensional dot group, the orthogonal coordinates of the dot to which the contents has been made to correspond are recorded in the orthogonal coordinates having the contents. With respect to each dot, a path to the contents has been associated.

In S1156, the book image photographing unit 412 searches for the 3-dimensional dot group in which a value of the z coordinate is smaller than a predetermined value among the 3-dimensional dot groups to which the contents information has been made to correspond in S1155. It is such a process that when the book object has a thin shape, since there is a case where the touch cannot be detected by the touch detection to the solid object, a portion where the touch should be detected by the touch detection to the plane is searched for. Such a process will be described with reference to a schematic diagram of FIG. 12C-q. It is now assumed that contents areas 1224 and 1225 have been made to correspond to a book object 1223. A shape of such a state seen from the side at this time is shown by 1226. Contents areas seen from the side are shown by 1227 and 1228. At this time, a portion having a value which is equal to or larger than a predetermined value in the z axis direction as illustrated by an interval 1231 can be instructed by the touch detection to a solid object. However, a portion which is in close contact with the stage 204, that is, a portion which does not have a value which is equal to or larger than a predetermined value in the z axis direction cannot be instructed by the touch detection to a solid object. For example, the interval 1233 has a length of an accuracy (for example, about 1 cm) of the touch to the plane. With respect to intervals 1230 and 1232 of the dot groups which exist under the interval 1233 and were made to correspond to the contents, by performing an instruction by the touch detection to the plane, the foregoing problems can be solved. In FIG. 12C-r, the area 1224 is a region obtained by combining areas 1235 and 1236, and a plane 1234 corresponds to a line 1229. Therefore, the area 1235 existing over the area 1234 can be instructed by the touch detection to the solid object, and the area 1236 existing under the area 1234 can be instructed by the touch detection to the plane. The dot in which the value of the z coordinate is smaller than the predetermined value mentioned in S1156 denotes a dot in which the z coordinate is smaller than the line 1229 or the area 1234. Although the reference of the predetermined value has been set to the accuracy of the plane touch, the user can also set a proper value.

In S1157, the book image photographing unit 412 stores an area (area in the xy plane) surrounding the dots which were searched for in S1156 as an area for detection of the plane touch and ends the contents corresponding process. FIG. 12C-s schematically illustrates an area for detection of the plane touch in the image (xy plane) in the case where the area of the stage 204 including the book object 1223 is seen directly overhead. An area 1239 is an area of the book object 1223 and areas 1237 and 1238 are contents areas which are stored as targets of the plane touch which were searched for. Since an area 1240 is an area of the plane touch, it is not stored. FIG. 18-c schematically illustrates a storing method of such an area. For example, since page 1 of book 1 has been opened here, coordinates showing the area of the plane having the contents (coordinates of diagonal vertices of a rectangle showing the area) are associated with each contents and stored. Since the dot group which were made to correspond to the contents are stored in S1155 and the plane area which was made to correspond to the contents is stored in S1157, the touch detection can be performed in each of the solid object touch and the plane touch.

Subsequently, the dot group extending process which is executed in S1154 will be described with reference to FIG. 11B-d. FIGS. 12A-f to 12B-p illustrate schematic diagrams to the handling of the dot group at the time of performing the extension and the extending process will be also described properly with reference to those diagrams. The 3-dimensional dot group can be switched to an arbitrary viewpoint and an image can be displayed. For example, the 3-dimensional dot group 1217 illustrated in FIG. 12A-g can be considered as an image of a viewpoint from the user.

In S1161, the book image photographing unit 412 sets a viewpoint of a book object 3-dimensional dot group in the +z axis direction of the orthogonal coordinate system and temporarily stores the 2-dimensional image into the RAM 303. FIG. 12B-i illustrates the 2-dimensional image at this time. The image illustrated in FIG. 12B-i is an image of the stage seen directly overhead.

In S1162, the book image photographing unit 412 detects a rectangular area in a stage area 1220 of the image seen directly overhead. FIG. 12B-j illustrates an area of a rectangle 1221 detected by the book image photographing unit 412 in S1162.

In S1163, the book image photographing unit 412 sets an x' axis in the direction of a long side of the detected rectangle 1221. For example, it is sufficient to set an origin to a vertex closest to the origin of the orthogonal coordinate system among vertices of the detected rectangle 1221. The book image photographing unit 412 sets a z' axis which has the same origin as that of the x' axis and is parallel with the z axis. Reference numeral 1222 in FIG. 12B-j denotes the x' axis and the z' axis which were set. When only the detected rectangle 1221 and the book object 3-dimensional dot group 1217 are extracted, they are as illustrated in FIG. 12B-k.

In S1164, the book image photographing unit 412 orthogonal-projects all dots of the book object 3-dimensional dot group to the x'z' plane. FIG. 12B-1 illustrates a state where a book object 3-dimensional dot group $P_m$ is orthogonal-projected to the x'z' plane. An orthogonal-projected dot group is set to $Q_n$. Where, m and n are indices to identify each dot and are integers of 0 or more. It is assumed that a correspondence relation between m and n before and after the orthogonal projection is stored in the RAM 303. Further, it is assumed that n is sequentially set to n=0, 1, 2, . . . from the dot in which a value of the x' axis is small. Dots in FIG. 12B-m show the dot group $Q_n$ which were orthogonal-projected to the x'z' plane.

In S1165, the book image photographing unit 412 calculates an approximate curve of the dot group which were orthogonal-projected to the x'z' plane by using an existing calculating method such as a method of least squares or the like. L in FIG. 12B-m denotes an approximate curve of the orthogonal-projected dot group $Q_n$.

In S1166, the book image photographing unit 412 moves each dot of $Q_n$ in the z axis direction so as to be located on the obtained approximate curve. FIG. 12B-n illustrates a state where $Q_n$ are moved onto the approximate curve L. White circles in FIG. 12B-o indicate $Q_n$ after the movement and are represented by $R_n$.

In S1167, the book image photographing unit 412 replaces a distance between the x' coordinates by a distance between two dots with respect to all of adjacent $R_n$, that is, $R_n$ and $R_{n+1}$ (n=0, 1, 2, . . . ). In this instance, assuming that a distance between two dots is set to $l_n$, a value of $x'_{n+1} - x'_n$ is replaced by using the following equation (5).

$$l_n = \sqrt{(x'_{n+1} - x'_n) + (z'_{n+1} - z'_n)^2} \tag{5}$$

FIG. 12B-p illustrates relations among $R_n$, $x_n$, and $z_n$.

In S1168, the book image photographing unit 412 moves the x' coordinate of the book object 3-dimensional dot group $P_m$ to the x' coordinate of corresponding $R_n$. When $P_m$ is seen directly overhead in this state, $P_m$ enters a state where they are extended.

In S1169, the book image photographing unit 412 extracts a rectangular area to the extended book object 3-dimensional dot group in a manner similar to S1162.

In S1170, the book image photographing unit 412 executes a converting process of the extracted rectangular area so that its size is equal to a size of book image registered in the registration database, and ends the dot group extending process.

The book projecting image generating process which is executed in S1142 will be described with reference to a flowchart of FIG. 11B-e. FIGS. 12C-t and 12C-u are schematic diagrams illustrating examples of stored images.

In S1171, the book image photographing unit 412 discriminates whether or not the contents information has been made to correspond to the book object 3-dimensional dot group. If the contents information has been made to correspond, the book image photographing unit 412 advances to S1172. If the contents information is not made to correspond, the book image photographing unit 412 ends the book projecting image generating process.

In S1172, the book image photographing unit 412 converts the dot group data which was made to correspond to the contents area from the orthogonal coordinate system into the coordinate system of the projector plane. It is assumed that a conversion matrix at this time has been obtained as described in the portion of the coordinate system in FIGS. 2-a to 2-c.

In S1173, the book image photographing unit 412 extracts an outline of the image of the contents area converted into the coordinate system of the projector plane and executes processes such as noise elimination, edge smoothing, and the like to such an image.

In S1174, the book image photographing unit 412 generates a mask image (projection image) for contents area projection in a form associated in such a manner that to which contents each area corresponds, and stores into the RAM 303. After it was stored, the book image photographing unit 412 ends the book projecting image generating process.

(Description of Solid Shape Measuring Unit)

The process which is executed by the solid shape measuring unit 413 will be described with reference to flowcharts of FIGS. 13-a and 13-b. FIGS. 14-a to 14-f are schematic diagrams for describing the process of the solid shape measuring unit 413.

When the process is started, in S1301, the solid shape measuring unit 413 instructs the turntable 209 to rotate through the serial I/F 310, thereby rotating the turntable 209 by a predetermined angle at a time. The smaller the rotation angle is, the higher the final measuring accuracy is. However, since the number of times of measurement increases and it takes a long time as a result, it is sufficient to previously decide the rotation angle which is proper as an apparatus.

In S1302, the solid shape measuring unit 413 executes a 3-dimensional dot group measuring process by using the camera unit 202 and the projector 207 to the object on the turntable 209 provided in the stage 204. FIG. 13-b illustrates the flowchart for the 3-dimensional dot group measuring process which is executed by the solid shape measuring unit 413 in S1302.

When the 3-dimensional dot group measuring process is started, in S1311, the solid shape measuring unit 413 projects a 3-dimensional shape measurement pattern 1402 from the projector 207 to a target 1401 on the turntable 209 illustrated in FIG. 14-a.

In S1312, the solid shape measuring unit 413 obtains one frame of the camera image from the camera unit 202 through the camera image obtaining unit 407.

In S1313, the solid shape measuring unit 413 extracts correspondence dots between the 3-dimensional shape measurement pattern 1402 and the obtained camera image in a manner similar to S504 in FIG. 5-a.

In S1314, the solid shape measuring unit 413 calculates a distance at each pixel on the camera image from a positional relation between the camera unit 202 and the projector 207 and generates a distance image. A measuring method in this instance is substantially the same as the measuring method described in S505 in FIG. 5-a in the process of the distance image obtaining unit 408.

In S1315, the solid shape measuring unit 413 performs a coordinate conversion into the orthogonal coordinate system with respect to each pixel of the distance image and calculates a 3-dimensional dot group.

In S1316, the solid shape measuring unit 413 removes the 3-dimensional dot group included in the stage plane from the calculated 3-dimensional dot group by using the plane parameter of the stage 204.

In S1317, the solid shape measuring unit 413 eliminates dots whose positions are largely deviated, as noises, from the remaining 3-dimensional dot group and generates a 3-dimensional dot group 1403 of the target 1401. The dots whose positions are largely deviated denote, for example, the dots which are away from a predetermined position.

In S1318, the solid shape measuring unit 413 turns off the 3-dimensional shape measurement pattern 1402 projected from the projector 207.

In S1319, the solid shape measuring unit 413 obtains a camera image from the camera unit 202 through the camera image obtaining unit 407, stores as a texture image when seen from its angle, and ends the 3-dimensional dot group measuring process.

When the solid shape measuring unit 413 executes the 3-dimensional dot group measuring process of S1302 at the second or subsequent time, in S1301, the turntable 209 is rotated and the measurement is performed. Therefore, as illustrated in FIG. 14-c, angles of the target 1401 on the turntable 209, the projector 207, and the camera unit 202 have been changed. Consequently, as illustrated in FIG. 14-d, the solid shape measuring unit 413 obtains a 3-dimensional dot group 1404 when seen from a viewpoint different from that of the 3-dimensional dot group 1403 obtained in S1302. That is, a 3-dimensional dot group of a portion which could not be calculated because it becomes a blind spot from the camera unit 202 and the projector 207 in the 3-dimensional dot group 1403 is included in the 3-dimensional dot group 1404. On the contrary, a 3-dimensional dot group which is not included in the 3-dimensional dot group 1404 is included in the 3-dimensional dot group 1403. Therefore, the solid shape measuring unit 413 executes a process for overlaying the two 3-dimensional dot groups 1403 and 1404 seen from different viewpoints.

In S1303, the solid shape measuring unit 413 reversely rotates the 3-dimensional dot group 1404 measured in S1302 by the angle at which the turntable was rotated from the initial position, thereby calculating a 3-dimensional dot group 1405 whose position is matched with that of the 3-dimensional dot group 1403.

In 1304, the solid shape measuring unit 413 executes a process for combining the 3-dimensional dot group calculated in S1303 with the 3-dimensional dot group which has already been combined. In the combining process of the 3-dimensional dot groups, an ICP (Iterative Closest Point) algorithm using a feature point is used. In the ICP algorithm, the solid shape measuring unit 413 extracts 3-dimensional feature points serving as corners from the two 3-dimensional dot groups 1403 and 1404 as combination targets. The solid shape measuring unit 413 obtains a correspondence between the feature point of the 3-dimensional dot group 1403 and the feature point of the 3-dimensional dot group 1404, calculates distances among all correspondence points, and adds them. While moving the position of the 3-dimensional dot group 1404, the solid shape measuring unit 413 repeatedly calculates a position where the sum of the distances of the correspondence points is minimum. When the number of times of repetitive calculation reaches an upper limit or the position where the sum of the distances of the correspondence points is minimum is calculated, the solid shape measuring unit 413 moves the 3-dimensional dot group 1404 and, thereafter, overlays with the 3-dimensional dot group 1403, thereby combining the two 3-dimensional dot groups 1403 and 1404. The solid shape measuring unit 413 generates a 3-dimensional dot group 1406 obtained after combining them as mentioned above, and ends the 3-dimensional dot group combining process.

When the 3-dimensional dot group combining process of S1304 is ended, the solid shape measuring unit 413 discriminates whether or not the turntable 209 has been rotated by one revolution in S1305. If the turntable 209 is not yet rotated by one revolution, the solid shape measuring unit 413 is returned to S1301, further rotates the turntable 209, executes the process of S1302, and measures a 3-dimensional dot group of another angle. The solid shape measuring unit 413 executes a combining process of the 3-dimensional dot group 1406 which has already been combined in S1303 to S1304 and a 3-dimensional dot group which was newly measured. By repeating the processes of S1301 to S1305 until the turntable 209 is rotated by one revolution as mentioned above, the solid shape measuring unit 413 can generate the 3-dimensional dot group of the whole circumference of the target 1401.

If it is determined that the turntable 209 has been rotated by one revolution in S1305, the solid shape measuring unit 413 advances to S1306 and executes a process for generating a 3-dimensional model from the generated 3-dimensional dot group. When the 3-dimensional model generating process is started, the solid shape measuring unit 413 performs a noise elimination and smoothing from the 3-dimensional dot group in S1331.

In S1332, the solid shape measuring unit 413 generates a triangular patch from the 3-dimensional dot group, thereby forming a mesh area.

In S1333, the solid shape measuring unit 413 maps the texture stored in S1319 onto a plane obtained by forming the mesh area. In this manner, the solid shape measuring unit 413 can generate a 3-dimensional model subjected to the texture mapping. In S1307, the solid shape measuring unit 413 converts data obtained after the texture mapping into a standard 3-dimensional model data format such as VRML, STL, or the like, stores into a predetermined area on the HDD 305 through the data managing unit 405, and ends the process.

(Description of Main Control Unit)

The scanning process or the like which is executed by the main control unit 402 will be described with reference to a flowchart of FIG. 15.

Figure 15:
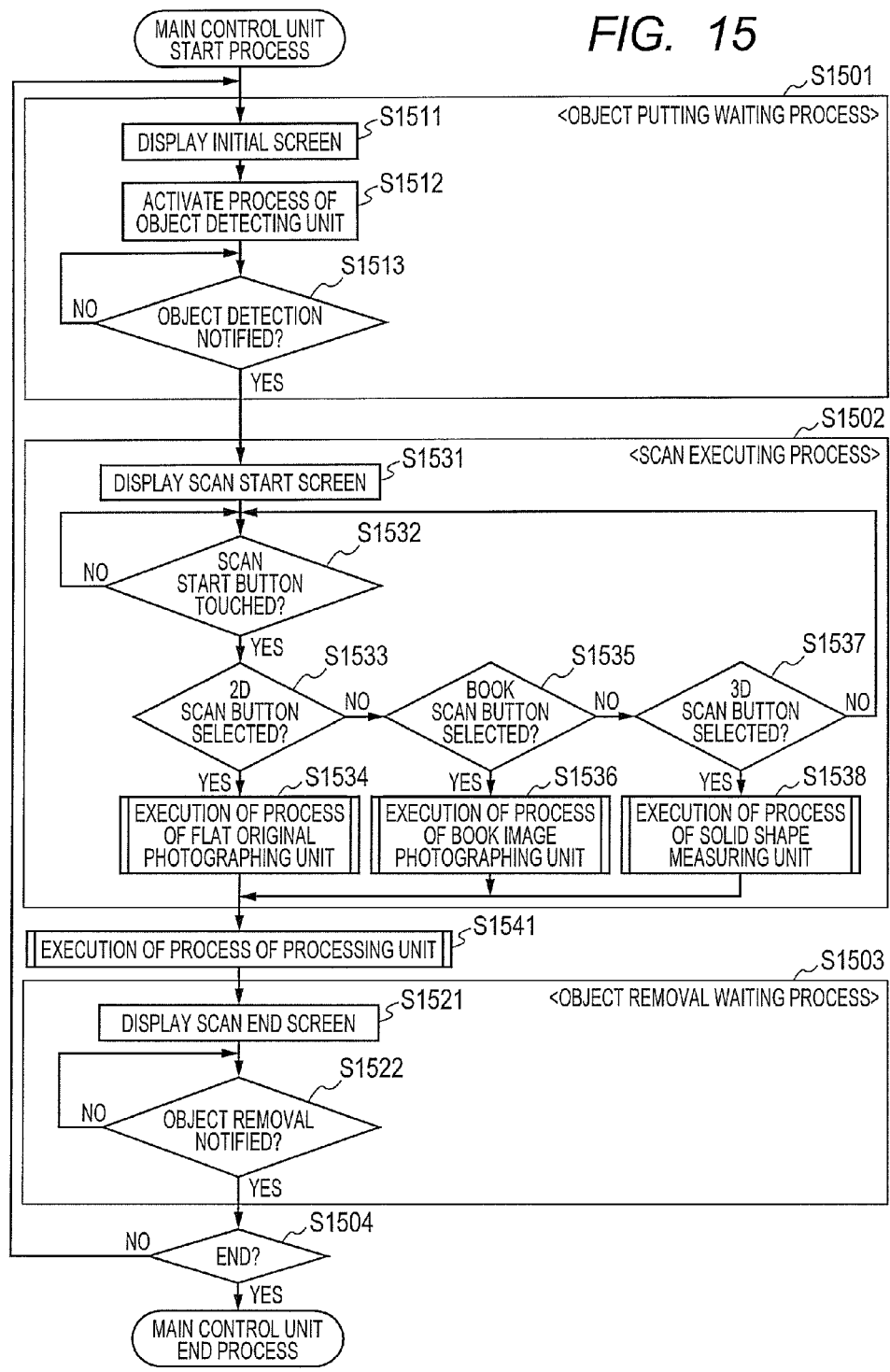
FIG. 15 is a flowchart illustrating an example of a process of a main control unit of the embodiment 1.

In FIG. 15, when the process is started, in S1501, the main control unit 402 executes an object putting waiting process for waiting until a target to be scanned is put onto the stage 204.

When the object putting waiting process is started in S1501, in S1511, the main control unit 402 projects a display screen of FIG. 16-*a* onto the stage 204 through the user I/F unit 403 by the projector 207. On the screen of FIG. 16-*a*, a message 1601 for promoting the user to put a target onto the stage 204 is projected.

In S1512, the main control unit 402 activates the process of the object detecting unit 410. The object detecting unit 410 starts execution of the processes described in the flowcharts of FIGS. 8-*a* to 8-*c*.

In S1513, the main control unit 402 waits for a notification of the object putting from the object detecting unit 410. When the object detecting unit 410 executes the process of S827 in FIG. 8-*b* and notifies the main control unit 402 that the object was put, the main control unit 402 decides the presence of the object putting notification in S1513, and ends the object putting waiting process.

When the object putting waiting process of S1501 is ended, the main control unit 402 subsequently executes a scan executing process of S1502. When the scan executing process of S1502 is started, in S1531, the main control unit 402 projects a scan starting screen illustrated in FIG. 16-*b* onto the stage 204 through the user I/F unit 403. In FIG. 16-*b*, a target 1611 is a scan target object put by the user. A 2D scan button 1612 is a button to receive a photographing instruction of a flat original. A book scan button 1613 is a button to receive a photographing instruction of a book original. A 3D scan button 1614 is a button to receive a measuring instruction of a solid shape. A scan start button 1615 is a button to receive an execution start instruction of the selected scan. From the coordinates of the touch gesture notified from the gesture recognizing unit 409 as mentioned above and the coordinates of the positions where those buttons are displayed, the user I/F unit 403 detects that any one of those buttons has been depressed by the user. After that, a description of the detection by the user I/F unit 403 is abbreviated to express "touch to the button is detected" hereinbelow. The user I/F unit 403 can exclusively select each of the 2D scan button 1612, book scan button 1613, and 3D scan button 1614. When the touch to any one of those buttons by the user is detected, the main control unit 402 sets the touched button into a selection state and cancels a selection of other buttons.

In S1532, the main control unit 402 waits until the touch to the scan start button 1615 is detected. When the touch to the scan start button 1615 is detected in S1532, the main control unit 402 advances to S1533 and discriminates whether or not the 2D scan button 1612 is in a selection state.

If the 2D scan button 1612 is in the selection state in S1533, the main control unit 402 advances to S1534, executes the process of the flat original image photographing unit 411, and ends the scan executing process.

If the 2D scan button 1612 is not in the selection state in S1533, the main control unit 402 advances to S1535 and discriminates whether or not the book scan button 1613 is in a selection state. If the book scan button 1613 is in the selection state in S1535, the main control unit 402 advances to S1536, executes the process of the book image photographing unit 412, and ends the scan executing process.

If the book scan button 1613 is not in the selection state in S1535, the main control unit 402 advances to S1537 and discriminates whether or not the 3D scan button 1614 is in a selection state. If the 3D scan button 1614 is in the selection state in S1537, the main control unit 402 advances to S1538, executes the process of the solid shape measuring unit 413, and ends the scan executing process. If it is determined by the main control unit 402 that the 3D scan button 1614 is not in the selection state in S1537, this means that each of the 2D scan button 1612, book scan button 1613, and 3D scan button 1614 is not in the selection state. Therefore, the main control unit 402 is returned to S1532. When any one of those buttons enters the selection state, the main control unit 402 waits until the touch to the scan start button 1615 is detected.

When the scan executing process of S1502 is ended, the main control unit 402 subsequently requests the processing unit 414 to execute the process of S1541. The processing unit 414 is a module for processing, in accordance with the scan executing process, the data scanned by the scan executing process. When the process is executed, the processing unit 414 also uses the information detected by the gesture recognizing unit 409 and the object detecting unit 410. In the embodiment, particularly, the processing unit 414 executes the process to the scan data of the book object. The process which is executed by the processing unit 414 will be described in detail hereinafter.

When the process by the processing unit 414 of S1541 is ended, the main control unit 402 subsequently executes an object removal waiting process of S1503. The process of S1503 includes the processes of S1521 and S1522.

When the object removal waiting process of S1503 is started, in S1521, the main control unit 402 displays a scan end screen illustrated in FIG. 16-*c* through the user I/F unit 403. In the scan end screen of FIG. 16-*c*, a message 1621 for notifying the user that the scanned original is removed is projected.

In S1522, the main control unit 402 waits until an object removal notification is received from the object detecting unit 410. The object removal notification is made by the object detecting unit 410 in S834 in FIG. 8-*c*. When there is the object removal notification in S1522, the main control unit 402 ends the object removal waiting process.

When the object removal waiting process of S1503 is ended, in S1504, the main control unit 402 executes a scan end discriminating process during the execution of the object removal waiting process of S1503. It is assumed that the scan end discrimination is performed by a scan end command which is transmitted from the host computer 102 through the network I/F 306, an end command which is input from the LCD touch panel 330, a timer setting (not shown), or the like. When the scan end command is received, the main control unit 402 ends the scanning process. When the scanning process is continued, the main control unit 402 is returned to S1501, displays the initial screen of FIG. 16-*a*, and waits until an object is put onto the stage 204. By executing such a process, when the user wants to scan a plurality of originals, such a fact that the original on the stage 204 was replaced can be detected, and the scanning of the plurality of originals can be continuously executed.

As mentioned above, according to the embodiment 1, the user can select either one of the mode for scanning the flat original, the mode for scanning the thick book, and the mode for measuring the solid shape. There is also considered a case where all of the three kinds of scanning modes are unnecessary, for example, a case where it is sufficient to execute two kinds of scanning modes such as scan of the flat original and scan of the thick book in dependence on the user's setting or the like. In such a case, it is sufficient to display in such a manner that the main control unit 402 can select two scans which are executed through the user I/F unit 403. More specifically speaking, the main control unit 402 projects only the 2D scan button 1612, book scan button 1613, and scan start button 1615 in FIG. 16-*b* through the user I/F unit 403. Thus, the input of the user who selects one of the two kinds of scanning modes can be received. There is also considered a case where it is sufficient to set only one kind of scanning mode, for example, a case where it is sufficient to execute only the scan of the flat original or only the scan of the book in dependence on the user's setting or the like. In such a case, the main control unit 402 projects only the scan start button 1615 in FIG. 16-*b* through the user I/F unit 403. It is sufficient that the main control unit 402 executes the scan when the touch to the scan start button 1615 is detected without receiving the user's selection of the kind of scan. If there is only one kind of scanning mode as mentioned above, when the putting of the object onto the stage 204 is detected, the main control unit 402 may soon execute the scan through the scan processing unit 418 without projecting the scan operating screen as illustrated in FIG. 16-*b*.

(Description of Process of Processing Unit)

The process which is executed by the processing unit 414 in the embodiment will now be described with reference to a flowchart of FIG. 17-*a*.

In S1701, the processing unit 414 confirms whether or not the present scanning mode is a mode for the book image photographing process. If YES in S1701, the processing unit 414 decides that the processing mode is a book processing mode, and advances to S1702. If NO in S1701, the processing unit 414 executes the process of another mode and ends the process of the processing unit. Since the process of another mode is not directly concerned with the embodiment, its description is omitted here.

In S1702, the processing unit 414 obtains book information from the RAM 303. The book information denotes: information (correspondence data between the coordinates and the contents as shown in FIGS. 18-*b* and 18-*c*) of the contents areas stored in the RAM 303 by the processes of S1155 and S1157 by the book image photographing unit 412; and a mask image (projection image) for book projection stored by the process of S1174. The mask image is also associated with the contents information.

In S1703, the processing unit 414 transmits the obtained mask image for book projection and information showing selection/non-selection of the contents to the user I/F unit 403 and requests the image projection by the projector 207. The user I/F unit 403 generates each projection image in accordance with whether the state of the contents of each area of the mask is a selection state or a non-selection state and executes the image projection by the projector 207 through the display unit 406. Thus, the areas having the contents information are highlight-displayed as illustrated in the areas 1713 and 1714 in FIG. 17-*b*.

In S1704, the processing unit 414 confirms whether or not there is a notification of the solid object touch detection or the plane touch detection from the gesture recognizing unit 409. If there is the notification of one of those touch detections, the processing unit 414 advances to S1705. If there are no notifications, the processing unit 414 advances to S1708.

In S1705, the processing unit 414 confirms whether or not there is contents information at the touched position. The processing unit 414 makes such a confirmation by using the book information obtained in S1702. The information in which the coordinate information and the contents are made to correspond to each other and which is illustrated in FIG. 18-c is included in the contents information obtained by the processing unit 414. When the solid object touch gesture is detected by the gesture recognizing unit 409, it is sufficient that the processing unit 414 merely confirms only the correspondence between the 3-dimensional coordinate shown by the orthogonal coordinate system and the contents as illustrated in the table of FIG. 18-b. At this time, it is sufficient that the processing unit 414 confirms whether or not the coordinates of the touched position of the solid object exist in, for example, the table of FIG. 18-b. When the plane touch gesture is detected by the gesture recognizing unit 409, it is sufficient that the processing unit 414 confirms only the table as illustrated in, for example, FIG. 18-c. At this time, it is sufficient that the processing unit 414 discriminates whether or not the plane touch coordinates exist in the plane area having the contents defined in FIG. 18-c. If there is the contents information, the processing unit 414 advances to S1706. If there are no contents information, the processing unit 414 advances to S1708.

In S1706, the processing unit 414 requests the user I/F unit 403 to change the image projection onto the book object in a manner similar to S1703.

In S1707, the processing unit 414 executes the contents confirmed from the book information (for example, tables in FIGS. 18-b and 18-c) in S1705. The execution of the contents may be displayed by the projection by the projector 207 or may be displayed on a display separately provided. The processing unit 414 may reproduce contents in another computer connected to the present system.

In S1708, the processing unit 414 confirms whether or not the end button has been depressed by the user or whether or not there is no notification of the detection of the object removal from the object detecting unit 410. Although the end button is not shown in the screen constructions illustrated in FIGS. 16-a to 16-c, it is assumed that during the execution of the application, the end button is always projected and arranged to a predetermined position. When a fact that the user touched such an area is detected, the processing unit 414 ends the application process and is returned to the initial state. When the end button has been depressed or there is the notification of the object removal detection, the processing unit 414 ends the process of FIG. 17-a. If there is not such a notification, the processing unit 414 is returned to S1704 and repeats the process.

By the above processes, when the user touches the area corresponding to the contents of the book object serving as a solid object, the contents can be reproduced. More specifically speaking, in the camera scanner 101, if the physical target which is put by the user is replaced by the interface with the electronic data, the operability of the user can be improved.

Embodiment 2

(Description of Outline of Application Processes in the Embodiment)

In the embodiment 1, the method whereby when the contents information has been made to correspond to the predetermined area of the book object put on the stage, the user touches the predetermined area with the fingertip, thereby reproducing the contents has been described. By holding the shape of the book object as dot group data, the processing unit 414 in the embodiment 1 specifies the touch to the contents area by using a result of the solid object touch detection. However, there is a case where since the book object is touched with the fingertip, the book object is moved or distorted. If the book object is moved or distorted, the book object 3-dimensional dot group stored for the first time and the position and shape of the latest book differ. Therefore, there is a case where when the user tries to touch the contents area, the touch detection by the processing unit 414 cannot be correctly performed. FIG. 19-b is a diagram schematically illustrating a state where the correspondence between the book object 3-dimensional dot group and the position of the book object itself is deviated. A book object 3-dimensional dot group 1942 is illustrated. A deviated book object itself 1941 is illustrated. In the embodiment, in order to solve such a problem, such control that after the touch having a possibility that a position or a shape of the book object changes, a book object 3-dimensional dot group is obtained again is added. By making such control, for example, in FIG. 17-b, such an operation that after certain contents was reproduced by touching the contents area 1713 by the user, the contents area 1714 is continuously touched and another contents is reproduced can be performed. Such a method will be described hereinbelow.

(Description of Process of Processing Unit)

FIG. 19-a is a flowchart illustrating an example of the process of the processing unit 414 in the embodiment. This process is fundamentally similar to the process of the processing unit 414 mentioned in the embodiment 1. Therefore, a description of the processes which have already been mentioned is omitted.

The processing unit 414 obtains contents information of the book in S1702 and instructs the user I/F unit 403 to project to the book in S1703. After that, the processing unit 414 discriminates whether or not a cancellation of the solid object touch has been detected. This method will be described in the process of the gesture recognizing unit 409, which will be described hereinafter. If the cancellation of the solid object touch has been detected, the processing unit 414 advances to S1902 and executes an updating process of the book information. The cancellation of the solid object touch mentioned here denotes that the user separated the hand from the solid object and ended the touch gesture.

In S1902, the processing unit 414 executes S802 and S1912. The process of S802 is the object putting detecting process of the object detecting unit 410 described in FIG. 8-a. By executing such a process again at this timing through the object detecting unit 410, the processing unit 414 can obtain the 3-dimensional dot group of the solid object just after the hand was separated from the book object and the camera image.

In S1912, the processing unit 414 executes all of the processes of the book image photographing unit 412 described in FIGS. 11A-a to 11A-b and FIGS. 11B-c to 11B-e through the book image photographing unit 412. By those processes, the processing unit 414 can make the book object 3-dimensional dot group and the contents information correspond to each other and can obtain the book information just after the touch again.

When the process of S1912 is ended, the processing unit 414 is returned to S1702 and obtains the book information again. If a solid object touch cancellation is not detected in S1901, the processing unit 414 advances to S1704.

(Process of Gesture Recognizing Unit)

As mentioned above, in the embodiment, since the processing unit 414 obtains the book object 3-dimensional dot group again at the timing after the touch through the object detecting unit 410, it is necessary to detect that the apparatus has entered a state where the finger was separated from the book object and the shape of the book object can be obtained. When the object has been moved or distorted by the touch, although the book object 3-dimensional dot group exist at the original position, the object itself at a moment when the finger is separated is located at another position. Therefore, the gesture recognizing unit 409 cannot detect the touch cancellation from the solid object merely from a fact that the fingertip was moved away from the book object 3-dimensional dot group. However, in the case where the hand was moved to a position higher than a predetermined height after the solid object touch detection or by detecting such a fact that the hand was out of a predetermined area after the solid object touch detection, the gesture recognizing unit 409 can decides that the solid object touch cancellation was detected. The solid object touch cancellation detecting process by the gesture recognizing unit 409 is added to the flowchart of FIG. 6. FIG. 20A-a is a flowchart illustrating an example of the gesture discriminating process of the gesture recognizing unit 409 to which the process for detecting the solid object touch cancellation from the book object was added. Since processes other than the gesture discriminating process are similar to those in FIG. 6 described in embodiment 1, a description about the processes which have already been mentioned is omitted here.

First, in S1921 in FIG. 20A-a, the gesture recognizing unit 409 discriminates whether or not the solid object touch cancellation has been performed. This discriminating process will be described in detail hereinbelow with reference to FIGS. 20A-a and 20A-d.

In S1922, the gesture recognizing unit 409 confirms whether or not the solid object touch cancellation has been decided. If the solid object touch cancellation has been decided, the gesture recognizing unit 409 advances to S1923. If NO, S641 follows.

In S1923, the gesture recognizing unit 409 sets a solid object touch flag to false. The solid object touch flag is a flag showing that the present state is a state after the solid object was touched. In a default state, this flag has been set to false. The solid object touch flag is set to true in S1924, which will be described hereinafter.

In S1925, the gesture recognizing unit 409 decides that there is a solid object touch cancellation gesture, and ends the gesture discriminating process. Since the processes of S641 to s646 and S651 to S654 have already been described above with reference to FIG. 6, their description is omitted here. If it is determined in the process of S653 that the distance between the solid object and the dot group is less than the predetermined value, this means that the gesture recognizing unit 409 detected the solid object touch. In this case, the gesture recognizing unit 409 advances to S1924 and sets the solid object touch flag to true.

Subsequently, the solid object touch cancellation discriminating process which is executed in S1921 will be described with reference to flowcharts of FIGS. 20A-c and 20A-d. FIG. 20A-c is the flowchart illustrating an example of a process for discriminating whether or not the hand exists at a height position which is equal to or higher than a predetermined height after the touch. FIG. 20A-d is the flowchart illustrating an example of a process for discriminating whether or not the hand is out of a predetermined area after the touch. The gesture recognizing unit 409 performs the solid object touch cancellation discrimination by one of those processes. It is also possible to construct in such a manner that the gesture recognizing unit 409 executes both of those processes and if a result of one of those discriminating processes is YES, the solid object touch cancellation is decided, or only when the results of both of them are YES, the solid object touch cancellation is decided.

In S1961, the gesture recognizing unit 409 confirms whether or not the solid object touch flag is true. If it is true, the gesture recognizing unit 409 advances to S1962. If it is false, the gesture recognizing unit 409 ends the solid object touch cancellation discriminating process.

In S1962, the gesture recognizing unit 409 discriminates whether or not the hand has been separated from the solid object. This discriminating process will be described in detail hereinbelow with reference to the flowchart of FIG. 20A-b.

In S1931, the gesture recognizing unit 409 discriminates whether or not the hand exists at a height position which is equal to or higher than the predetermined height. In this discriminating process about the height of the hand, the coordinates of the dot group of the hand area detected in S631 in FIG. 6 or the coordinates of the fingertip detected in S634 are used. The 3-dimensional coordinates existing at the lowest position (position where the z coordinate is small) in the dot group of the hand area or, if the fingertip coordinates were found, the 3-dimensional coordinates of the fingertip whose coordinates exist at the lowest position are set to a bottom point of the hand. Describing with reference to a schematic diagram of FIG. 20B-f, a distance from the bottom point of the hand using the dot group of the hand area to the stage 204 is shown at 1952. A distance from a fingertip point 1944 to the stage 204 is shown at 1945. It is sufficient that the gesture recognizing unit 409 confirms whether or not the distance from the bottom point of the hand to the stage 204 is equal to or larger than a predetermined value. The predetermined value in this instance may be a value which has been present by the user or may be a height 1946 of a top (z axis is maximum) point of the solid object 1208 (in this instance, book object) put on the stage 204 in FIG. 20B-f. If the height of the hand is equal to or higher than the predetermined value, the gesture recognizing unit 409 advances to S1932 and sets a hand separation state flag showing a state where the hand is separated from the solid object into true. If the height of the hand is lower than the predetermined value, the gesture recognizing unit 409 advances to S1933 and sets the hand separation state flag to false.

In S1934, the gesture recognizing unit 409 discriminates whether or not the hand separation state flag has been changed from false to true by the preceding process. If a discrimination result is YES (if it is decided that the flag has been changed), the gesture recognizing unit 409 advances to S1935 and determines that the hand has been separated from the solid object, and ends the hand separation discriminating process. On the other hand, if the discrimination result is NO (if it is decided that the flag is not changed), the gesture recognizing unit 409 ends the hand separation discriminating process as it is.

When the hand separation discriminating process is ended, the gesture recognizing unit 409 advances to S1963 in FIG. 20A-c. In S1963, the gesture recognizing unit 409 confirms whether or not the hand separation has been decided. If a confirmation result is YES (if it is confirmed that the hand separation has been decided), the gesture recognizing unit 409 advances to S1964, decides that the solid object touch has been cancelled, and ends the solid object touch cancellation discriminating process. If the confirmation result is NO (if it is not confirmed that the hand separation has been decided), the gesture recognizing unit 409 ends the solid object touch cancellation discriminating process as it is.

Subsequently, the solid object touch cancellation discriminating process of FIG. 20A-d will be described. In the process of FIG. 20A-c, the gesture recognizing unit 409 discriminates whether or not the height of the hand is equal to or higher than the predetermined value. On the other hand, in this process, the gesture recognizing unit 409 discriminates whether or not the hand area is out of the predetermined area, thereby discriminating the solid object touch cancellation. In other words, the process of FIG. 20A-c is also a process for discriminating whether or not the hand area is out of the predetermined area in the height direction. However, in the process of FIG. 20A-d, the gesture recognizing unit 409 discriminates the touch cancellation by using a range which is not limited only to the height direction.

In S1961, the gesture recognizing unit 409 confirms whether the solid object touch flag is true or false in a manner similar to S1961 in FIG. 20A-c. If the solid object touch flag is true, the gesture recognizing unit 409 advances to S1971. If it is false, the solid object touch cancellation discriminating process is ended.

In S1971, the gesture recognizing unit 409 discriminates whether or not the hand area is extinguished from the predetermined area. This discriminating process will be described in detail hereinbelow with reference to a flowchart of FIG. 20A-e.

In S1981 in FIG. 20A-e, the gesture recognizing unit 409 discriminates whether or not the hand exists in the predetermined area. This discriminating method is schematically illustrated in, for example, FIG. 20B-h. A range 1950 shows an area extending on the stage 204. That is, it is a space area which uses the stage 204 as a bottom surface and extends in parallel with the z axis direction. When seeing by the orthogonal coordinate system, the gesture recognizing unit 409 discriminates whether or not a dot group 1943 of the hand area exists in the range 1950. The gesture recognizing unit 409 may discriminate whether or not the fingertip exists in the range 1950 without using the dot group of the hand area. As another method, there is a method schematically illustrated in FIG. 20B-g. An area surrounded by broken lines 1948 and 1953 indicates an angle of view of the camera unit 202. It is sufficient that the gesture recognizing unit 409 discriminates whether or not the dot group 1943 of the hand area exists in this space area. The space area of the angle of view (1948, 1953) can be obtained from the external parameter of the camera. Such a discrimination may be performed simply by checking whether the dot group 1943 of the hand area exists in or out of an internal space of a cone in which the position of the camera is set to a vertex and the plane of the stage 204 is set to a bottom surface. The invention is not limited to such an inside/outside discrimination of the dot group of the hand area, but an inside/outside discrimination of the fingertip point 1944 may be performed. As an inside/outside discriminating method, it can be discriminated by comparing a distance 1945 vertically depending from the fingertip point 1944 to the stage 204 with a height 1949 from the stage 204 of the angle of view 1953 at that position. A similar discriminating process can be performed even by using the distance 1952 vertically depending from the bottom point of the hand area to the stage 204. The method of discriminating whether or not the hand area exists in the predetermined area is not limited to those methods but another method may be used. The gesture recognizing unit 409 executes any one of those methods or a combination of a plurality of ones of those methods in S1981. If it is decided that the hand area exists in the predetermined area, the gesture recognizing unit 409 advances to S1982 and decides a state of the presence of the hand area. If it is decided that the hand area does not exist, the gesture recognizing unit 409 advances to S1983 and decides a state of the absence of the hand area.

In S1984, the gesture recognizing unit 409 discriminates whether or not the hand area has been changed from the state of the presence of the hand area to the state of the absence of the hand area in the discrimination of the preceding state. If a discrimination result is YES (if it is determined that the hand area has been changed), the gesture recognizing unit 409 advances to S1985 and decides that the hand area has been extinguished from the predetermined area, and ends the hand area extinction discriminating process. If the discrimination result is NO (if it is determined that the hand area is not changed), the gesture recognizing unit 409 ends the hand area extinction discriminating process as it is. When the hand area extinction discriminating process is ended, the gesture recognizing unit 409 advances to S1972 in FIG. 20A-d.

In S1972, the gesture recognizing unit 409 discriminates whether or not the hand area extinction has been decided. If a discrimination result is YES (if it is determined that the hand area extinction has been decided), the gesture recognizing unit 409 advances to S1964 in a manner similar to FIG. 20A-c, decides the solid object touch cancellation, and ends the solid object touch cancellation discriminating process. If the discrimination result is NO (if it is determined that the hand area extinction is not decided), the gesture recognizing unit 409 ends the solid object touch cancellation discriminating process as it is.

Although the gesture recognizing unit 409 discriminates whether or not the hand area in the space coordinates has been extinguished from the predetermined area here, it may be discriminated by using only the camera image of the object detecting unit 410. That is, the gesture recognizing unit 409 extracts a hand area from a skin-colored area of the camera image and, merely by discriminating whether or not the hand area has been frame-out from the camera image, whether or not the hand has been extinguished from the predetermined area can be discriminated.

By the above processes, even in the case where the book object was moved or distorted after the touch to the book object, the touch to the contents area of the book object can be detected again. Thus, the operability of the user can be improved.

Embodiment 3

(Description of Outline of Application Processes in the Embodiment)

Figure 21C:
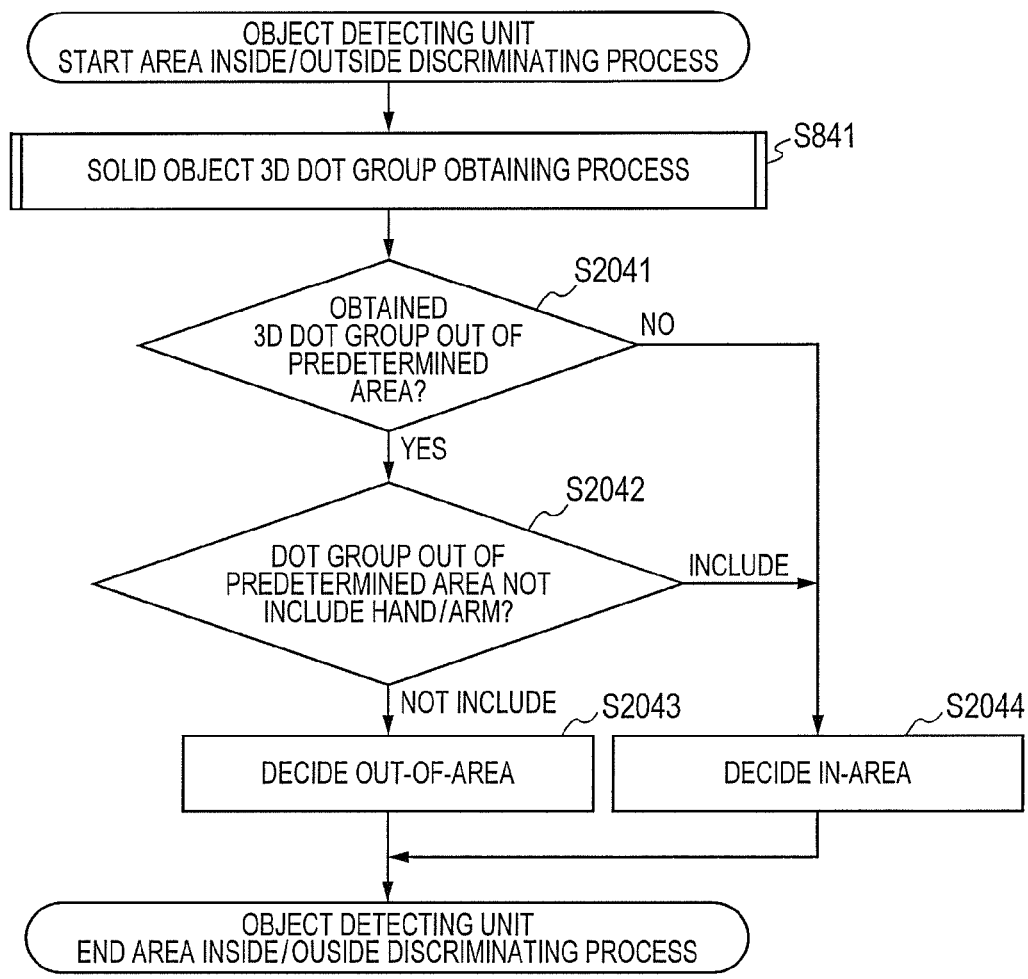

In the embodiment 2, there has been described the method whereby when the user has executed the touching operation to the book object in order to reproduce the contents, even if the book object was moved or distorted, the next touch can be detected. However, a case where a degree of the movement or distortion of the book object is large and, in this state, the correspondence to the contents area cannot be performed is also considered. In the embodiment, a method whereby, in such a case, in order to put the book object again to a position suitable for the correspondence to the contents area, an error display is presented to the user will be described. In FIG. 21A-b, when a book object 2061 is out of the stage 204, an error display 2062 to promote the user to put the book object again is projected from the projector 207 and presented to the user. FIG. 21A-c illustrates a state where when the book image photographing unit 412 cannot recognize the page of the book object due to such a reason that the shape of the book object 2061 is largely distorted or the like, an error display 2063 is projected from the projector 207. When the object is moved or distorted due to the touch of the user, there is also a case where the touch itself to the contents area of the book object by the user which became a cause of the movement or distortion has been concluded. In such a case, as illustrated in FIG. 21A-*d*, while the processing unit 414 is reproducing the contents to an area 2065, an error display 2064 to promote the user to put the book object again in order to enable the next touch to be detected may be displayed. Those realizing methods will be described hereinafter.

<Description of Process by Processing Unit>

The process of the processing unit 414 in the embodiment is illustrated in a flowchart of FIG. 21A-*a*. This process is constructed by adding an error process of S2001 to the flowchart for the process of the processing unit 414 in the embodiment 2 illustrated in FIG. 19-*a*. Therefore, a description of the processes which have already been mentioned is omitted here.

By the error process shown in S2001, the processing unit 414 discriminates about the presence or absence of an error. If there is the error, a process for displaying the error and a process for waiting for re-putting are executed. This process will be described in detail hereinbelow with reference to FIG. 21B. As timing for executing the error process, there are two times of timing after S1701 and timing after S1902. More specifically speaking, first, S2001 is executed just after the processing unit 414 determined the book processing mode in S1701. Second is the timing just after the processing unit 414 determined that the solid object touch cancellation gesture has been executed in S1901 and the book information updating process of S1902 was ended. By using the information updated in S1902, the processing unit 414 discriminates whether or not the putting state of the book is the error state. If the error state is decided, the processing unit 414 waits for the re-putting. When the book object is put again, the processing unit 414 updates the book state. Therefore, after the process of S2001, the error-less state is obtained.

A state after the processing unit 414 detected the touch to the contents area in S1704 and S1705 and the contents was reproduced in S1707 is now considered. If the touch to the end button or the removal of the book is not detected in S1708, the processing unit 414 is returned to S1901 and repeats the process. At this time, although the processing unit 414 has already reproduced the contents, if there is an error, the processing unit 414 can also perform the error display simultaneously with the reproduction of the contents. Thus, since the user can confirm the error display while confirming the contents, the operability is improved.

Subsequently, the error process which is executed in S2001 will be described with reference to a flowchart of FIG. 21B.

In S2011, the processing unit 414 discriminates whether or not there is an error in the state on the present stage 204. As an error which is discriminated, there are: a page recognition error showing a fact that such a recognition of a page image that which page in the book image in the registration database has been opened could not be made; and an out-of-area error showing a fact that the book object is out of the predetermined area. In other cases, it is determined that there are no errors. The error discriminating process will be described in detail in processes in S2021 and subsequent steps.

In S2021, the processing unit 414 requests the object detecting unit 410 to discriminate whether or not the solid object exists in the predetermined area. This process will be described in detail hereinafter with reference to a flowchart for the object detecting unit area inside/outside discriminating process in FIG. 21C.

A process of S841 in FIG. 21C is the solid object 3-dimensional dot group obtaining process described in FIG. 8-*b*. By this process, the object detecting unit 410 can obtain a solid object 3-dimensional dot group existing on the present stage 204.

Subsequently, in S2041, the object detecting unit 410 discriminates whether or not the solid object 3-dimensional dot group obtained just before is out of the predetermined area. This discrimination can be made by the method as described in FIGS. 20B-*h* and 20B-*g*, that is, by a method similar to the method of discriminating whether or not the dot group of the hand area is in the predetermined area. If even a part of the solid object 3-dimensional dot group is out of the predetermined area, the object detecting unit 410 may decide that the solid object 3-dimensional dot group is out of the predetermined area. The object detecting unit 410 may perform the predetermined area inside/outside discriminating process on the basis of a value of percentage of the obtained 3-dimensional dot group existing out of the predetermined area. Now, assuming that the reading area 205 is a bottom surface, a space over such a bottom surface is proper as a predetermined area mentioned here. However, a space over the stage 204 or another space defined by the user may be used. If a discrimination result of S2041 is YES (if it is determined that the solid object 3-dimensional dot group is out of the predetermined area), the object detecting unit 410 advances to S2042. If it is NO (if it is determined that the solid object 3-dimensional dot group is not out of the predetermined area), the object detecting unit 410 advances to S2044. In S2042, the object detecting unit 410 discriminates whether or not a block of the 3-dimensional dot groups out of the predetermined area includes the hand area. It is sufficient that the object detecting unit 410 discriminates whether or not it includes the hand area by discriminating whether or not the 3-dimensional dot group has information of skin-color. The dot group in which the 3-dimensional dot groups having the information of skin-color exist as a block of a predetermined value or more can be determined as a hand area. A dot group of another color coupled with such a dot group can be determined as an arm area or an area gripped by the hand. Even in the case where a plurality of blocks of the 3-dimensional dot groups are detected, if the skin-colored dot group is included in at least one of them, in S2042, the object detecting unit 410 decides that the hand is included. If a discrimination result of S2042 is YES (if it is determined that the hand area is not included), the object detecting unit 410 advances to S2043. If it is NO (if it is determined that the hand area is included), the object detecting unit 410 advances to S2044.

In S2043, the object detecting unit 410 decides that the dot group is out of the area, and ends the object detecting unit area inside/outside discriminating process. In S2044, the object detecting unit 410 decides that the dot group is in the area, and ends such a process. When the object detecting unit area inside/outside discriminating process is ended, the object detecting unit 410 advances to S2022 in FIG. 21B.

In S2022, the processing unit 414 confirms whether it is determined that the dot group is in the area or out of the area in the preceding process. If it is decided that the dot group is in the area, the processing unit 414 advances to S2023. If it is decided that the dot group is out of the area, the processing unit 414 advances to S2027, determines the out-of-area error, and ends the error discriminating process.

In S2023, the processing unit 414 executes a process for discriminating whether or not the page recognition could be made as shown in S2051 to S2053.

In S2051, the processing unit 414 confirms the book information stored in the RAM 303 and confirms whether or not the page is specifiable. If the page is specifiable, the processing unit 414 decides a success in the page recognition in S2052. If the page is not specifiable, the processing unit 414 decides a failure in the page recognition in S2053. After the decision, the processing unit 414 ends the page recognition discriminating process, and advances to S2024 in FIG. 21B.

In S2024, the processing unit 414 discriminates whether or not the page recognition is successful. If a discrimination result is a success, the processing unit 414 decides that there are no errors in S2025, and ends the error discriminating process. If the discrimination result is a failure, the processing unit 414 decides that there is the page recognition error, and ends the error discriminating process.

In this flowchart, the processing unit 414 discriminates the two kinds of errors such as out-of-area error and page recognition error. However, another error discriminating process may be executed. For example, the processing unit 414 may execute such an error discriminating process that a ratio of the book object 3-dimensional dot group to an area of the bottom surface is calculated and, when a ratio value is equal to or larger than a predetermined value, it is determined that the book object is too distorted.

In S2012, the processing unit 414 confirms whether or not the error was decided in the preceding process. If there is the error decision, the processing unit 414 advances to S2013. If there are no errors, S2016 follows.

In S2013, the processing unit 414 generates a projecting image according to a kind of error decided in S2011. The processing unit 414 instructs the user I/F unit 403 to project the generated image by using the projector 207. When such an instruction is received, the user I/F unit 403 projects an error display to a predetermined position.

In S2014, the processing unit 414 executes a process for waiting until the book object is put again by the user shown in S2031 to S2032. Upon detection of the re-putting, the object removal detecting process and the object putting detecting process are executed by the object detecting unit 410.

First, in S2031, the object detecting unit 410 waits until there is a notification of the object removal detection by the foregoing object removal detecting process. When the notification of the object removal detection is received, the object detecting unit 410 advances to S2032.

In S2032, the object detecting unit 410 waits until there is a notification of the object putting by the foregoing object putting detecting process. When the notification of the object putting is received, this means that the object was put after the object removal, that is, the object was put again, the object detecting unit 410 ends the re-putting detecting process. When the re-putting detecting process is ended, the object detecting unit 410 advances to S1902 in FIG. 21B. Since the process of S1902 is the book information updating process described in FIG. 19-a, a description of the processes which have already been mentioned is omitted. By those processes, the processing unit 414 can obtain the shape of the book and contents information again. When the process of S1902 is ended, the processing unit 414 is returned to S2011 and performs the error detection again.

If it is decided that there are no errors in S2012, the processing unit 414 advances to S2016. When the error display has already been performed, in S2016, the processing unit 414 instructs the user I/F unit 403 to delete the error display. After such a process, the processing unit 414 ends the error process.

By the above processes, the error display is performed in accordance with a degree of the movement or distortion of the book object, thereby enabling the user to be promoted to put the book object again. Thus the operability of the user can be improved.

Embodiment 4

(Description of Outline of Application Processes which are Executed in the Embodiment)

In the embodiment 3, the method whereby in the case where after the user touched the book object, the book object is largely moved or distorted and it becomes difficult to recognize the book object, the error display is presented, and the re-putting by the user is detected has been described. In the embodiment 3, the method whereby even if the book object was largely moved and was out of the area, when the touch to the contents area by the user has been concluded, the contents is also reproduced simultaneously with the error display is used. However, according to such a method, such a situation that a reproducing area of the contents or an area of the error display cannot be sufficiently obtained is also considered. There is also a case where the user does not want to make them exist mixedly. In the embodiment, since those cases are considered, a method of reproducing the contents at the timing when the touch cancellation to the solid object has been detected instead of the timing when the touch to the solid object has been detected will be described. In the case where the book object was largely moved or distorted at the timing when the touch has been detected, the processing unit 414 performs the error display for promoting the user to put the book object again through the user I/F unit 403. Such a state is illustrated in, for example, a schematic diagram of FIG. 22A-b. If the touch by the user has been concluded, the processing unit 414 stores the contents. At a point of time when the re-putting by the user has been detected, the processing unit 414 executes the reproduction of the contents which has been concluded by the touch. Such a state is illustrated in, for example, a schematic diagram of FIG. 22A-c. An area 2143 is an area where the contents has been reproduced. A method of realizing such processes will be described hereinbelow.

(Description of Process by Processing Unit)

FIG. 22A-a is a flowchart illustrating an example of the process which is executed by the processing unit 414. This flowchart is constructed by changing the flowchart of FIG. 21A-a described in the embodiment 3 so that the foregoing application processes are executed. Therefore, a description of the processes which have already been mentioned is omitted.

Unlike the flowchart of FIG. 21A-a, in the flowchart of FIG. 22A-a, after the solid object touch cancellation, the error process different from the error process at the first time is executed. The processes of S1702 and S1703 are executed after each error process. Further, timing for reproducing the contents differs. First, the user touches the book object and even if the discrimination results of S1704 and S1705 are YES, the processing unit 414 does not reproduce the contents soon but temporarily stores information showing which one of the contents instructed by the touch into the RAM 303 as shown in S2103.

After the processing unit 414 was returned to S1901 through S1708, if the solid object cancellation is not detected, S2104 follows.

In S2104, the processing unit 414 confirms whether or not the contents has been stored. If the contents is not stored, the processing unit 414 advances to S1704. After such a process, S2103 follows. If the touch to the contents area was detected, the processing unit 414 stores the contents. If the contents was stored in S2104, the processing unit 414 advances to S1708 without newly storing the contents, and repeats the processes.

When the solid object touch cancellation is detected in S1901, the processing unit 414 executes S2101 through S1902. In S2101, the processing unit 414 executes the error process after the solid object touch cancellation.

Figure 22B:
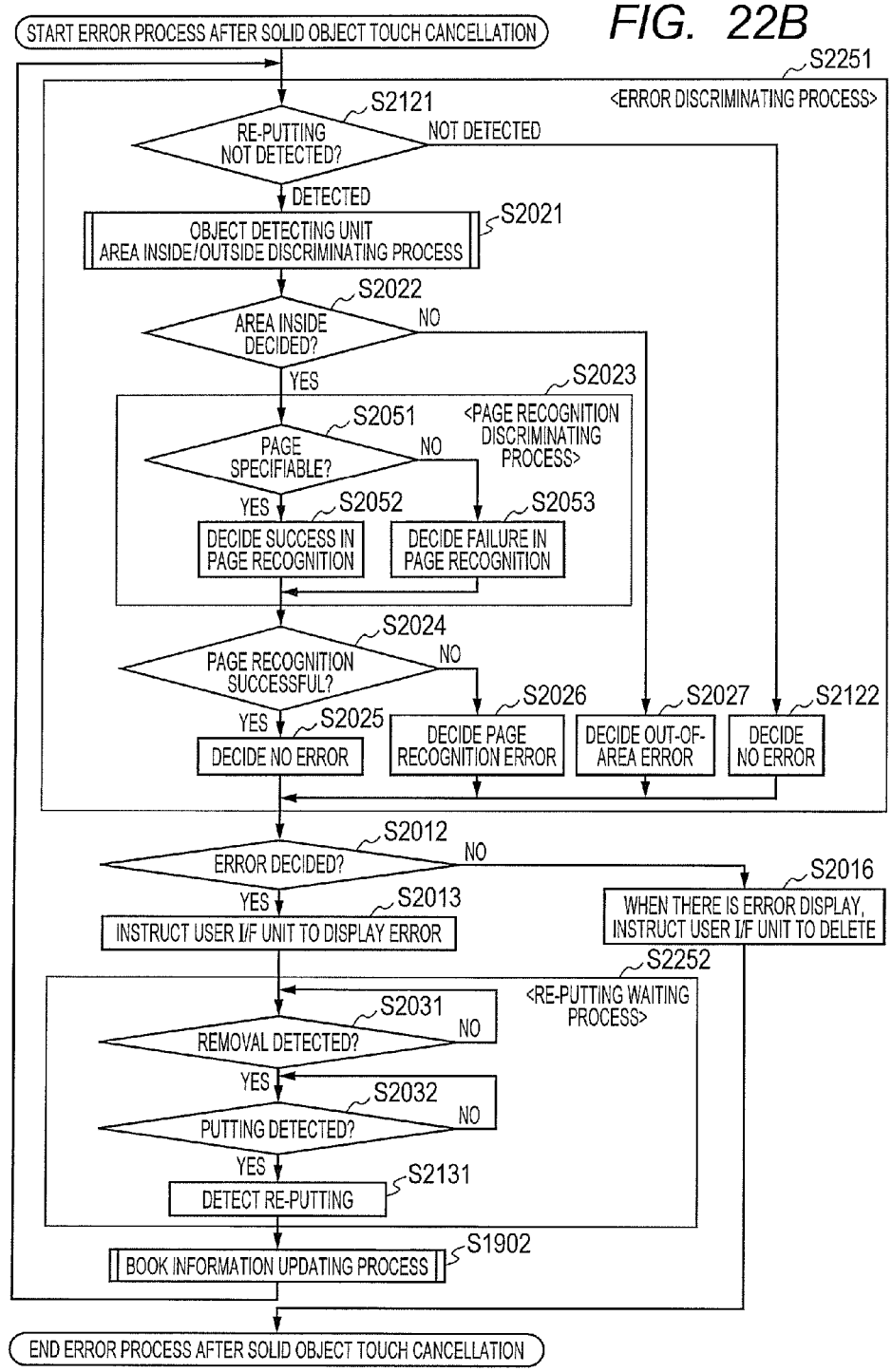

FIG. 22B is a flowchart showing an example of the error process after the solid object touch cancellation. In this process, the error discriminating process and the re-putting waiting process in the flowchart of FIG. 21B showing details of the error process of S2001 described in the embodiment 3 are partially different. Since other processes are similar to the error process in the embodiment 3, a description of the processes which have already been mentioned is omitted here.

First, the re-putting waiting process of S2252 will be described. Unlike the re-putting waiting process in the embodiment 3, in the re-putting waiting process in the embodiment 4, the processing unit 414 temporarily stores information showing that the re-putting was detected in S2131 into the RAM 303.

Subsequently, the error discriminating process of S2251 will be described. The error discriminating process in the embodiment differs from the error discriminating process in the embodiment 3 with respect to a point that, first, the object detecting unit 410 confirms whether or not the re-putting has already been detected in S2121. If the re-putting has already been detected, that is, in the case of the error discriminating process in the second round of a loop of the error process in FIG. 22B, the object detecting unit 410 advances to S2122. On the other hand, if the re-putting is not detected, that is, in the case of the error discriminating process of the first time of the loop, the object detecting unit 410 advances to S2021. Since processes in S2021 and subsequent steps are similar to the process of S2011 in the embodiment 3, their description is omitted here.

The process of S2122 is executed when the re-putting has already been detected once by the object detecting unit 410. In this case, in order to decide that the user purposely put the object in that manner, the object detecting unit 410 decides that there are no errors and ends the error discriminating process. Returning to a description of FIG. 22A-a, when the error process of S2001 is ended, the processing unit 414 advances to S2102 through S1702, S1703, and the like. The process of S2102 is a process for reproducing the contents stored by the processing unit 414. The process of S2102 includes processes of S2111, S1706, S1707, and S2114.

First, in S2111, the processing unit 414 confirms whether or not the contents has been stored. If the contents has been stored, the processing unit 414 advances to S1706. The process of S1706 is a process for changing the projection image as mentioned above.

Subsequently, in S1707, the processing unit 414 reproduces the contents. The process of S1707 is also as mentioned above.

In S2114, the processing unit 414 deletes the storage of the contents temporarily stored in the RAM 303. After those processes, the processing unit 414 ends the contents reproducing process.

By the above processes, the contents can be reproduced for the first time at the timing when the solid object touch cancellation has been detected. Even in the case where the apparatus entered the error state, since the contents had been stored, the contents can be reproduced at the timing when the re-putting has been detected. Thus, the operability of the user can be improved.

Embodiment 5

(Description of Outline of Application Processes which are Executed in the Embodiment)

In the embodiments so far, the book image photographing unit 412 certainly extends the curved surface of the book and makes the book image correspond to the contents by using the book object 3-dimensional dot group. However, if such a process is executed by a processor with a low processing ability, enough performance is not obtained and such a situation that a processing speed is low is also considered. Therefore, when a degree of distortion of the curved surface of the book is smaller than a predetermined value, the book image photographing unit 412 of the embodiment does not execute the process for making the book image correspond to the contents by extending the curved surface, but corrects the image only by the flat image process and makes the book image correspond to the contents. When the degree of distortion of the curved surface of the book object is small, there is a case where an enough accuracy is obtained by the correction of only the flat image process. In such a case, this means that the shape of the book object is approximated by the plane. Thus, the process for extending the curved surface can be omitted and the processing ability can be improved.

(Description of Process of Book Image Photographing Unit)

The process of the book image photographing unit 412 in the embodiment will be described with reference to flowcharts of FIG. 23A and FIGS. 23C-a to 23C-c and a schematic diagram of FIG. 23B.

Figure 23A:
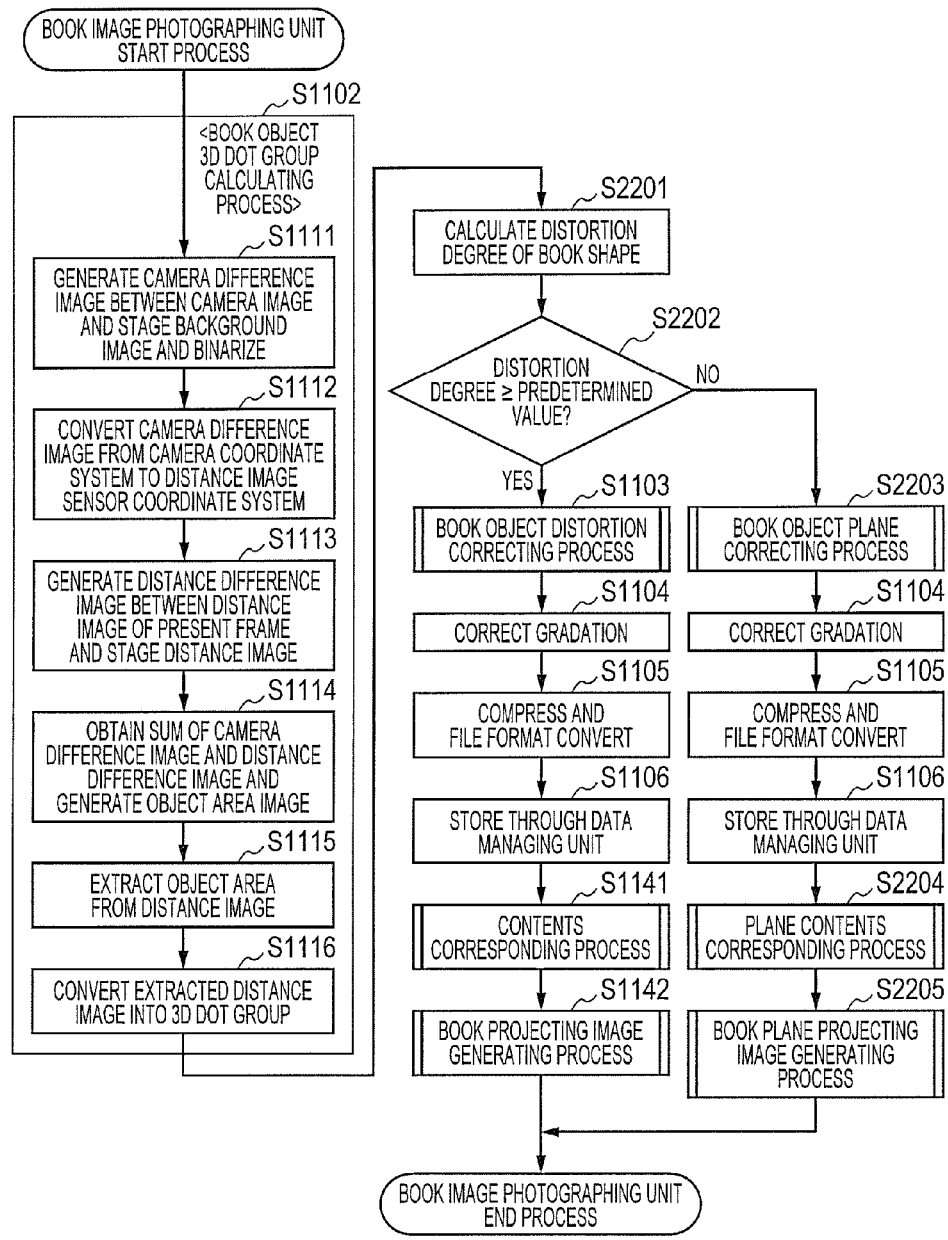
FIG. 23A is a flowchart (part 1) illustrating an example of a process of a book image photographing unit of an embodiment 5.
Figure 23B:
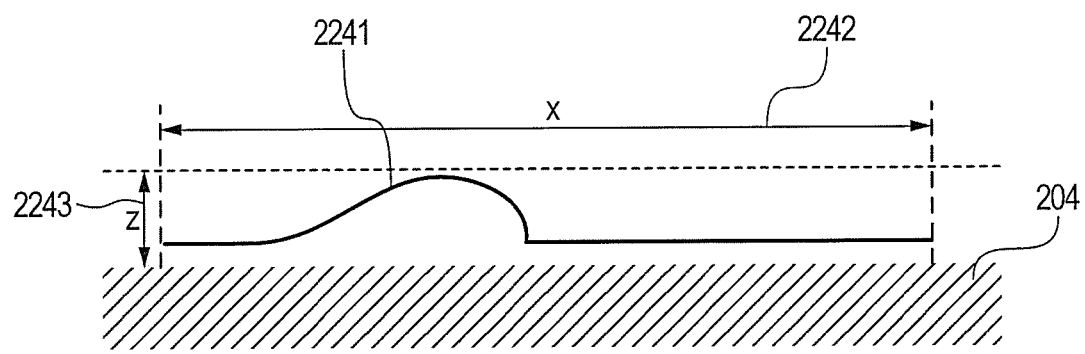
FIG. 23B is a schematic diagram (part 4) for describing the process of the book image photographing unit.

A process of S1102 in FIG. 23A is the same as the process described in FIG. 11A-a. In this instance, the book image photographing unit 412 obtains a book object 3-dimensional dot group.

In S2201, the book image photographing unit 412 calculates the degree of distortion of the book object by using the obtained book object 3-dimensional dot group. FIG. 23B is a diagram of the book object seen from the −y direction (from the side). FIG. 23B illustrates a state where a book object 2241 has been put on the stage 204. In this instance, since the book object 3-dimensional dot group could be obtained, a height 2243 (range where the dot group exists in the z axis direction) of the book object is known. A width 2242 (range where the dot group exists in the x axis direction) of the book object is known. The book image photographing unit 412 calculates a ratio z/x between z and x and can define such a value as a distortion degree (distortion value). When a viewpoint is converted to the image from the +z direction, the book image photographing unit 412 can obtain an area of the book object seen from the upside. In this instance, the book image photographing unit 412 may define a value of z/(area of the book object) to be a distortion degree.

In S2202, the book image photographing unit 412 compares the distortion degree obtained in S2201 with a predetermined distortion degree. The predetermined distortion degree also depends on the external parameter of the camera unit 202. The distortion degree in which a correction for extending a distortion of the book is necessary varies in dependence on the angle of view of the camera unit 202. Therefore, it is assumed that the predetermined distortion degree is set by the user by using a calibration result or the like of the camera unit 202 so as to lie within a range where the book image can be made to correspond to the contents. If the book image is distorted by a degree larger than a predetermined value in S2202, the book image photographing unit 412 advances to S1103. If it is not distorted by a degree larger than the predetermined value, S2203 follows.

Processes of S1103 to S1142 are the same as those in FIG. 11A-a and relate to a process for making the book image correspond to the contents by using the distortion correction.

In S2203, the book image photographing unit 412 generates an image of the book object only by a plane correcting process by using the camera image of the book object. This process will be described in detail hereinbelow with reference to a flowchart of FIG. 23C-a. S1122 in FIG. 23C-a is a process for extracting the object area from the camera image as also described in FIG. 11A-b.

In S2211, the book image photographing unit 412 approximates the extracted object area by a quadrangle (square).

In S2212, the book image photographing unit 412 projective-transforms the image of the quadrangle-approximated object area into a rectangular image and ends the book object plane correcting process. After that, the book image photographing unit 412 advances to S1104 in FIG. 23A.

Processes of S1104 to S1106 are similar to the processes in FIG. 11A-a and have such contents that the correction, compression, and the like are performed and the data is stored into the PAM 303.

In S2204, the book image photographing unit 412 executes a contents corresponding process using only the plane image. This process will be described in detail hereinbelow with reference to a flowchart of FIG. 23C-b. Processes of S1151 to S1153 in FIG. 23C-b are similar to the processes in FIG. 11B-c.

In S2221, the book image photographing unit 412 projective-transforms the area associated with the contents information specified in the coordinate system of the registration image onto the stage plane, that is, the XY plane of the orthogonal coordinate system. The book image photographing unit 412 stores the area on the XY coordinates found out by the above process, as an area which was made to correspond to the contents on the stage plane, into the book information in the RAM 303. The book information is managed in such a format as described in FIGS. 18-a to 18-c. After the process of S2221, the book image photographing unit 412 ends the place contents corresponding process and advances to S2205 in FIG. 23A.

In S2205, the book image photographing unit 412 generates a UI image to be projected to the book stored as a plane image. This process will be described in detail hereinbelow with reference to a flowchart of FIG. 23C-c.

In S2231, the book image photographing unit 412 obtains a contents area (stored as an area of the XY plane) on the present stage 204 and converts into an image of the projector projection plane. Subsequently, the book image photographing unit 412 advances to S1174 and generates a mask for the projection image and stores. This process is similar to the process in FIG. 11B-e.

By the above processes, whether or not the correction of the curved surface of the book is executed in accordance with the distortion of the book object can be determined. Thus, in the case where an enough accuracy is obtained by the correction of only the plane image process such as a case where the distortion degree of the curved surface of the book object is small or the like, the process for extending the curved surface can be omitted and the processing ability can be improved.

Embodiment 6

(Description of Outline of Application Processes which are Executed in the Embodiment)

In the embodiment 5, the method whereby when the distortion degree of the curved shape of the surface of the book object is small, the distortion correction using the book object 3-dimensional dot group is not executed but the processing load is reduced has been described. However, even when the distortion is small, since the book shape is approximated by the plane, when the contents area is small or when the touch is made to a portion near a boundary of the contents area, there is also a case where the touch to the contents area cannot be properly discriminated due to an error. Therefore, in the embodiment, when the shape of the book object is approximated by the plane, if it is decided that the contents area is smaller than a predetermined size, the correcting process using the curved shape of the book object 3-dimensional dot group and the corresponding process are executed again. Also in the case where the touch is made to a portion near the boundary of the contents area, the correcting process using the curved shape and the corresponding process are executed again. A method of executing them will be described hereinbelow.

(Description of Process of Book Image Photographing Unit)

When the contents area is smaller than the predetermined value, the book image photographing unit 412 in the embodiment executes such a process that the curved shape is obtained and the correct correspondence is performed again.

Figure 24:
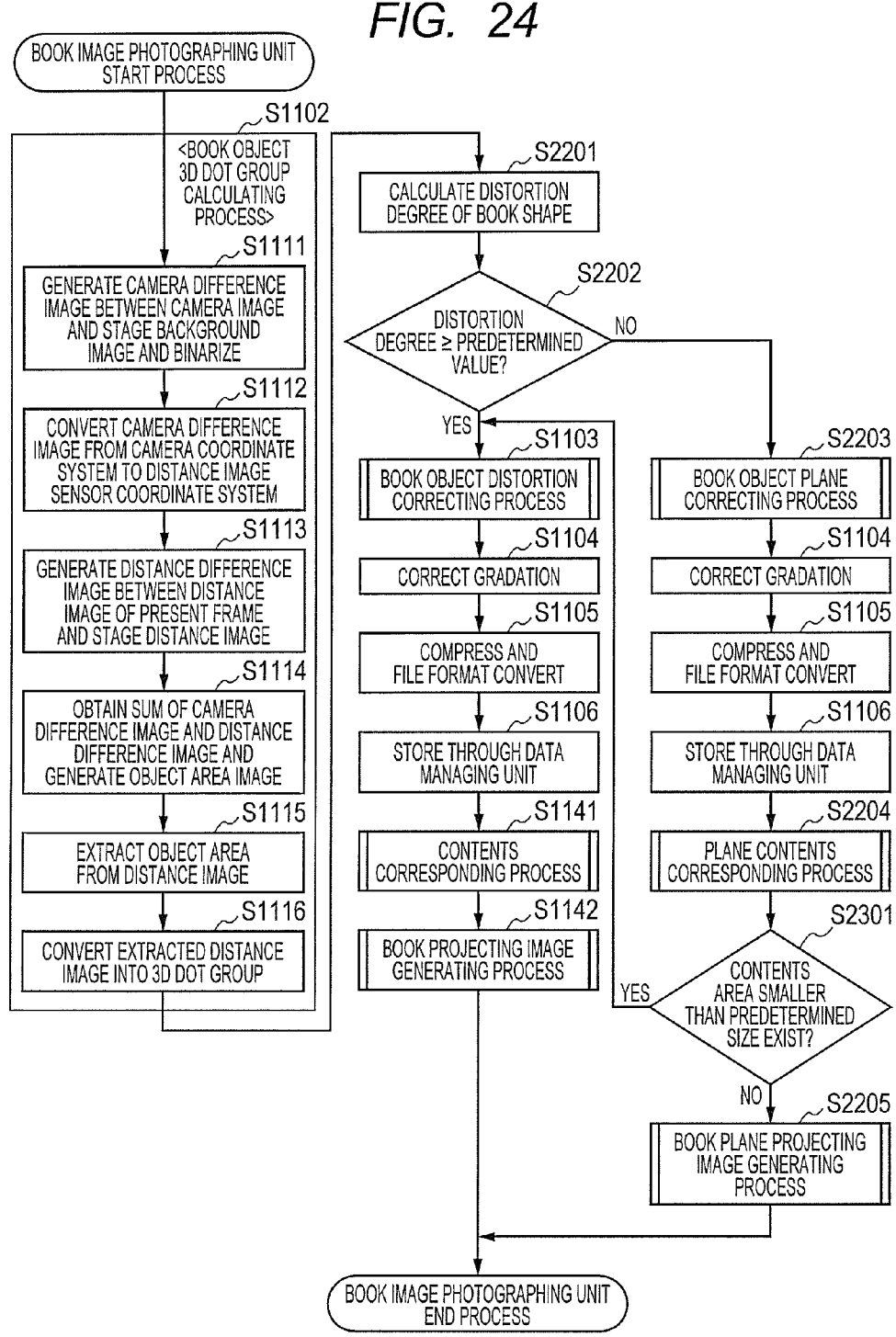
FIG. 24 is a flowchart illustrating an example of a process of a book image photographing unit of an embodiment 6.

FIG. 24 is a flowchart illustrating an example of the process of the book image photographing unit 412 in the embodiment. A description about the processes which have already been mentioned in the flowchart of FIG. 23A described in the embodiment 5 is omitted here.

When the plane contents corresponding process of S2204 is ended, the book image photographing unit 412 advances to S2301. In S2301, the book image photographing unit 412 confirms whether or not the contents area smaller than a predetermined size exists in the page information which was made to correspond in the registration database. It is assumed that the predetermined size has previously been defined. When there is the contents smaller than the predetermined size, the book image photographing unit 412 advances to S1103 and executes the process again from the book object distortion correcting process. When there is not the contents smaller than the predetermined size, the book image photographing unit 412 advances to S2205.

(Description of Process of Processing Unit)

When the touched portion is a portion near the boundary of the contents area, the processing unit 414 in the embodiment executes such a process that the curved shape is obtained and the correct correspondence is performed again.

FIG. 25-a is a flowchart illustrating an example of the process of the processing unit 414 in the embodiment. This flowchart is constructed by adding a contents correspondence retrying process (S2501) to the flowchart which is executed by the processing unit 414 and has been described in FIG. 17-a.

When the solid object touch or the plane touch is detected in S1704, the processing unit 414 executes S2501. In the embodiment, a process of S2501 is added to the flowchart of FIG. 17-a illustrating the process of the processing unit 414 in the embodiment 1. However, the processing unit 414 may execute the process in a form in which the process of S2501 is added to the process of the processing unit 414 in the embodiments 2 to 5.

The contents correspondence retrying process in S2501 will be described in detail with reference to a flowchart of FIG. 25-b. First, in S2511, the book image photographing unit 412 confirms whether or not the distortion degree of the book calculated in S2201 mentioned above is equal to or less than a predetermined value. The book image photographing unit 412 confirms the book information stored in the RAM 303 and confirms whether or not the information of the obtained contents area is information of only the plane area. If it is the information of only the plane area, this means that the solid shape of the book is not obtained but is approximated by the plane and the correction is performed. If both of the discrimination results are YES (in the case where the distortion degree is equal to or less than the predetermined value and the information of the obtained contents area is the information of only the plane contents), the book image photographing unit 412 advances to S2512. If at least one of them is NO (in the case where the distortion degree is larger than the predetermined value or the information of the obtained contents area is not the information of only the plane contents), the book image photographing unit 412 advances to S1705 in FIG. 25-a.

In S2512, the book image photographing unit 412 discriminates whether or not the touch position is a position near the contents area. The book image photographing unit 412 can make such a discrimination by collating the coordinates of the actually touched point with the contents area in accordance with the correspondence and checking whether or not the touch position is closer to a boundary line of the contents area by a distance which is equal to the predetermined number of pixels (predetermined value). If a discrimination result is YES (in the case where the touch position is close to the contents area), the book image photographing unit 412 advances to S2513. If NO (in the case where the touch position is not close to the contents area), the book image photographing unit 412 ends the process and advances to S1705 in FIG. 25-a.

In S2513, the book image photographing unit 412 executes such a process that the solid shape (distortion) is corrected and the correspondence of the contents is performed by the processes of S1103 to S1142 mentioned above.

By the above processes, even if the contents area is small or a portion near the contents area was touched, the touch to the contents area can be accurately detected. Thus, the operability of the user can be improved.

According to the embodiments mentioned above, the operability of the user in the image processing apparatus such as a camera scanner or the like can be improved.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-095541, filed May 2, 2014, which is hereby incorporated by reference herein in its entirety.

What is claimed is:

1. An image processing apparatus comprising:
a pickup image obtaining unit configured to obtain a pickup image on a stage through an imaging unit;
a distance image obtaining unit configured to obtain a distance image on the stage through a solid measuring unit;
a solid information obtaining unit configured to obtain solid information of a solid object put on the stage on a basis of the pickup image of the solid object obtained by the pickup image obtaining unit and the distance image of the solid object obtained by the distance image obtaining unit;
a projecting unit configured to project a projection image showing a contents area onto the solid object through a projector on a basis of the solid information obtained by the solid information obtaining unit; and
a playing unit configured to play a content corresponding to the contents area in accordance with a gesture of a user to the projection image projected by the projecting unit.

2. An apparatus according to claim 1, further comprising:
a correcting unit configured to correct a distortion of the pickup image of the solid object; and
a corresponding unit configured to make the solid information correspond to content registered in association with an image corresponding to the pickup image corrected by the correcting unit on the basis of the corrected pickup image,
and wherein the projecting unit projects the projection image to a corresponding area of the solid object in accordance with a result of the correspondence by the corresponding unit.

3. An apparatus according to claim 2, wherein the correcting unit corrects a distortion of the pickup image of the solid object on the basis of the solid information.

4. An apparatus according to claim 2, wherein when a distortion value of the solid object is smaller than a predetermined value, the correcting unit approximates an object area extracted from the pickup image into a square and projective-transforms into a rectangle, thereby correcting the distortion of the pickup image of the solid object.

5. An apparatus according to claim 4, wherein even if the distortion value of the solid object is smaller than the predetermined value, when a size of the contents area corresponding to the content is smaller than a predetermined value, the correcting unit corrects the distortion of the pickup image of the solid object on the basis of the solid information.

6. An apparatus according to claim 4, wherein even if the distortion value of the solid object is smaller than the predetermined value, when the recognized touch position by the user is closer to a boundary line of the contents area corresponding to the content by a distance larger than a predetermined value, the correcting unit corrects the distortion of the pickup image of the solid object on the basis of the solid information.

7. An apparatus according to claim 1, further comprising:
a recognizing unit configured to recognize the gesture of the user on the stage on the basis of the distance image obtained by the distance image obtaining unit,
and wherein the playing unit plays the content in accordance with the gesture of the user to the projection image recognized by the recognizing unit.

8. An apparatus according to claim 7, wherein when an end of a touch gesture to the solid object by the user is recognized by the recognizing unit, the solid information obtaining unit obtains the solid information again.

9. An apparatus according to claim 8, wherein when a hand of the user is separated by a distance which is equal to or larger than a predetermined height after the touch to the solid object, the recognizing unit recognizes that the touch gesture to the solid object by the user was ended.

10. An apparatus according to claim 8, wherein when a hand of the user is moved to a position out of a predetermined area after the touch to the solid object, the recognizing unit recognizes that the touch gesture to the solid object by the user was ended.

11. An apparatus according to claim 7, wherein after the end of the touch gesture to the solid object by the user was recognized by the recognizing unit, when it is detected that the solid object does not exist in a predetermined area, the projecting unit projects an error display for promoting the user to return the solid object into the predetermined area.

12. An apparatus according to claim 11, wherein when it is detected that the solid object was returned into the predetermined area in accordance with the error display projected by the projecting unit, the solid information obtaining unit obtains the solid information again.

13. An apparatus according to claim 7, wherein when a touch gesture to the solid object by the user is recognized by the recognizing unit, the playing unit plays the content.

14. An apparatus according to claim 7, wherein when an end of a touch gesture to the solid object by the user is recognized by the recognizing unit, the processing unit executes the contents area.

15. An apparatus according to claim 1, wherein the projecting unit projects the projection image in an emphasis-display manner.

16. An apparatus according to claim 1, wherein the image processing apparatus is a camera scanner.

17. An information processing method which is executed by an image processing apparatus, comprising:
a pickup image obtaining step of obtaining a pickup image on a stage through an imaging unit;
a distance image obtaining step of obtaining a distance image on the stage through a solid measuring unit;
a solid information obtaining step of obtaining solid information of a solid object put on the stage on a basis of the pickup image of the solid object obtained by the pickup image obtaining step and the distance image of the solid object obtained by the distance image obtaining step;
a projecting step of projecting a projection image showing a contents area onto the solid object through a projector on a basis of the solid information obtained by the solid information obtaining step; and
a playing step of playing a content corresponding to the contents area in accordance with a gesture of a user to the projection image projected by the projecting step.

18. A non-transitory computer-readable storage medium which stores a program for allowing a computer to execute:
a pickup image obtaining step of obtaining a pickup image on a stage through an imaging unit;
a distance image obtaining step of obtaining a distance image on the stage through a solid measuring unit;
a solid information obtaining step of obtaining solid information of a solid object put on the stage on a basis of the pickup image of the solid object obtained by the pickup image obtaining step and the distance image of the solid object obtained by the distance image obtaining step;
a projecting step of projecting a projection image showing a contents area onto the solid object through a projector on a basis of the solid information obtained by the solid information obtaining step; and
a playing step of playing a content corresponding to the contents area in accordance with a gesture of a user to the projection image projected by the projecting step.

\* \* \* \* \*